(12) United States Patent
Liu et al.

(10) Patent No.: US 12,442,557 B2
(45) Date of Patent: Oct. 14, 2025

(54) ELECTRIC CONTROL BOX AND WINDOW AIR CONDITIONER

(71) Applicants: GD MIDEA AIR-CONDITIONING EQUIPMENT CO., LTD., Foshan (CN); MIDEA GROUP CO., LTD., Foshan (CN)

(72) Inventors: Fashen Liu, Foshan (CN); Xiongwei Zhu, Foshan (CN); Kangwen Zhang, Foshan (CN); Yu Liu, Foshan (CN); Hui Yu, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 720 days.

(21) Appl. No.: 17/789,764

(22) PCT Filed: Mar. 24, 2020

(86) PCT No.: PCT/CN2020/080944
§ 371 (c)(1),
(2) Date: Jun. 28, 2022

(87) PCT Pub. No.: WO2021/134932
PCT Pub. Date: Jul. 8, 2021

(65) Prior Publication Data
US 2023/0044599 A1 Feb. 9, 2023

(30) Foreign Application Priority Data

Dec. 31, 2019 (CN) .......................... 201911417665.1
Dec. 31, 2019 (CN) .......................... 201911417683.X (Continued)

(51) Int. Cl.
*F24F 11/88* (2018.01)
*F24F 1/031* (2019.01)
(Continued)

(52) U.S. Cl.
CPC .............. *F24F 11/88* (2018.01); *F24F 1/031* (2019.02); *F24F 11/89* (2018.01)

(58) Field of Classification Search
CPC ............ H02G 3/08; H02G 3/088; H05K 5/10; H05K 5/061
See application file for complete search history.

(56) References Cited

U.S. PATENT DOCUMENTS 5,167,131 A    12/1992  Karkhanis
6,260,371 B1 *  7/2001  Moraes ................ H05K 5/0247
                                                     62/262

(Continued)

FOREIGN PATENT DOCUMENTS

CN    1755241 A    4/2006
CN   202328654 U    7/2012

(Continued)

OTHER PUBLICATIONS

World Intellectual Property Organization (WIPO) International Search Report and Written opinion for PCT/CN2020/080944 Sep. 28, 2020 7 Pages (Translation Included).

(Continued)

*Primary Examiner* — Timothy J Thompson
*Assistant Examiner* — Amol H Patel
(74) *Attorney, Agent, or Firm* — Anova Law Group, PLLC

(57) ABSTRACT

An electric control box includes an insulation inner shell and a fireproof outer shell. The insulation inner shell includes a first inner shell and a second inner shell that are assembled to each other. The fireproof outer shell includes a first outer (Continued)

shell and a second outer shell. The first outer shell covers the first inner shell, and the second outer shell covers the second inner shell.

20 Claims, 30 Drawing Sheets

(30) Foreign Application Priority Data

| Dec. 31, 2019 | (CN) | 201911417696.7 |
|---|---|---|
| Dec. 31, 2019 | (CN) | 201911423789.0 |
| Dec. 31, 2019 | (CN) | 201922500730.9 |
| Dec. 31, 2019 | (CN) | 201922500822.7 |
| Dec. 31, 2019 | (CN) | 201922501078.2 |
| Dec. 31, 2019 | (CN) | 201922501464.1 |

(51) Int. Cl.
*F24F 1/22* (2011.01)
*F24F 1/24* (2011.01)
*F24F 11/89* (2018.01)
*F24F 110/12* (2018.01)

(56) References Cited

U.S. PATENT DOCUMENTS

| 2007/0068185 A1 | 3/2007 | Thompson | |
| 2010/0193164 A1* | 8/2010 | Wakatsuki | F24F 1/46 165/121 |
| 2014/0020421 A1 | 1/2014 | Gallo | |
| 2014/0374133 A1* | 12/2014 | Rost | H02G 3/088 174/50.51 |
| 2017/0045259 A1 | 2/2017 | Choi et al. | |
| 2017/0191763 A1 | 7/2017 | Xu et al. | |

FOREIGN PATENT DOCUMENTS

| CN | 202590387 U | | 12/2012 |
| CN | 103512105 A | | 1/2014 |
| CN | 203375565 A | | 1/2014 |
| CN | 203793071 U | | 8/2014 |
| CN | 106931541 A | | 7/2017 |
| CN | 207277829 U | | 4/2018 |
| CN | 109724167 A | | 5/2019 |
| CN | 109724168 A | | 5/2019 |
| CN | 109724169 A | | 5/2019 |
| CN | 109874240 A | * | 6/2019 |
| CN | 209763320 A | | 12/2019 |
| CN | 209857330 U | | 12/2019 |
| CN | 110906459 A | | 3/2020 |
| CN | 111023321 A | | 4/2020 |
| CN | 211575303 U | | 9/2020 |
| CN | 211575304 A | | 9/2020 |
| CN | 211575305 A | | 9/2020 |
| CN | 211575306 A | | 9/2020 |
| JP | H10227489 A | | 8/1998 |
| JP | 2008261508 A | | 10/2008 |

OTHER PUBLICATIONS

China National Intellectual Property Administration (CNIPA) Office Action 1 for Application No. 201911417665.1, Jul. 9, 2024 18 Pages (including translation).
China National Intellectual Property Administration (CNIPA) Office Action 1 for Application No. 201911417683.X Aug. 23, 2024 16 Pages (including translation).
China National Intellectual Property Administration (CNIPA) Office Action 1 for Application No. 201911417696.7, Jul. 3, 2024 13 Pages (including translation).
China National Intellectual Property Administration (CNIPA) Office Action 1 for Application No. 201911423789.0 Jul. 22, 2024 15 Pages (including translation).
The World Intellectual Property Organization (WIPO) Written Opinion for PCT/CN2020/080944 Sep. 28, 2020 13 Pages (including translation).

\* cited by examiner

ELECTRIC CONTROL BOX AND WINDOW AIR CONDITIONER

CROSS-REFERENCE TO RELATED APPLICATIONS

This application is a National Stage Entry under 35 U.S.C. § 371 of International Application No. PCT/CN2020/080944, filed on Mar. 24, 2020, which claims priority to Chinese Patent Application Nos. 201911423789.0, 201922501464.1, 201922501078.2, 201911417696.7, 201922500730.9, 201911417665.1, 201922500822.7, and 201911417683.X, filed on Dec. 31, 2019, the entire contents of all of which are incorporated herein by reference.

TECHNICAL FIELD

The present disclosure relates to the field of air conditioning device technologies, and more particularly, to an electric control box and a window air conditioner having the same.

BACKGROUND

With improvement of people's living standards and increase of extreme environments, air conditioners are more and more popular. With gradual increase in labor costs, installation and maintenance costs of the air conditioners have increased year by year. The existing wall-mounted air conditioners, cabinet air conditioners or the like require separate installation of indoor and outdoor units, which results in high installation and maintenance costs. Moreover, it is not only difficult to install the outdoor unit outdoors, but also difficult to maintain after failure. In view of the above, window air conditioners gradually become popular.

In the related art, an electric control box without a wire bundle restraining structure has a messy arrangement of wire bundles, which results in great inconvenience during installation and maintenance. Moreover, the wire bundles interfere with each other due to the messy arrangement of the wire bundles, thereby adversely effecting stable operation of the electric control box.

SUMMARY

An object of the present disclosure is to provide an electric control box including a wiring channel and a radiator for easy wire bundle routing and heat dissipation.

Another objection of the present disclosure is to provide a window air conditioner having the electric control box.

According to embodiments of the present disclosure, an electric control box includes a box body, a circuit board, and a radiator. The box body has a wiring channel formed therein, and the wiring channel has a wire outlet. The circuit board is arranged within the box body and has electronic components. The radiator is connected to at least some of the electronic components on the circuit board and is adapted to transfer heat to form a heat dissipation structure. A wire-separation rib is disposed in the wiring channel. The wire-separation rib is configured to divide the wiring channel into at least two wire-separation slots in a direction perpendicular to an extending direction of the wiring channel.

The electric control box according to the embodiments of the present disclosure can facilitate wire routing and heat dissipation by arranging the wiring channel and the radiator.

In addition, the electric control box according to the above embodiments of the present disclosure may also have the following additional technical features.

In some embodiments, the wiring channel includes a first channel member, a second channel member and a third channel member. The first channel member and the second channel member are distributed on opposite sides of the circuit board in a vertical direction and extend in a transverse direction. The third channel member is arranged at a side of the circuit board and extends in the vertical direction, and the third channel member is connected to the first channel member and the second channel member. The transverse direction is perpendicular to the vertical direction.

In some embodiments, a radiator is disposed at the circuit board. The radiator is arranged at a position on the circuit board facing away from the third channel member.

In some embodiments, the first channel member is connected to one end of the third channel member, and the second channel member is connected to a middle part of the third channel member. The second channel member passes through the third channel member in the transverse direction to divide the third channel member in the vertical direction. The wire outlet is arranged at the other end of the third channel member.

In some embodiments, the third channel member has a wire-separation rib provided therein.

In some embodiments, at least one of the wire-separation rib and a side wall of the wiring channel has a wire-fixation rib provided thereon. A positioning space for positioning a wire bundle is formed between the wire-fixation rib and a bottom surface of the wiring channel.

In some embodiments, the at least two wire-separation slots include a weak electricity wire-separation slot close to the circuit board and a strong electricity wire-separation slot away from the circuit board.

In some embodiments, the wiring channel is arranged around the circuit board in the electric control box. The wire-separation rib for separating the wire bundle is disposed in the wiring channel. Further, the electric control box has wire-fixation ribs provided thereon. The wire-fixation ribs are arranged at intervals in an extending direction of the wiring channel to position the wire bundle.

In some embodiments, the box body includes an insulation inner shell having a cavity therein, and a fireproof outer shell configured to cover over the insulation inner shell.

In some embodiments, the insulation inner shell has a heat dissipation hole formed at a side wall thereof. The heat dissipation hole passes through the side wall, and is inclined towards a second end of the box body relative to the insulation inner shell in an inside-outside direction.

In some embodiments, at least a part of a peripheral wall of the heat dissipation hole protrudes from an outer side surface of the insulation inner shell.

In some embodiments, the electric control box also includes an inductor. The circuit board is fixedly mounted in the insulation inner shell, and the inductor is mounted at the fireproof outer shell.

In some embodiments, the insulation inner shell includes a first inner shell and a second inner shell which are assembled to each other.

In some embodiments, the fireproof outer shell includes a first outer shell and a second outer shell. The first outer shell is configured to cover over the first inner shell, and the second outer shell is configured to cover over the second inner shell.

In some embodiments, the first inner shell is injection-molded into an integrated structure.

In some embodiments, the second inner shell is injection-molded into an integrated structure.

In some embodiments, the first outer shell is integrally formed by a sheet metal.

In some embodiments, the second outer shell is integrally formed by a sheet metal.

In some embodiments, the first inner shell has a first snap structure provided at an outer periphery thereof, and the second inner shell has a second snap structure provided at an outer periphery thereof. The first snap structure is snap-connected to the second snap structure.

In some embodiments, a first lug protrudes from an outer periphery of the first outer shell, and a second lug protrudes from the outer periphery of the second outer shell. The first lug and the second lug are fixedly connected to each other by a fastener.

In some embodiments, the first inner shell is snap-connected or screwed to the first outer shell.

In some embodiments, the second inner shell is snap-connected or screwed to the second outer shell.

In some embodiments, the box body is arranged in the vertical direction. The first inner shell and the second inner shell are assembled to each other in the longitudinal direction. The box body has a first end and a second end which are opposite to each other in a vertical direction.

In some embodiments, the second outer shell has a flow guide groove formed at an outer surface thereof. The flow guide groove extends to the first end of the box body in the vertical direction. The vertical direction is perpendicular to the longitudinal direction.

In some embodiments, at the first end of the box body, the second inner shell has a protrusion rib provided at an edge thereof. The protrusion rib protrudes vertically in a direction facing away from an inner space of the box body and protrudes beyond an inner or outer peripheral surface of the second outer shell.

In some embodiments, at the first end of the box body, the second inner shell has a positioning hole formed thereon. A distance between the protrusion rib and the positioning hole is not less than 6 mm.

In some embodiments, at the first end of the box body, an end surface of the second inner shell is longitudinally inclined towards the second end of the box body in a direction facing away from the first inner shell.

In some embodiments, at the first end of the box body, the second outer shell has a positioning hole formed thereon.

In some embodiments, the second outer shell has an outwardly protrusion structure provided thereon, the outwardly protrusion structure protrudes vertically in a direction away from the second inner shell, and the positioning hole is disposed at the outwardly protrusion structure.

In some embodiments, at the first end of the box body, the flow guide groove extends to an end surface of the second inner shell at an end thereof and has an avoidance groove formed at the end. The avoidance groove has a bottom surface spaced apart from the second outer shell and is opposite to the positioning hole in the vertical direction.

In some embodiments, at the first end of the box body, at least a part of the end surface of the second inner shell is spaced apart from the second outer shell, and has a plurality of ribs provided thereon. The ribs extend in both vertical and longitudinal directions, and the plurality of ribs are arranged at intervals in the transverse direction. The avoidance groove is formed between two adjacent ribs. The transverse direction, the longitudinal direction and the vertical direction are perpendicular to each other.

In some embodiments, the insulation inner shell has heat dissipation holes formed at the side wall thereof. Each of the heat dissipation holes passes through the side wall of the insulation inner shell and a peripheral wall of each of the heat dissipation hole protrudes beyond a side surface of the insulation inner shell. A protruding length of a side wall of each heat dissipation hole adjacent to the first end is greater than that of a side wall of each heat dissipation hole adjacent to the second end, and the side wall of each heat dissipation hole adjacent to the first end has a notch groove formed at an edge thereof In some embodiments, at the second end of the box body, the second inner shell has a connection member provided thereon for connecting the base. The connection member has a threaded hole formed therein, and the threaded hole is a blind hole.

In some embodiments, at the second end of the box body, the insulation inner shell has a wire outlet formed therein. The wire outlet has a water guide rib provided at at least a part of an edge thereof. The water guide rib extends towards the outside of the box body in the vertical direction.

In some embodiments, one of the first inner shell and the second inner shell has a wire outgoing notch formed thereon, and the other has an air guiding notch formed thereon. The wire outgoing notch and the air guiding notch are opposite to each other in the longitudinal direction.

In some embodiments, the wire outgoing notch has a water guide rib provided at an edge thereof.

In some embodiments, the first inner shell has a first support structure provided thereon. The first support structure has a hole formed thereon. The first support structure includes: a plurality of first support partition plates arranged at an end of the first inner shell, the plurality of first support partition plates being spaced apart from each other; and a first reinforcement member connected between every two adjacent first support partition plates. The first reinforcement member has a hole formed thereon.

In some embodiments, the second inner shell has a second support structure provided thereon. The second support structure has a hole formed thereon. The second support structure includes: a plurality of second support partition plates arranged at an end of the second inner shell, the plurality of second support partition plates being spaced apart from each other; and a second reinforcement member connected between every two adjacent second support partition plates. The second reinforcement member has holes formed thereon in the longitudinal direction.

In some embodiments, the second reinforcement member includes: a first reinforcement plate configured to connect two adjacent support partition plates and the second inner shell and having a hole formed thereon; and a second reinforcement plate connected to a side of the first reinforcement plate facing away from the second inner shell and connected to two adjacent support partition plates. The second reinforcement plate is perpendicular to the first reinforcement plate.

In some embodiments, the second reinforcement plate has an inwardly recessed arc-shaped edge in the longitudinal direction.

In some embodiments, the electric control box also includes an inductor. The first inner shell has an avoidance opening formed therein. The inductor is disposed in the avoidance opening and mounted directly at the first outer shell.

In some embodiments, a part of the first outer shell is recessed inwardly to form a recessed platform structure at an inner side of the first outer shell, and the inductor is mounted at the recessed platform structure.

In some embodiments, the circuit board is mounted at the first inner shell. The first inner shell has a positioning structure provided at an inner side thereof. The positioning structure is arranged around the circuit board, and includes positioning ribs and positioning hooks.

In some embodiments, the positioning ribs are arranged around the first inner shell to form a placement space into which the circuit board is located. A plurality of positioning hooks is arranged around the circuit boards at intervals.

In some embodiments, a guide rib is disposed at a peripheral wall of the placement space. The guide rib is perpendicular to the circuit board and connected to an inner side surface and an inner bottom surface of the placement space, respectively. An end of the guide rib facing away from the inner bottom surface of the placement space is formed into a wedge-shaped structure gradually increasing towards the inner bottom surface of the placement space relative to a height of the inner side surface of the placement space.

In some embodiments, the circuit board has a positioning notch formed at an edge thereof. The box body has a positioning protrusion provided thereon. The positioning protrusion is engaged with the positioning notch to position the circuit board In some embodiments, the circuit board is spaced apart from an inner surface of the box body.

In some embodiments, at least one of the first inner shell and the second inner shell has a heat dissipation window provided therein.

In some embodiments, the heat dissipation window has support ribs connected thereto. The support ribs are in a form of grids arranged in a crisscross pattern.

In some embodiments, the circuit board is mounted at the first inner shell, and the heat dissipation window is disposed in a region of the first inner shell opposite to the circuit board.

In some embodiments, a gap in a range of 8 mm to 18 mm is formed between the circuit board and the first outer shell.

In some embodiments, the first inner shell has a sealing groove formed at a peripheral wall thereof, and the second inner shell has a sealing rib provide thereon. The sealing rib is embedded in the sealing groove.

In some embodiments, a sealing ring is disposed in the sealing groove. The sealing rib is pressed against the sealing ring.

In some embodiments, the first inner shell is connected to the second inner shell connected at a position adjacent to the sealing ring by the fastener.

In some embodiments, the second inner shell has a first holding groove formed at an inner side of a peripheral wall thereof. The peripheral wall of the first inner shell is embedded within the first holding groove, and the sealing rib is arranged at an inner bottom surface of the first holding groove.

In some embodiments, the first inner shell has a second holding groove formed at the peripheral wall thereof. An edge of the second outer shell extends into the second holding groove.

In some embodiments, the box body has a vacated opening formed therein, and the radiator extends out of the box body through the vacated opening.

In some embodiments, the box body has a recessed structure provided at an outer surface thereof, and the vacated opening is disposed at the recessed structure.

In some embodiments, the electric control box has a recessed structure provided at an outer surface of one end thereof in the vertical direction and a protrusion structure provided at the other end thereof in the vertical direction. The protrusion structure is convex relative to the recessed structure, and a patch block is disposed at a step formed between the recessed structure and the protrusion structure.

In some embodiments, the electric control box also includes an inductor. The inductor is arranged in the box body, and the circuit board is arranged to be spaced apart from the inductor. At least a part of the inductor is disposed in the protrusion structure.

In some embodiments, the patch block includes a cover plate configured to cover over the step formed between the protrusion structure and the recessed structure. The cover plate has a first flange provided at a part of a peripheral edge thereof and a second flange provided at another part of the peripheral edge thereof. The first flange extends towards the recessed structure in the vertical direction and is connected to a wall of the recessed structure, and the second flange extends towards the protrusion structure in the vertical direction and is connected to a wall of the protrusion structure.

In some embodiments, a part of a wall of the recessed structure protrudes towards the outside of the box body and has an insertion hole in the vertical direction. The first flange has an insertion buckle formed thereon and extending towards the cover plate in the vertical direction. The insertion buckle is inserted into the insertion hole in the vertical direction.

In some embodiments, the protrusion structure has an engagement protrusion provided at a wall thereof, and the second flange has an engagement hole formed therein. The engagement protrusion is snapped into the engagement hole.

In some embodiments, the first flange is screwed to the wall of the recessed structure.

In some embodiments, the second flange is screwed to the wall of the protrusion structure.

In some embodiments, the cover plate has a square shape. The first flange is disposed at two adjacent sides of the cover plate, and the second flange is disposed at the other two adjacent sides of the cover plate.

In some embodiments, the radiator extends out of the box body, and a sealing structure is formed between the radiator and the box body.

In some embodiments, the box body has a vacated opening formed at a wall thereof. The radiator includes: a bottom plate connected to at least some of the electronic components on the circuit board and adapted to transfer heat, the bottom plate being located within the box body; a heat dissipation fin connected to the bottom plate and extending out of the box body 31 from the vacated opening; and a seal surrounding the heat dissipation fin and arranged between the bottom plate and a periphery of the vacated opening to form a sealing structure.

In some embodiments, the seal has a plurality of annular ribs provided at a surface of the seal abutting with a peripheral edge of the vacated opening. Each of the annular ribs is in a form of ring extending in a same direction as the seal. The plurality of annular ribs is formed into a plurality of rings arranged at intervals from inside to outside.

In some embodiments, each of the annular ribs is constructed to have a semicircular, trapezoidal or rectangular cross-section.

In some embodiments, a slot between two adjacent annular ribs is constructed into a semicircular, trapezoidal or rectangular shape.

In some embodiments, the seal includes a first portion and a second portion. The first portion covers over a peripheral edge of a surface of the bottom plate connected to the heat dissipation fin, and the second portion is sleeved on a peripheral surface of the bottom plate.

In some embodiments, the heat dissipation fin has a surface formed into a corrugated surface.

In some embodiments, at least some of the electronic components on the circuit board have a heat-conduction sheet provided at a surface thereof. The heat-conduction sheet is configured to transfer heat with the electronic components, and the radiator cooperates with the heat-conduction sheet and is adapted to conduct heat.

In some embodiments, a gap in a range of 0.1 mm to 1 mm is formed between the heat-conduction sheet and the radiator, and is filled with a heat-conducting medium.

In some embodiments, the circuit board has a heat dissipation support provided thereon. The radiator and the heat-conduction sheet are both mounted at the heat dissipation support.

In some embodiments, the electric control box also includes an inductor arranged in the box body, and the circuit board is spaced apart from the inductor.

In some embodiments, a partition wall is disposed in the box body. The circuit board and the inductor are separated from each other by the partition wall. The partition wall has a wire-passing opening formed therein for communication with a chamber in which the circuit board is located and a chamber in which the inductor is located.

In some embodiments, the wire-passing opening is formed into a recessed shape located on at an edge of a peripheral wall of the partition wall, and the wire-passing opening has an anti-dropping clip provided at an opening thereof. The anti-dropping clip has an opening.

In some embodiments, one end of the inductor is inserted into the box body, and the other end is connected to the box body by a fastener.

In some embodiments, the box body has a grounding connector or a grounding mark provided at an outer side thereof. The grounding connector or the grounding mark is opposite to the inductor.

In some embodiments, the box body is arranged in the vertical direction, and the inductor and the circuit board are arranged to be spaced apart from each other in the box body in the vertical direction.

In some embodiments, the electric control box also includes an outdoor temperature sensor disposed at the box body.

In some embodiments, the outdoor temperature sensor is disposed at the wire outlet.

In some embodiments, a plurality of wire outlets is provided, an inner side of the wire outlet where the outdoor temperature sensor is disposed is isolated by a partition plate from an inner side of the wire outlet where the wire bundle is drawn out.

In some embodiments, the box body includes: a box base in which the circuit board is placed and the wiring channel is disposed; and a box cover covering and closing the box base.

In some embodiments, one of the box cover and the box base has a wire outgoing notch formed thereon. The wire outgoing notch has an anti-dropping clip provided at an opening thereof, and the anti-dropping clip has an opening.

In some embodiments, the other of the box base and the box cover has an air guiding notch formed thereon. The wire outgoing notch and the air guiding notch face each other in the longitudinal direction to form the wire outlet.

In some embodiments, the air guiding notch extends in a serpentine manner in the vertical direction.

In some embodiments, the air guiding notch is formed by arranging a first baffle, a third baffle and a second baffle sequentially in the vertical direction. The first baffle and the second baffle have opposite ventilation openings in the vertical direction formed thereon, and the third baffle is arranged between the ventilation openings of the first baffle and the second baffle.

In some embodiments, the circuit board is arranged at the box base, and the vacated opening is arranged at the box cover.

In some embodiments, the box cover and the box base are connected to each other by a fastener at positions adjacent to both ends of the radiator.

In some embodiments, the box base includes a first inner shell and a first outer shell configured to cover over the first inner shell. The box cover includes a second inner shell and a second outer shell configured to cover over the second inner shell. Each of the first and second inner shells is an insulation shell, and each of the first and second outer shells is a fireproof shell. The first inner shell is assembled to the second inner shell, and the wiring channel is disposed at an inner side of the first inner shell.

A window air conditioner according to embodiments of the present disclosure includes: a base; a casing assembly mounted at the base; the electric control box as described above, the electric control box being disposed in the casing assembly and mounted at the base.

In some embodiments, the casing assembly includes: an inner casing mounted at the base; an outer casing mounted at the base, the inner casing and the outer casing being spaced apart from each other to form an accommodation grooves for accommodating a window sash.

In some embodiments, the electric control box is disposed in the outer casing.

In some embodiments, the electric control box is disposed at a position in the outer casing adjacent to the inner casing.

In some embodiments, the electric control box is disposed in an outer housing of the outer casing, and is connected to the outer housing by a fastener.

In some embodiments, the outer casing includes an outer housing. The outer housing includes an enclosure plate connected to the base and extending in a direction perpendicular to the base; and a top cover covers and closes a side of the enclosure plate away from the base. The top cover and the enclosure plate are connected to each other by a fastener. Here, the electric control box has a vacated recess formed at a position thereon corresponding to the fastener for connecting the enclosure plate and the top cover.

In some embodiments, the enclosure plate protrudes from a portion thereon opposite to the vacated recess.

In some embodiments, the window air conditioner of claim also includes a sealing block configured to be arranged at at least one side of opposite outer sides of the base in an unfolded position to seal a gap between the window sash and a window frame.

In some embodiments, the sealing block also has a folded position in which the sealing block is received in the casing assembly.

In some embodiments, the box body is arranged in the vertical direction, and has a first end and a second end that are opposite to each other in the vertical direction. The box body includes: an insulation inner shell having a cavity and including a first inner shell and a second inner shell that assembled together in the longitudinal direction; and a fireproof outer shell including a first outer shell and a second outer shell, the first outer shell being configured to covered over the first inner shell, and the second outer shell being configured to cover over the second inner shell.

In some embodiments, a top wall of the casing assembly is screwed to the first end of the box body.

In some embodiments, the casing assembly has an inwardly recessed structure provided at a top wall thereof, and the electric control box has an outwardly protrusion structure provided at a first end thereof. The inwardly recessed structure and the outwardly protrusion structure are connected to each other by a fastener.

In some embodiments, the casing assembly has a louver provided at a side wall thereof facing away from the base. The louver is faces the second outer shell.

In some embodiments, at the first end of the box body, the second inner shell has a protrusion rib provided at an edge thereof. The protrusion rib protrudes vertically in a direction facing away from an inner space of the box body and protrudes beyond the edge of the second outer shell in the vertical direction. The louver has a flange rib provided at a peripheral edge thereof. A distance between the flange rib and the protrusion rib is not less than 6 mm.

In some embodiments, the electric control box is inserted into the base and positioned at the base by a fastener.

In some embodiments, the base has an insertion opening formed thereon. The electric control box has a latch provided at an end of a bottom thereof in the transverse direction. The latch is inserted into the insertion opening in the transverse direction. The transverse direction is parallel to the base.

In some embodiments, a part of the base protrudes to form the insertion opening, and an edge of a top wall of the insertion opening extends obliquely to form a flare shape. A notch is formed at an edge of a side wall of the insertion opening.

In some embodiments, the electric control box has a vacated notch formed at a position opposite to the insertion opening. The vacated notch has a first surface opposite to the insertion opening in a direction perpendicular to the base and a second surface opposite to the insertion opening in the transverse direction. A connection member is disposed at the vacated notch, and the connection member is connected to each of the first surface and the second surface. The latch is connected to the connection member.

In some embodiments, the connection member includes: a first connection rod connected to the first surface and extending towards the insertion opening, the latch being connected to a free end of the first connection rod; a second connection rod connected to the second surface, extending towards the insertion opening and being connected to the first connection rod; and a reinforcement rib connected among the first surface, the second surface, the first connection rod and the second connection rod, the reinforcement rib having an annular hollow structure.

In some embodiments, the base has a first bump provided thereon, and the insertion opening is formed at a top wall of the first bump.

In some embodiments, the electric control box has a mounting member provided at the other end of the bottom thereof in the transverse direction. The mounting member is connected to the base by the fastener. The transverse is parallel to the base.

In some embodiments, the mounting member protrudes in a longitudinal direction from each of opposite sides of the electric control box, and a plurality of fasteners on the mounting members on opposite sides are arranged in a triangular shape. The longitudinal direction is parallel to the base and is perpendicular to the transverse direction.

In some embodiments, the base also has a second bump provided thereon, and the mounting member is connected to the second bump.

In some embodiments, the second bump has a groove formed thereon. The groove faces the electric control box and recessed away from the electric control box.

In some embodiments, the casing assembly includes a compressor. The electric control box is disposed adjacent to the compressor, is inserted into the base at an end of a bottom thereof adjacent to the compressor, and is positioned to the base by a fastener at an end of the bottom thereof facing away from the compressor.

In some embodiments, the electric control box is disposed at the base in the vertical direction.

In some embodiments, the box body includes: an insulation inner shell including a first inner shell and a second inner shell that are assembled to each other; a fireproof outer shell including a first outer shell configured to cover over the first inner shell and a second outer shell configured to cover over the second inner shell. The first inner shell, the second inner shell, the first outer shell and the first outer shell are all arranged vertically on the base.

BRIEF DESCRIPTION OF DRAWINGS

FIG. 3-1 is a schematic partial enlarged view of part A in FIG. 3.

FIG. 4-1 is a schematic partial enlarged view of part B in FIG. 4.

FIG. 6-1 is a schematic partial enlarged view of part C in FIG. 6.

FIG. 9-1 is a schematic partial enlarged view of part D in FIG. 9.

FIG. 10-1 is a partially enlarged schematic view of part E in FIG. 10.

FIG. 13-1 is a schematic partial enlarged view of part F in FIG. 13.

FIG. 16-1 is a schematic partial enlarged view of part G in FIG. 16.

FIG. 20-1 is a schematic partial enlarged view of part H in FIG. 20.

FIG. 23-1 is a schematic partial enlarged view of part I in FIG. 23.

Figure 1:
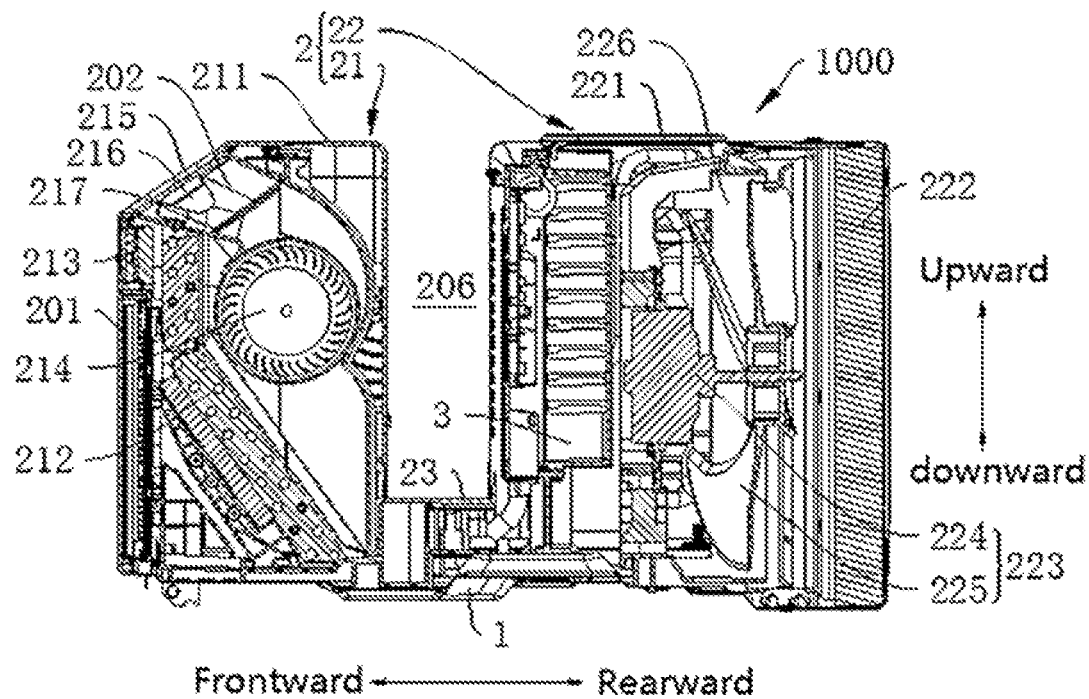
FIG. 1 is a schematic view of a window air conditioner according to an embodiment of the present disclosure.
Figure 2:
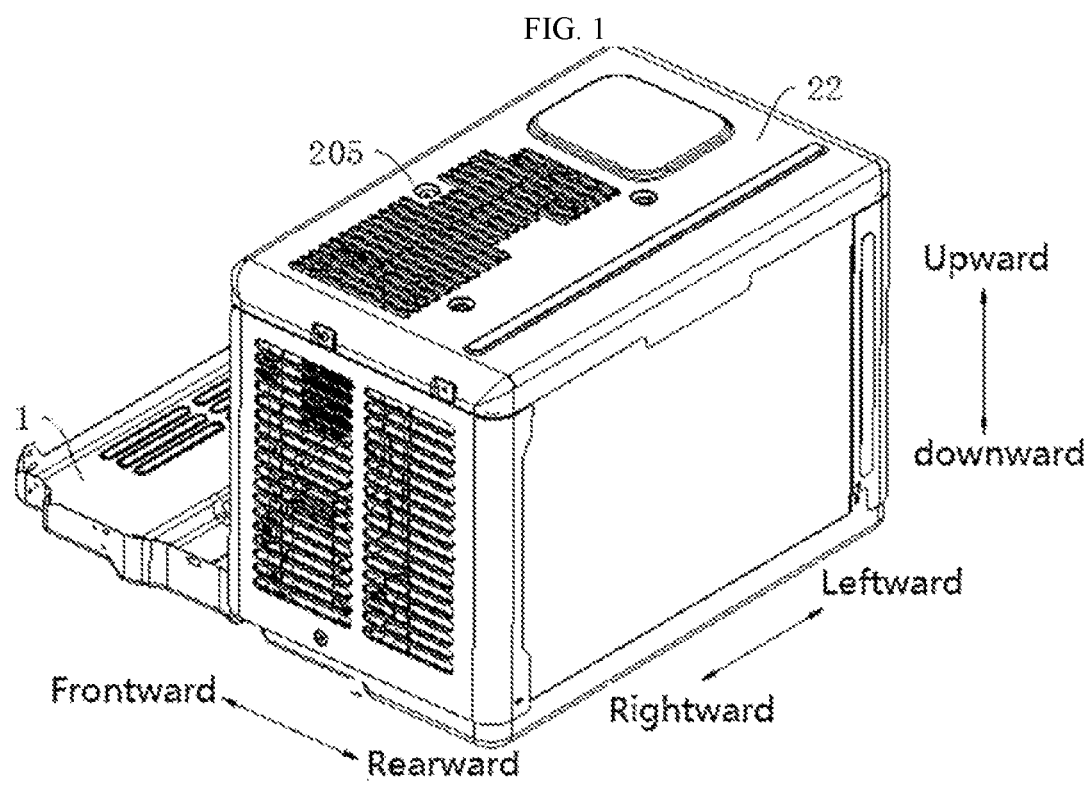
FIG. 2 is a schematic view of an assembly between an outer casing and a base in a window air conditioner according to an embodiment of the present disclosure.
Figure 3:
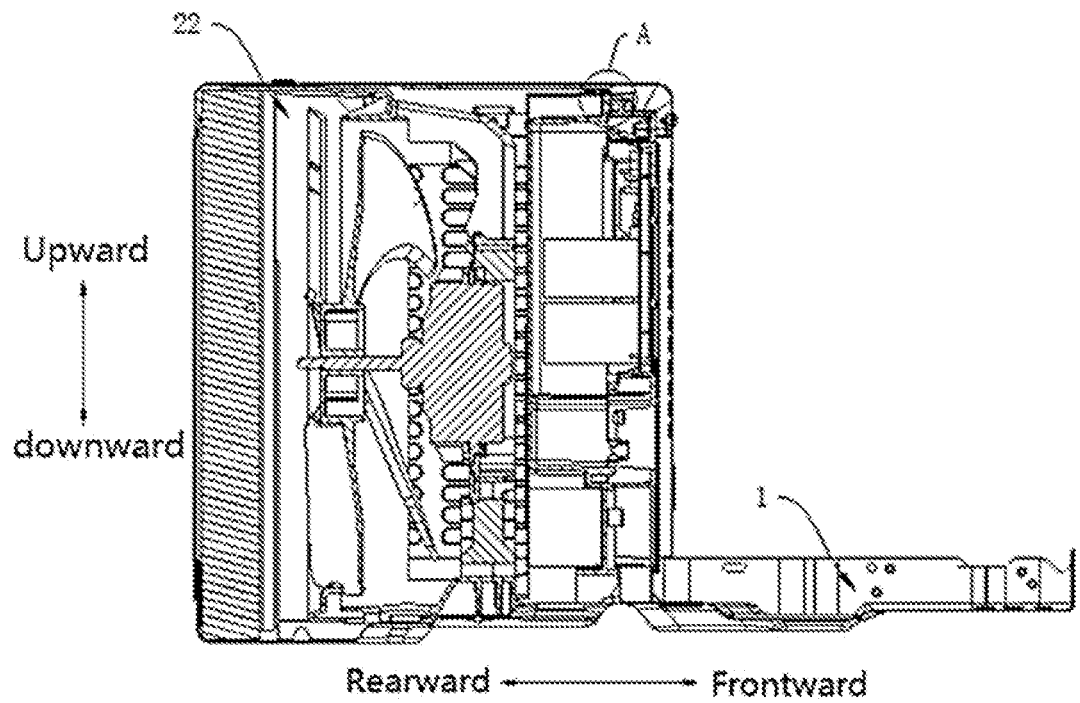
FIG. 3 is a sectional view of an assembly between an outer casing and a base in a window air conditioner according to an embodiment of the present disclosure.
Figures 1, 3:
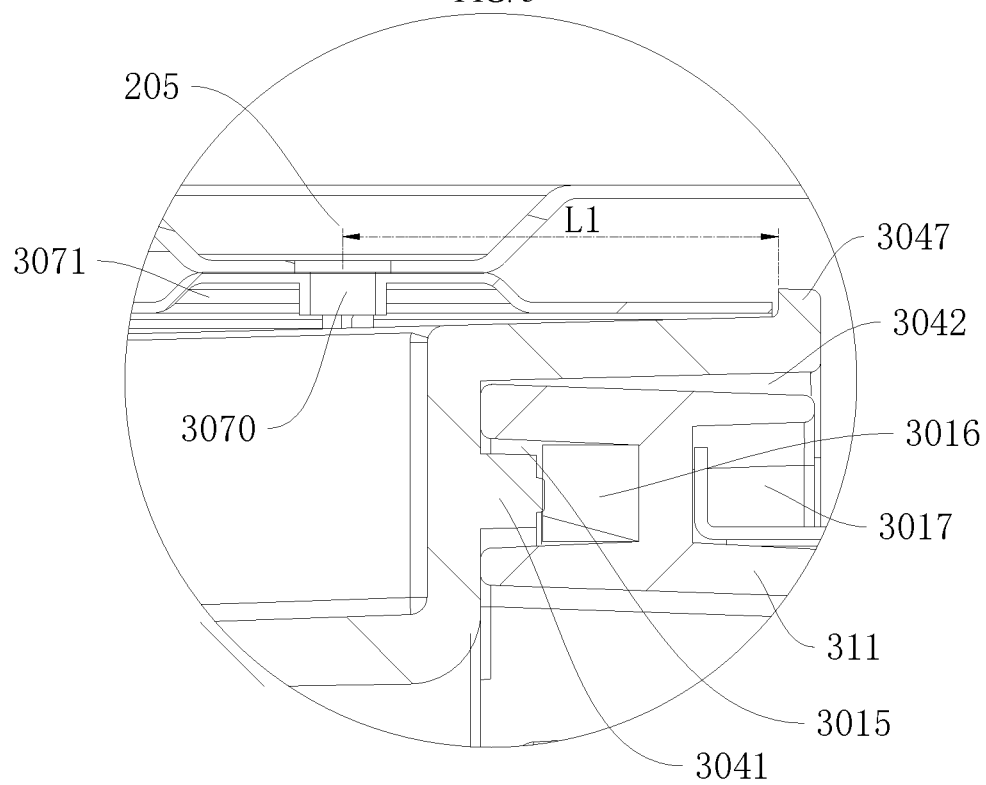
Figure 4:
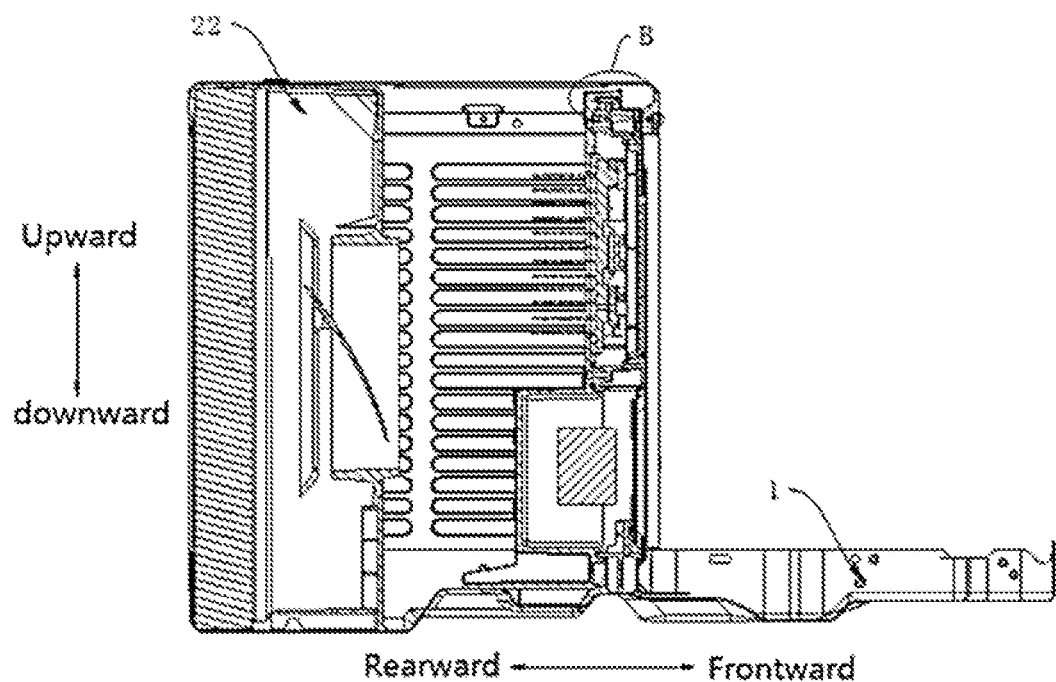
FIG. 4 is a sectional view of an assembly between an outer casing and a base in a window air conditioner according to an embodiment of the present disclosure.
Figures 1, 4:
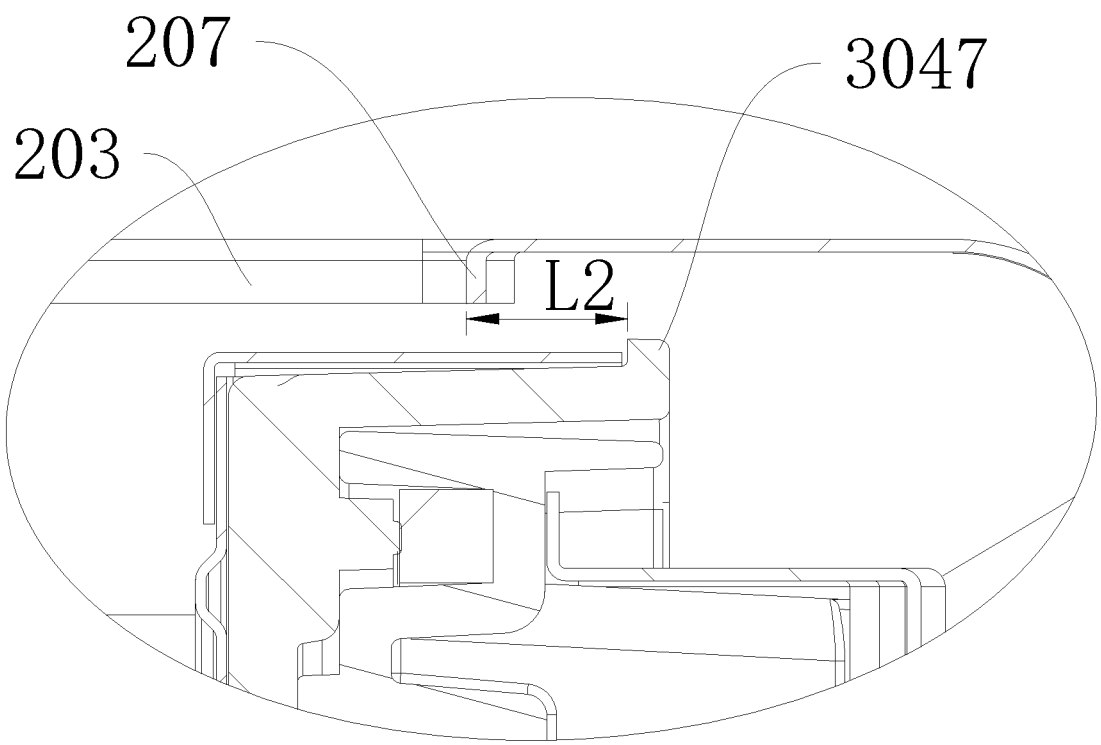

REFERENCE CHARACTERS window air conditioner 1000 base 1, insertion opening 101, notch 102, first bump 11, second bump 12, casing assembly 2, inner casing 21, inner housing 211, indoor heat exchanger 212, air return port 201, air supply port 202, control box 213, cross-flow fan 214, air deflector 215, transverse swing blade 216, protective net cover 217, outer casing 22, outer housing 221, outdoor heat exchanger 222, outdoor air duct assembly 223, outdoor motor 224, axial flow fan 225, rear enclosure 226, enclosure plate 227, top cover 228, air inlet 203, air outlet 204, compressor 229, inwardly recessed structure 205, flange rib 207, accommodation groove 206, middle partition plate 23, electric control box 3, box body 31, latch 301, mounting member 302, insulation inner shell 303, fireproof outer shell 304, box base 305, box cover 306, recessed structure 307, vacated notch 309, vacated recess 3012, wire outlet 3013, first inner shell 311, first snap structure 3014, sealing groove 3015, sealing ring 3016, second holding groove 3017, partition wall 3018, positioning structure 3019, positioning rib 3020, positioning hook 3021, guide rib 3022, heat dissipation window 3023, support rib 3024, wire outgoing notch 3025, water guide rib 3026, wire-routing groove 3027, first channel member 3028, second channel member 3029, third channel member 3030, wire-separation rib 3031, wire-separation slot 3032, wire-fixation rib 3033, first support structure 3034, first support partition plate 3035, first reinforcement member 3036, wire-passing opening 3037, avoidance opening 3038, anti-dropping clip 3039, positioning protrusion 3072, second inner shell 312, second snap structure 3040, sealing rib 3041, connection member 3043, first connection rod 3044, second connection rod 3045, reinforcement rib 3046, protrusion rib 3047, first holding groove 3042, flow guide groove 3049, avoidance groove 3050, rib 3051, air guiding notch 3052, second support structure 3053, second support partition plate 3054, second reinforcement member 3055, first reinforcement plate 3056, second reinforcement plate 3057, vacated opening 3058, heat dissipation hole 3059, notch groove 3060, first baffle 3061, second baffle 3062, third baffle 3063, first outer shell 313, first lug 3065, recessed platform structure 3066, second outer shell 314, second lug 3067, insertion hole 3068, engagement protrusion 3069, positioning hole 3070, outwardly protrusion structure 3071, patch block 32, cover plate 321, first flange 322, second flange 323, insertion buckle 324, engagement hole 325, circuit board 33, electronic component 331, inductor 34, radiator 35, bottom plate 351, heat dissipation fin 352, seal 353, annular rib 354, first portion 355, second portion 356, heat dissipation support 357, heat-conduction sheet 358, outdoor temperature sensor 36.

DESCRIPTION OF EMBODIMENTS

Embodiments of the present disclosure are described below in detail, examples of the embodiments are shown in accompanying drawings, and throughout the description, the same or similar reference signs represent the same or similar components or the components having the same or similar functions. The embodiments described below with reference to the accompanying drawings are exemplary and merely intended to explain the present disclosure, rather than being construed as limitation on the present disclosure.

As shown in FIG. 1, a window air conditioner 1000 according to an embodiment of the present disclosure includes a base 1 and a casing assembly 2.

Here, the base 1 is configured to provide support for the window air conditioner 1000, and at least a part of other components of the window air conditioner 1000 may be mounted at the base 1. The casing assembly 2 is mounted at the base 1 and may have a heat exchange module integrated therein. For example, the casing assembly 2 have components, such as an indoor heat exchanger 212, an outdoor heat exchanger 222, and a compressor 229, integrated therein.

Optionally, the window air conditioner 1000 of the present disclosure also includes an electric control box 3 arranged within the casing assembly 2. The electric control box is configured to provide control over internal devices in the casing assembly 2.

Optionally, as shown in FIG. 1, in the window air conditioner 1000 of the present disclosure, the casing assembly 2 includes an inner casing 21 and an outer casing 22. The inner casing 21 is mounted at the base 1, and the outer casing 22 is mounted at the base 1. The inner casing 21 and the outer casing 22 are spaced apart from each other to form an accommodation groove 206 for accommodating the window sash. During use, the window air conditioner 1000 may be mounted at a window frame in such a manner that the accommodation groove 206 is arranged to face towards a window sash. Thus, the window sash can be embedded into the accommodation groove 206 when the window sash needs to be closed. In this way, the window sash can be closed easily, and it is possible to prevent the window sash from not being normally opened or closed due to installation of the window air conditioner 1000, thereby realizing effective isolation and heat preservation of an indoor space from an outdoor space.

Optionally, the electric control box 3 in the present disclosure is mounted within the outer casing 22.

Optionally, the electric control box 3 is arranged adjacent to the inner casing 21 in the outer casing 22. Therefore, the outer casing 22 may provide a larger space to a heat dissipation structure for facilitating heat dissipation.

The outer casing 22 has an air inlet 203 and an air outlet 204. Here, the air inlet 203 is formed at a top of the outer casing 22 (away from the base 1), and is arranged opposite to the electric control box 3 or arranged to be misaligned with the electric control box 3. Here, the air inlet 203 may be arranged opposite to a radiator 35, for example, the air inlet 203 is opposite to a heat dissipation fin 352, such that an airflow flowing into the outer casing 22 will be discharged after passing through the radiator 35 or the electric control box 3, so as to realize heat dissipation of the electric control box 3.

Optionally, FIG. 1 is a schematic view of a window air conditioner 1000 according to an embodiment of the present disclosure. Here, the outer casing 22 includes an outer housing 221, an outdoor heat exchanger 222, and an outdoor air duct assembly 223. The outer housing 221 is closed by the outdoor heat exchanger 222 at a side thereof facing away from the inner casing 21. The outdoor air duct assembly 223 is arranged at an inner side of the outdoor heat exchanger 222 (a side adjacent to the inner casing 21). The outdoor air duct assembly 223 includes an outdoor motor 224 and an axial fan blade 225. The axial fan blade 225 is opposite to the outdoor heat exchanger 222. The outdoor motor 224 is arranged at an inner side of the axial fan blade 225 and is connected to the axial fan blade 225. The outdoor air duct assembly 223 also includes a rear enclosure plate 227 mounted at the base 1, and the outdoor motor 224 is fixed on the rear enclosure plate 227. At least one of a top surface (a surface at a side facing away from the base 1), a left side surface, a right side surface and a rear end surface of the outer housing 221 has an airflow inlet for allowing an airflow to pass therethrough. The airflow is driven by the outdoor air duct assembly 223 to pass through the airflow inlet, the electric control box 3, the outdoor air duct assembly 223, and a condenser to form a heat exchange passageway to dissipate heat of the outdoor heat exchanger 222, the electric control box 3, and the like.

The inner casing 21 includes an inner housing 211, the indoor heat exchanger 212, and an indoor air duct assembly. Here, the inner casing 21 has an air return port 201 and an air supply port 202 formed thereon. The indoor air duct assembly is arranged within the inner housing 211 and is configured to drive the airflow to flow from the air return port 201 to the air supply port 202. The air return port 201 is arranged at a surface of the inner housing 211 facing away from the outer casing 22. In addition, the air return port 201 may also be arranged at the base 1 or arranged at other surfaces of the inner casing 21. The indoor heat exchanger 212 is arranged between the indoor air duct assembly and the air return port 201. The inner casing 21 also includes a control box 213 arranged at an end of the inner casing 21 facing away from the outer casing 22. The indoor air duct assembly includes a cross-flow fan 214. In addition, the air supply port 202 is disposed at an upper part of a side of the inner housing 211 facing away from the outer casing 22, and the air supply port 202 is configured to supply the air in a direction away from the outer casing 22. Alternatively, the air supply port 202 may also be disposed to face away from the outer casing 22 and to be inclined in a direction away from the base 1.

An air deflector 215 is disposed at the air supply port 202. The air deflector 215 is rotatable to adjust an air supply angle. In addition, the air deflector 215 may also have a transverse swing blade 216 provided at an inner side thereof. A protective net cover 217 is disposed at an inner side of the air supply port 202 to prevent hands or other objects from entering an interior of an air duct.

A middle partition plate 23 is arranged between the inner casing 21 and the outer casing 22. The middle partition plate 23 is arranged within a space between the inner casing 21 and the outer casing 22 adjacent to the base 1. A passageway, through which at least one of a waterflow, a wire bundle, a refrigerant pipe and the like passes, is formed between the middle partition plate 23 and the base 1, so as to realize communication and signal transmission between the inner casing 21 and the outer casing 22.

Optionally, in the embodiment as described above, the window sash may be closed through the accommodation groove 206. Although the window sash can be closed, a gap may be generated between the window sash and the window frame due to the base 1 and a connection structure between the inner casing 21 and the outer casing 22.

Optionally, the window air conditioner 1000 of the present disclosure also includes a sealing block. The sealing block is configured to be arranged at at least one of two opposite sides of the base 1 in an unfolded position to seal the gap between the window sash and the window frame. An un-sealable part between the window sash and the window frame can be sealed by the sealing block, thereby achieving effective sealing to the indoor space and reduction in leakage of cold or hot air.

Optionally, the sealing block also has a folded position in which the sealing block is accommodated within the casing assembly 2. Optionally, the sealing block of the present disclosure may be configured to be accommodated in the accommodation groove 206 in the folded position.

Optionally, a fastener in the present disclosure may be a screw, a pin, a rivet or the like.

Optionally, in conjunction with the above embodiments and FIG. 1 to FIG. 7, the outer casing 22 includes an outer housing 221. Further, the outer housing 221 includes an enclosure plate 227 and a top cover 228. The enclosure plate 227 is connected to the base 1 and extends in a direction perpendicular to the base 1. The top cover 228 covers and closes a side of the enclosure plate 227 away from the base 1. The top cover 228 and the enclosure plate 227 are connected to each other by the fastener. Here, the electric control box 3 has a vacated recess 3012 formed at a position thereon corresponding to the fastener for connecting the enclosure plate 227 and the top cover 228. With the vacated recess 3012, the fastener is easily connected to the top cover 228 and the enclosure plate 227, thereby improving a structural strength of the outer casing 22. In addition, it is possible to avoid a surface of the electric control box 3 from being scratched by the fastener, and thus prevent rust or corrosion from being generated on the surface of the electric control box 3 due to paint peeling.

Optionally, the enclosure plate 227 is convex outwardly in a position opposite to the vacated recess 3012. Therefore, a connection between the enclosure plate 227 and the top cover 228 is facilitated, and the connection between the enclosure plate 227 and the top cover 228 by the fastener is also facilitated.

Figure 5:
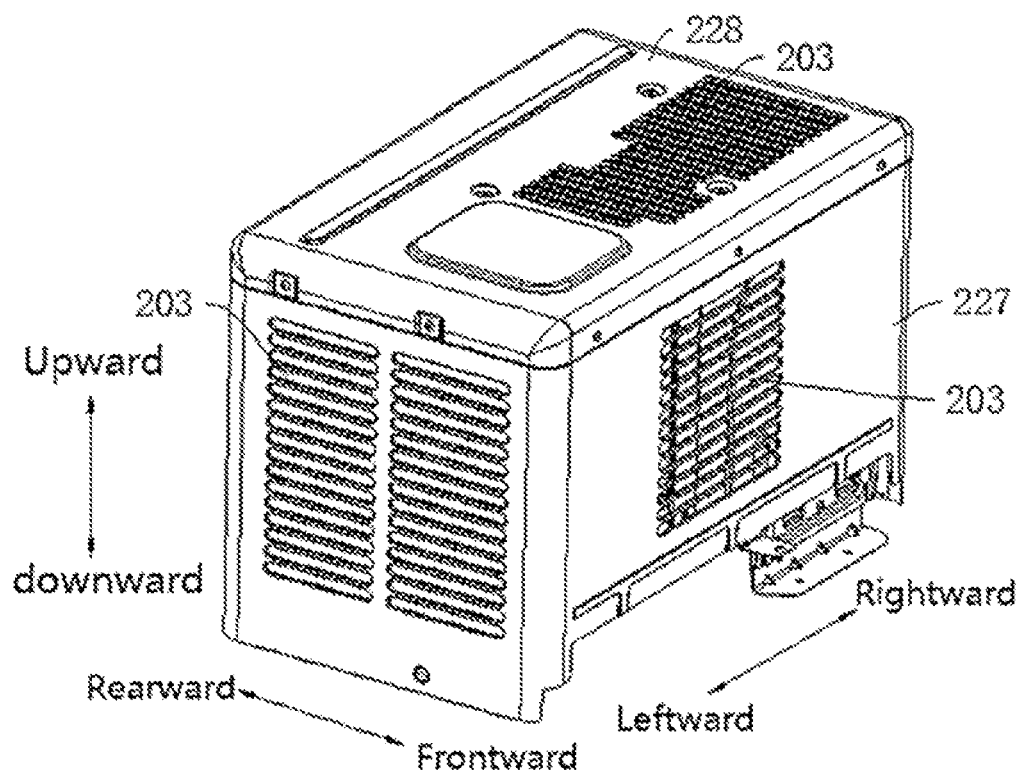
FIG. 5 is a schematic view of an assembly between an outer housing and an electric control box in a window air conditioner according to an embodiment of the present disclosure.
Figure 6:
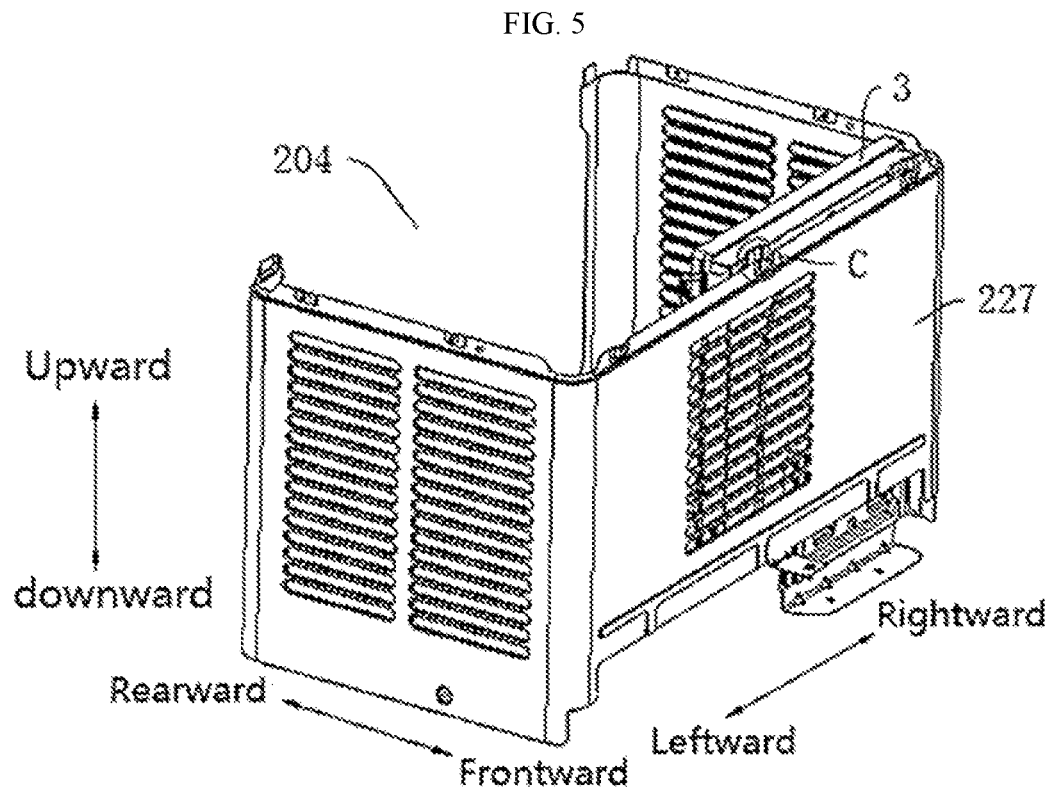
FIG. 6 is a schematic view of an assembly between an outer housing and an electric control box in a window air conditioner according to an embodiment of the present disclosure.
Figures 1, 6:
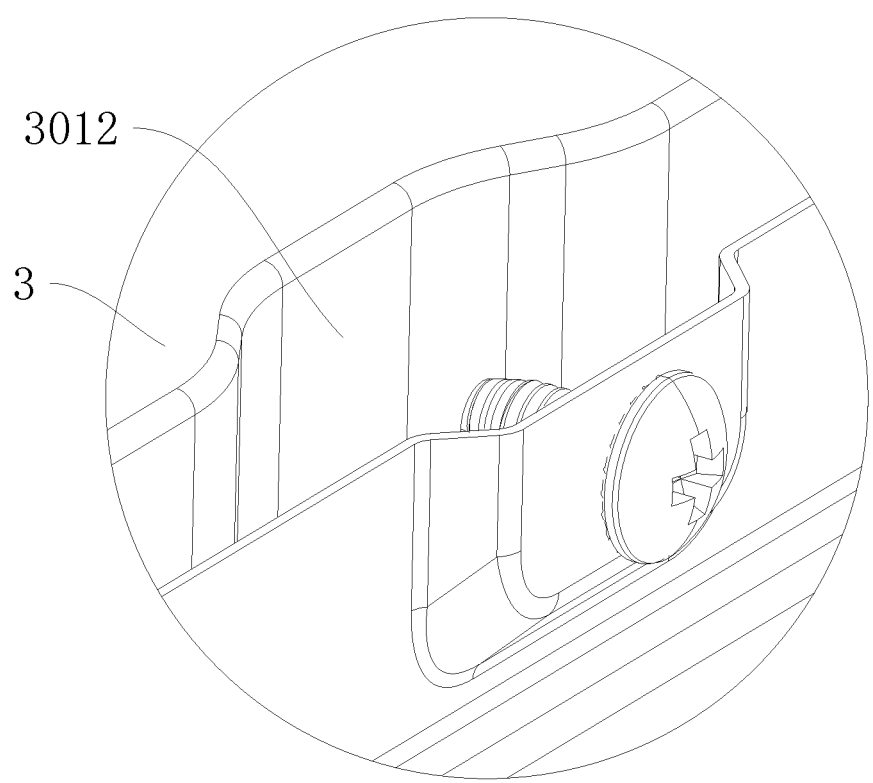

FIG. 5 and FIG. 6 show schematic views of the outer housing 221 and a cooperation of the outer housing 221 with an electric control board. The outer housing 221 includes the enclosure plate 227 and the top cover 228. The enclosure plate 227 is formed into a U-shaped structure, and has an opening closed by the outdoor heat exchanger 222. Each of the three side surfaces of the enclosure plate 227 and the top cover 228 has the air inlet 203. The electric control box 3 is disposed adjacent to a side wall of the outer housing 221 close to the inner casing 21 and has the vacated recess 3012 provided thereon. The outer housing 221 is convex outwardly in the position corresponding to the vacated recess 3012.

An installation structure of the electric control box 3 in the embodiments of the present disclosure will be described below with reference to the accompanying drawings. In some embodiments of the present disclosure, the electric control box 3 may also be mounted at the base 1. The electric control box 3 may be inserted into the base 1 and positioned at the base 1 by the fastener. For example, after the electric control box 3 is inserted into the base 1, a pre-positioning of the electric control box 3 relative to the base 1 is implemented. Then, the electric control box 3 and the base 1 are fixedly connected to each other by the fastener.

In the window air conditioner 1000 according to the embodiments of the present disclosure, the electric control box 3 is positioned at the base 1 through a combination of the insertion and positioning by the fastener, a stability of the electric control box 3 thus can be improved. That is, the base 1 can provide a stable support to the electric control box 3. Therefore, a rapid installation of the electric control box 3 can be realized through the insertion and the positioning by the fastener. Moreover, the insertion can provide a certain pre-positioning, through which the electric control box 3 can be rapidly positioned relative to the base 1 by the fastener.

In conjunction with the above embodiments, the electric control box 3 is arranged in the outer housing 221 and on an inner side of the rear enclosure plate 227 or the outdoor air duct assembly 223 (i.e., a side close to the inner casing 21).

In the present disclosure, the electric control box 3 is inserted into the base 1 by a latch 301 at a one side of a bottom thereof, and is connected to the base 1 by the fastener such as screws at the other side of the bottom thereof. The latch 301 is disposed at a side, close to the compressor 229, of a bottom of a plastic inner housing of the electric control box 3, and the base 1 has an insertion opening 101 corresponding to the latch 301.

Optionally, as shown in FIG. 7 to FIG. 10, the insertion opening 101 is formed at the base 1. The insertion opening may be arranged to be opened in a transverse direction (see a leftward-rightward direction in the drawings), and the latch 301 is disposed at an end of the bottom of the electric control box in the transverse direction. The latch 301 is inserted into the insertion opening 101 in the transverse direction and is parallel to the base 1 in the transverse direction. Through a cooperation between the insertion opening 101 and the latch 301 parallel to the base 1, the latch 301 can be quickly inserted into the base 1, and the electric control box 3 and the base 1 can be conveniently connected by the fastener.

Of course, the insertion opening 101 of the present disclosure may also be arranged perpendicular to the base 1. In this case, the latch 301 on the electric control box 3 may be formed into a hook shape. That is, the electric control box 3 can be connected to the base 1 in an insertion way and positioned to the base 1, by inserting the latch 301 into the insertion opening 101 and hooking the base 1 by the latch 301. The present disclosure is mainly described by taking the insertion opening 101 extending in the transverse direction as an example, which is not intended to limit the scope of the present disclosure.

In addition, the electric control box 3 of the present disclosure may also be inserted into the base 1 by an insertion in a longitudinal direction (see a frontward-rearward direction in the drawings).

It should be noted that in the present disclosure, the transverse direction may refer to the leftward-rightward direction, the longitudinal direction may refer to the frontward-rearward direction, and a vertical direction may refer to an upward-downward direction, in the drawings.

Optionally, as shown in FIG. 7 to FIG. 10, a part of the base protrudes to form the insertion opening. Specifically, referring to the accompanying drawings, a part of the base protrudes upwardly to form the insertion opening, and an edge of a top wall of the insertion opening extends obliquely to form a flare shape. Specifically, the edge of the top wall of the insertion opening 101 is formed into a form of an upwardly inclined extension, and an opening of the insertion opening 101 is formed into a flare form. In this way, the latch 301 can quickly cooperate with the insertion opening 101 during latch 301 inserting into the insertion opening 101, which facilitates the quick cooperation between the latch 301 and the insertion opening 101, and improves assembly efficiency.

Optionally, as shown in FIG. 7 to FIG. 10, a notch 102 is formed at an edge of a side wall of the insertion opening 101. As shown, a notch is formed at each of a front side wall and a rear side wall of the insertion opening 101. In this way, the insertion opening 101 can be formed into a larger flare shape at the opening, which further facilitates the cooperation between the latch 301 and the insertion opening 101, so that the latch 301 can be quickly inserted into the insertion opening 101 to realize a rapid position between the latch 301 and the insertion opening 101.

Optionally, as shown in FIG. 7 to FIG. 10, the electric control box 3 has a vacated notch 309 formed at a position opposite to the insertion opening 101. The vacated notch 309 can provide a recessed structure such as a vacated insertion opening 101, a vacated wire-routing structure or the like, and can also provide a larger installation space for easy observation. The vacated notch 309 has a first surface opposite to the insertion opening 101 in a direction perpendicular to the base 1 (a vertical direction, or the upward-downward direction in the drawings) and a second surface opposite to the insertion opening 101 in the transverse direction. A connection member 3043 is disposed at the vacated notch 309. The connection member 3043 is connected to each of the first surface and the second surface, and the latch 301 is connected to the connection member 3043. That is, the latch 301 is arranged at the vacated notch 309, which facilitates the quick cooperation between the latch 301 and the insertion opening 101, and improves a structural strength at the vacated notch 309 through a connection of the connection member 3043. Further, an overall structure of the electric control box 3 is simplified.

Optionally, as shown in FIG. 7 to FIG. 10, the connection member 3043 includes a first connection rod 3044. The first connection rod 3044 is connected to the first surface and extends towards the insertion opening 101 (refer to the downward direction in the drawings). The latch 301 is connected to a free end of the first connection rod 3044. Therefore, the latch 301 can be conveniently inserted into the insertion opening 101. Moreover, by arranging the vacated notch 309, a larger visual space can be provided, which facilitates the insertion operation.

In addition, as shown in FIG. 7 to FIG. 10, the connection member 3043 also includes a second connection rod 3045. The second connection rod 3045 is connected to the second surface, extends towards the insertion opening 101 and is connected to the first connection rod 3044. A connection between the second connection rod 3045 and the first connection rod 3044 can effectively improve a structural strength of the first connection rod 3044, i.e., improve a structural strength of the latch 301 and the positioning stability of the latch 301 relative to the base 1.

In addition, as shown in FIG. 7 to FIG. 10, the connection member 3043 also includes a reinforcement rib 3046 connected among the first surface, the second surface, the first connection rod 3044 and the second connection rod 3045. By arranging the reinforcement rib 3046, a structural strength of each of the connection member 3043 and the electric control box 3 can be effectively improved while the structural strength of the latch 301 can be improved.

In addition, the reinforcement rib 3046 of the present disclosure has an annular hollow structure, a U-shaped structure, a T-shaped structure or the like. By arranging the reinforcement rib 3046, an airflow passageway can be formed on the connection member 3043, so that the airflow can pass through the airflow passageway to enhance the heat dissipation of the electric control box 3.

In addition, a wire outlet 3013 is disposed at the vacated notch 309. A wire bundle or the like can be drawn out from the wire outlet 3013. A wire can be easily routed by constructing a shape of the reinforcement rib 3046. For example, the reinforcement rib 3046 is constructed in a U-shape extending along the first connection rod 3044, the second connection rod 3045 and the second surface.

Optionally, as shown in FIG. 1 to FIG. 10, the base 1 has a first bump 11 provided thereon, and the insertion opening 101 is formed at a top wall of the first bump 11. In this way, after the latch 301 is inserted into the insertion opening 101, a predetermined space may be formed between the latch 301 and a bottom surface of the base 1, such that the latch 301 cannot protrude from the bottom surface of the base 1, thereby ensuring that the base 1 can be stably supported on other equipment or structures. In addition, by arranging the first bump 11, water or the like can be prevented from entering the electric control box 3 under an action of siphon or the like.

Optionally, as shown in FIG. 7 to FIG. 10, the electric control box 3 has a mounting member provided at the other end of the bottom thereof in the transverse direction. The mounting member 302 is connected to the base 1 by the fastener and is parallel to the base 1 in the transverse direction. Thus, the mounting member 302 and the base 1 are conveniently connected to each other by the fastener.

Optionally, as shown in FIG. 7 to FIG. 10, the mounting member 302 protrudes longitudinally from each of opposite sides of the electric control box 3. That is, the mounting member 302 protrudes from each of a front side and a rear side of the electric control box 3. In this way, the mounting member 302 and the base 1 can be conveniently connected by the fastener, thereby effectively improving a connection efficiency between the electric control box 3 and the base 1.

In addition, a plurality of fasteners on the mounting members 302 on opposite sides of the electric control box 3 are arranged in a triangular shape. With the triangular arrangement of the fasteners, a stable positioning structure 3019 can be formed, which facilitates the stable connection between the electric control box 3 and the base 1.

Of course, in the present disclosure, the triangular arrangement of the fasteners is only an embodiment of the present disclosure, and the fasteners for connecting the electric control box 3 and the base 1 in the present disclosure may also be arranged in a quadrangle or other polygonal shapes, or even only one or two fasteners may be provided. Thus, the quick positioning of the electric control box 3 and the base 1 can also be realized through the cooperation of the fasteners and the insertion.

Optionally, as shown in FIG. 7 to FIG. 10, the base 1 also have a second bump 12 provided thereon, and the second bump 12 is connected to the mounting member 302. The second bump 12 is configured to support the electric control box 3, thereby preventing condensed water on the base 1 from entering the electric control box 3. Moreover, an installation of the electric control box 3 can also be facilitated, and it is possible to prevent the fasteners from forming a protrusion structure on a bottom surface of the base 1, which effectively improves the stability of the cooperation between the electric control box 3 and the base 1 and facilitates an installation of the base 1 on other equipment or structures.

Optionally, the second bump 12 has a groove (not shown) formed thereon. The groove faces the electric control box 3 and recessed away from the electric control box 3. Thus, a cooperating area between the electric control box 3 and the base 1 can be reduced, so as to facilitate the stable cooperation between the electric control box 3 and the base 1 and the passage of the airflow between the electric control box 3 and the base 1, thereby avoiding heat accumulation and facilitating the heat dissipation.

Optionally, in the present disclosure, the first bump 11 has a height greater than that of the second bump 12. That is to say, the insertion structure of the electric control box 3 is located on a different plane from the connection structure of the fasteners, thereby more conveniently positioning the electric control box 3 on the base 1 and improving the positioning efficiency and effect of the electric control box 3.

Figure 8:
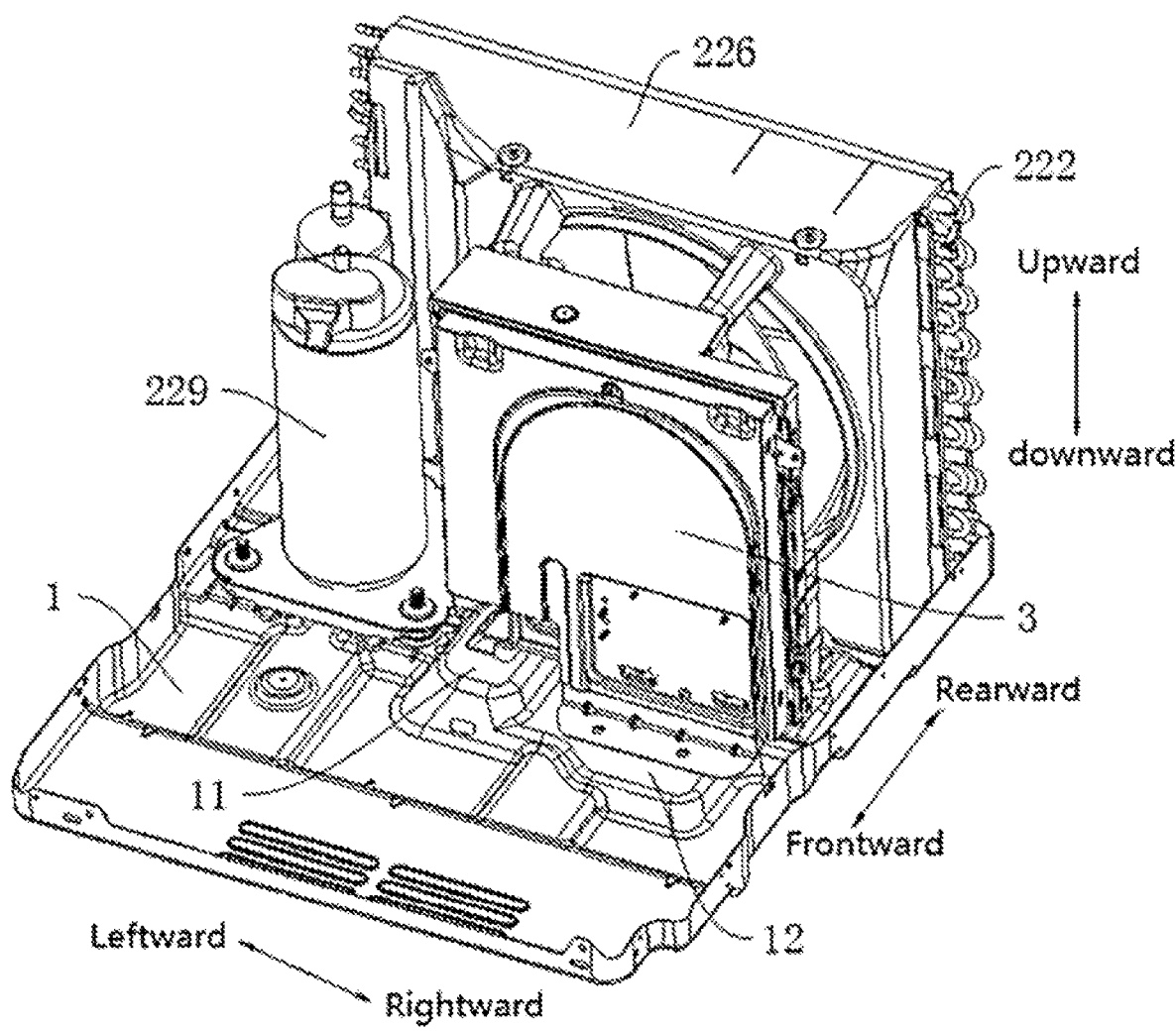
FIG. 8 is a schematic view of an assembly between an electric control box and a base in a window air conditioner according to an embodiment of the present disclosure.

Optionally, as shown in FIG. 8, the casing assembly 2 includes the compressor 229 configured to provide power for flowing a heat exchange refrigerant. The electric control box 3 is disposed adjacent to the compressor 229. That is, the electric control box 3 is disposed in a part of the outer casing 22. The electric control box 3 is inserted into the based 1 at an end of the bottom portion thereof adjacent to the compressor 229, and is positioned to the based 1 by the fastener at an end of the bottom thereof facing away from the compressor 229. By arranging the compressor 229, the installation space at the end of the electric control box 3 adjacent to the compressor 229 is relatively small, which is not suitable for connecting the electric control box 3 and the base 1 by the fastener. Since the insertion structure has relatively low installation space requirements, arranging the electric control box 3 for insertion at the end thereof close to the compressor 229 and for connection by the fastener at the end thereof away from the compressor 229 can improve the cooperation efficiency between the electric control box 3 and the base 1, thereby facilitating the installation of the electric control box 3 onto the base 1.

FIG. 8 is a schematic view showing a positional relationship of the base 1, the outdoor air duct assembly 223, the electric control box 3 and the compressor 229 in the window air conditioner 1000 according to an embodiment of the present disclosure. Here, the outdoor air duct assembly 223, the electric control box 3, and the compressor 229 are all mounted at the base 1 and located at a rear end of the base 1. The electric control box 3 is located in front of the outdoor air duct assembly 223. The base 1 has an opening for ventilation provided at a front end thereof. The electric control box 3 is inserted into the base 1 at the end thereof adjacent to the compressor 229, and is fixedly connected to the based 1 by the fastener (a screw or the like) at the end thereof away from the compressor 229. The base 1 is provided with the first bump 11 and the second bump 12, and the electric control box 3 is inserted into the first bump 11, and connected to the second bump 12 by the fastener.

Optionally, the electric control box 3 is arranged vertically on the base 1. Thus, it is possible to facilitate the heat dissipation of the electric control box 3, and a space occupied by the electric control box 3 can also be reduced, thereby improving utilization rate of the space.

A structure of the electric control box 3 of the present disclosure will be described below with reference to the accompanying drawings. The electric control box 3 is applied to the window air conditioner 1000 of any one of other embodiments of the present disclosure, and can also be applied to other air conditioners, fresh air fans, kitchen appliances and other equipment.

Figure 7:
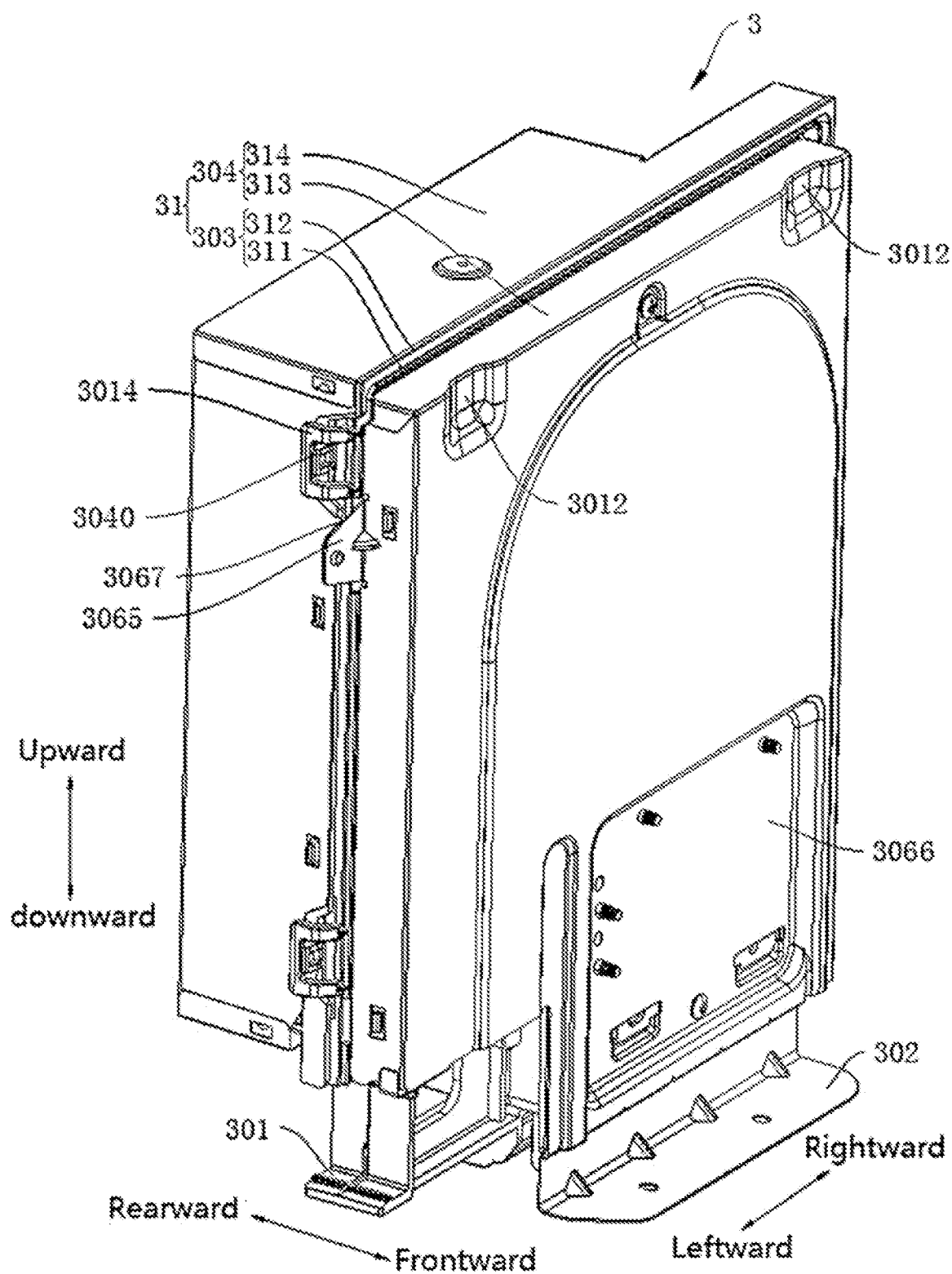
FIG. 7 is a schematic view of an electric control box according to an embodiment of the present disclosure.

As shown in FIG. 7, the electric control box 3 according to the embodiment of the present disclosure includes a box body 31. The box body 31 includes an insulation inner shell 303 having a cavity formed therein and a fireproof outer shell 304 configured to cover over the insulation inner shell 303. The insulation inner shell 303 can ensure an effective insulation between a circuit board 33 and the electric control box 3 to ensure a safety of the electric control box 3, and the fireproof outer shell 304 can effectively improve a fireproof performance of the electric control box 3, even if the electric control box 3 fails and burns, other parts of the air conditioner would not be damaged or a fire would not occur.

Here, the insulation inner shell 303 of the present disclosure may be a plastic inner shell, and the fireproof outer shell 304 may be a metal outer shell.

Optionally, as shown in FIG. 7 to FIG. 15, the insulation inner shell 303 includes a first inner shell 311 and a second inner shell 312 assembled with each other. Here, the first inner shell 311 and the second inner shell 312 are assembled with each other in the longitudinal direction. By assembling the first inner shell 311 and the second inner shell 312, the insulation inner shell 303 can be conveniently shaped, thereby facilitating installations of electronic components 331 and a circuit board 33 in the electric control box 3, improving an assembly efficiency of the electric control box 3, and providing easy maintenance.

Here, the assembling of the first inner shell 311 and the second inner shell 312 means that a relatively closed space is formed by the first inner shell 311 and the second inner shell 312.

Optionally, as shown in FIG. 7 to FIG. 15, the fireproof outer shell 304 includes a first outer shell 313 and a second outer shell 314. The first outer shell 313 is configured to cover over the first inner shell 311, and the second outer shell 314 is configured to cover the first outer shell 312. Thus, it is possible to effectively prevent fire, improve safety performance of the air conditioner, and facilitate the maintenance of the electric control box 3.

Optionally, in conjunction with the embodiments as described above, the first inner shell 311, the second inner shell 312, the first outer shell 313 and the first outer shell 313 are all arranged vertically on the base 1. The first inner shell 311 and the second inner shell 312 are assembled in a direction parallel to the base 1 (e.g., the above longitudinal direction). Therefore, the electric control box 3 is more conveniently mounted, thereby improving the assembly efficiency and stability of the electric control box 3.

Optionally, the first inner shell 311 may be made of a plastic material. For example, the first inner shell 311 is formed into an integral structure through an injection molding. In addition, the second inner shell 312 may also be made of a plastic material, and may also be formed into an integrated structure through the injection molding. The first outer shell 313 and the second outer shell 314 may be made of a metal material, for example, formed through sheet metal forming. In other words, in an alternative of the present disclosure, the first outer shell 313 and the second outer shell 314 are integrally formed by a sheet metal forming.

Optionally, the first inner shell 311 is connected to the second inner shell 312 through a snap connection or a screw connection. The first outer shell 313 is connected to the second outer shell 314 through the snap connection or screw connection. Thus, a stable connection structure is formed between the first inner shell 311 and the first outer shell 313, and between the second inner shell 312 and the second outer shell 314, thereby improving the stability of the box body 31.

Specifically, a first snap structure 3014 is disposed at an outer periphery of the first inner shell 311, and a second snap structure 3040 is disposed at an outer periphery of the second inner shell 312. The first snap structure 3014 is snapped with the second snap structure 3040. Optionally, one of the first snap structure 3014 and the second snap structure 3040 may be a hook, and the other may be a protrusion 3069. Thereof, the first inner shell 311 and the second inner shell 312 are quickly connected together stably by the snap structures.

Optionally, a first lug 3065 protrudes from the outer periphery of the first outer shell 313, and a second lug 3067 protrudes from the outer periphery of the second outer shell 314. The first lug 3065 and the second lug 3067 are fixedly connected to each other by the fastener. The first outer shell 313 and the second outer shell 314 can be stably connected together by the fastener. In addition, since the first outer shell 313 covers over the first inner shell 311 and the second outer shell 314 covers over the second inner shell 312, the entire box body 31 can be assembled stably through the connection between the first outer shell 313 and the second outer shell 314.

Optionally, the first inner shell 311 is snap-connected or screwed to the first outer shell 313. Specifically, the first inner shell 311 may have a protrusion provided at an outer side surface thereof, and the first outer shell 313 may have a through hole formed at a peripheral wall thereof. The first inner shell 311 can be snap-fitted with the first outer shell 313 through an engagement of the protrusion with the through hole. In addition, the first inner shell 311 may be connected to the first outer shell 313 through screw connection in combination or separately.

Optionally, the second inner shell 312 is snap-connected or screwed to the second outer shell 314. Specifically, the second inner shell 312 may have a protrusion provided at an outer side surface thereof, and the second outer shell 314 may have a through hole formed at a peripheral wall thereof. The second inner shell 312 can be snap-fitted with the second outer shell 314 through an engagement of the protrusion with the through hole. In addition, the second inner shell 312 may be connected to the second outer shell 314 through screw connection in combination or separately.

In addition, the first inner shell 311 may also be connected to the second inner shell 312 by the fastener, and the first outer shell 313 may be also connected to the second outer shell 314 through a snap connection. In the present disclosure, any one of the first inner shell 311 and the first outer shell 313, the second inner shell 312 and the second outer shell 314, the first inner shell 311 and the second inner shell 312, and the first outer shell 313 and the second outer shell 314 may also be connected by a combination of snaps and fasteners.

Here, each of the first outer shell 313 and the second inner shell 312 of the present disclosure may have a structure such as the mounting member 302 as described above. For example, the aforementioned latch 301 is disposed at the insulation inner shell 303 and protrudes from the fireproof outer shell 304, and the aforementioned connection member 3043 is also disposed at the insulation inner shell 303 and protrudes from the fireproof outer shell 304, so as to facilitate a molding of the latch 301 and the connection member 3043.

In addition, from another point of view, the box body 31 may be composed of a box base 305 and a box cover 306. Here, the box base 305 may be composed of the first inner shell 311 and the first outer shell 313, and the box cover 306 may be composed of the second inner shell 312 and the second outer shell 314.

Optionally, in conjunction with the embodiments as described above, the box body 31 is provided with the connection member 3043. Here, the connection member 3043 may be disposed at the second inner shell 312 without being covered by the fireproof outer shell 304. The mounting member 302 as described above may be formed on the fireproof outer shell 304.

Here, the latch 301 is disposed at the second inner shell 312. The latch 301, the connection member 3043 and the second inner shell 312 are integrally injection-molded. The first outer shell 313 is provided with the mounting member 302 extending in a direction facing away from the second outer shell 314. The first inner shell 311 is provided with the mounting member 302 at a bottom thereof, and the mounting member 302 extends in a direction facing away from the first outer shell 313 at one end thereof. Each of the two mounting members 302 are connected to the base 1 by the fastener.

Figure 9:
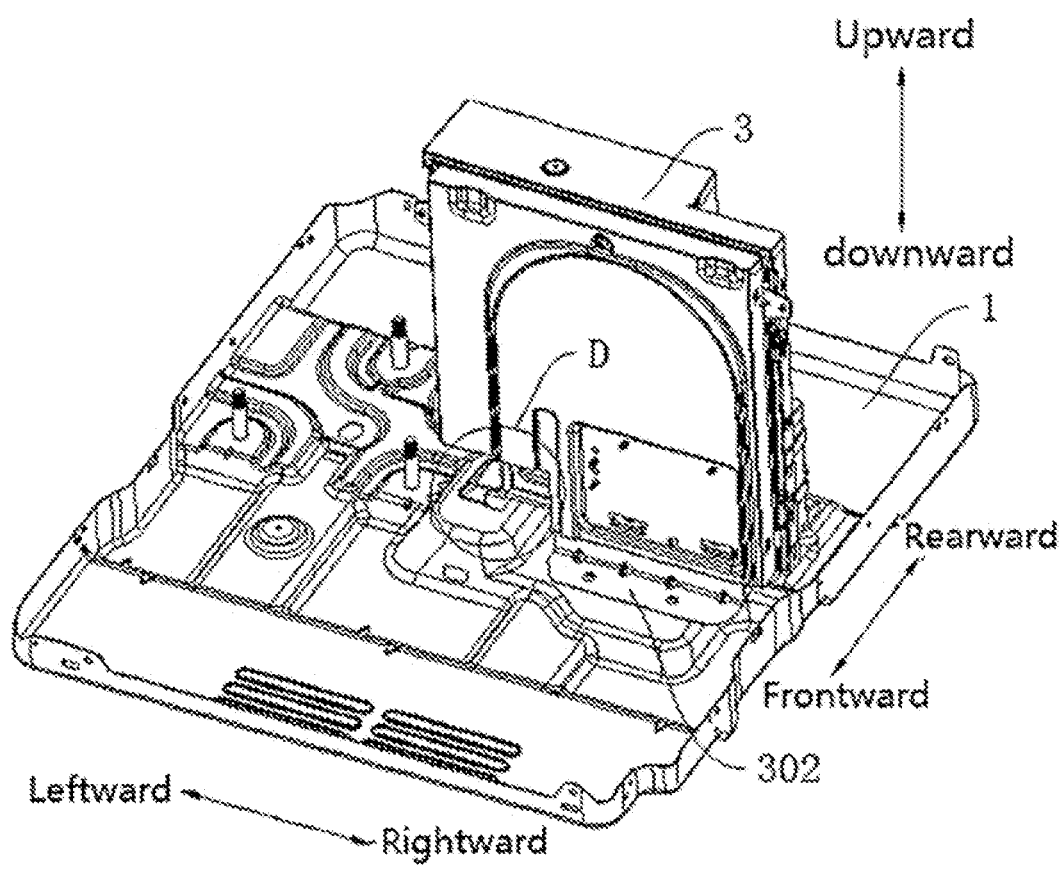
FIG. 9 is a schematic view of an assembly between an electric control box and a base in a window air conditioner according to an embodiment of the present disclosure.
Figures 1, 9:
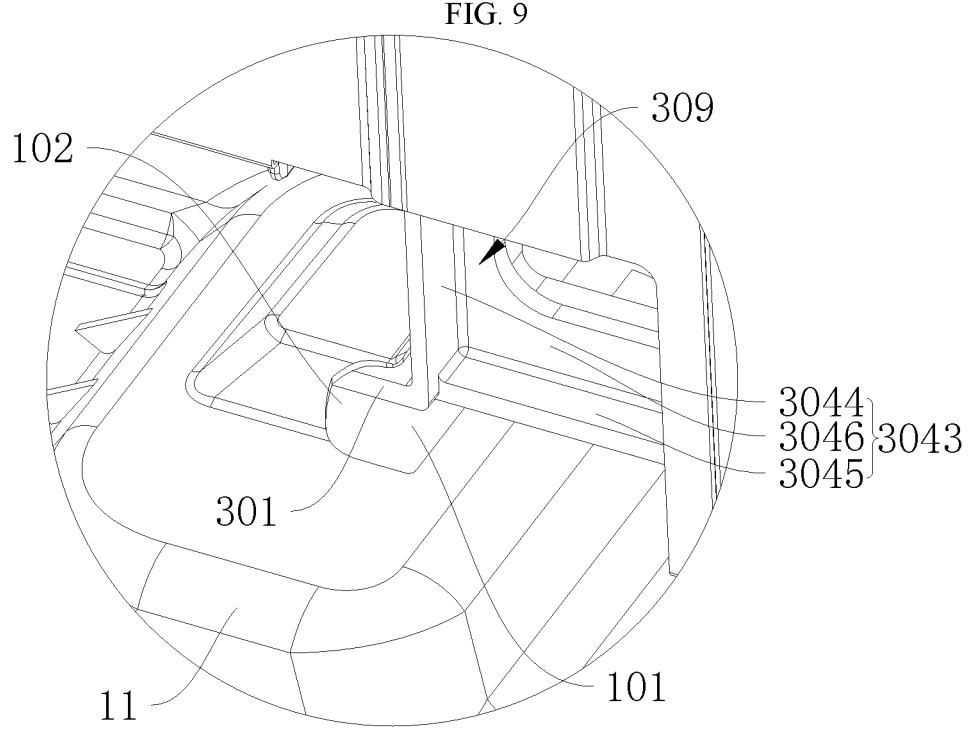
Figure 10:
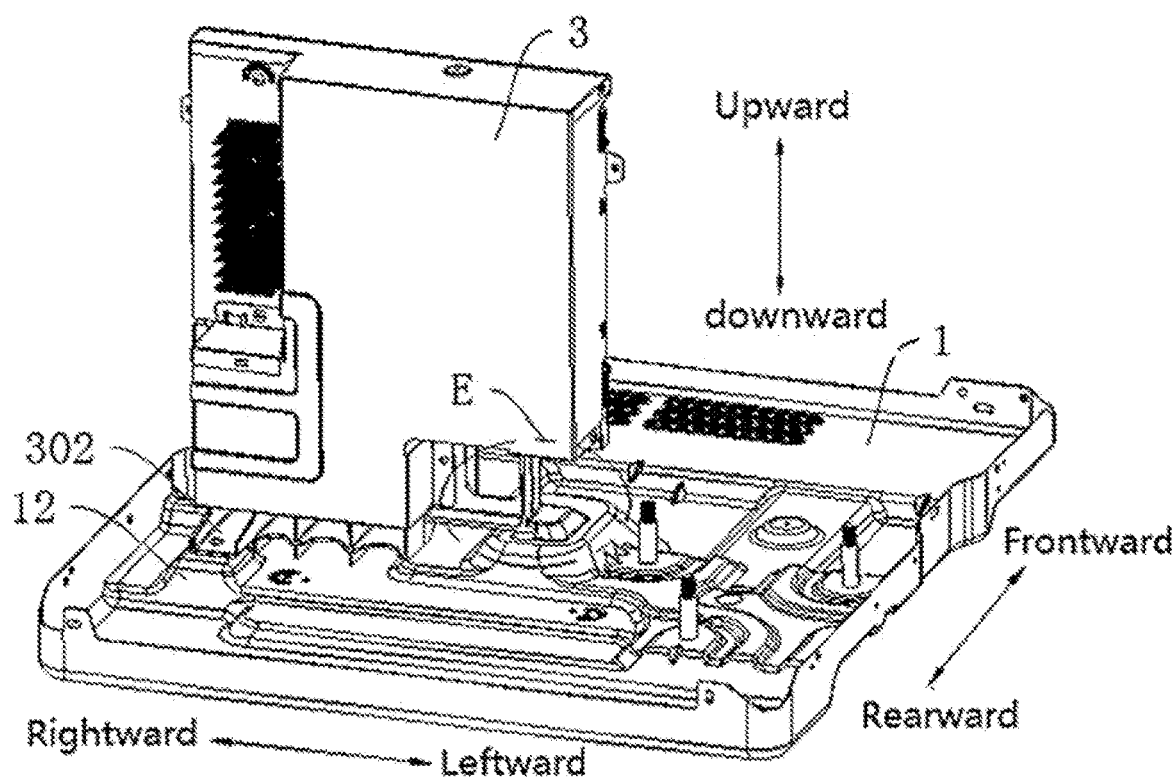
FIG. 10 is a schematic view of an assembly between an electric control box and a base in a window air conditioner according to an embodiment of the present disclosure.
Figures 1, 10:
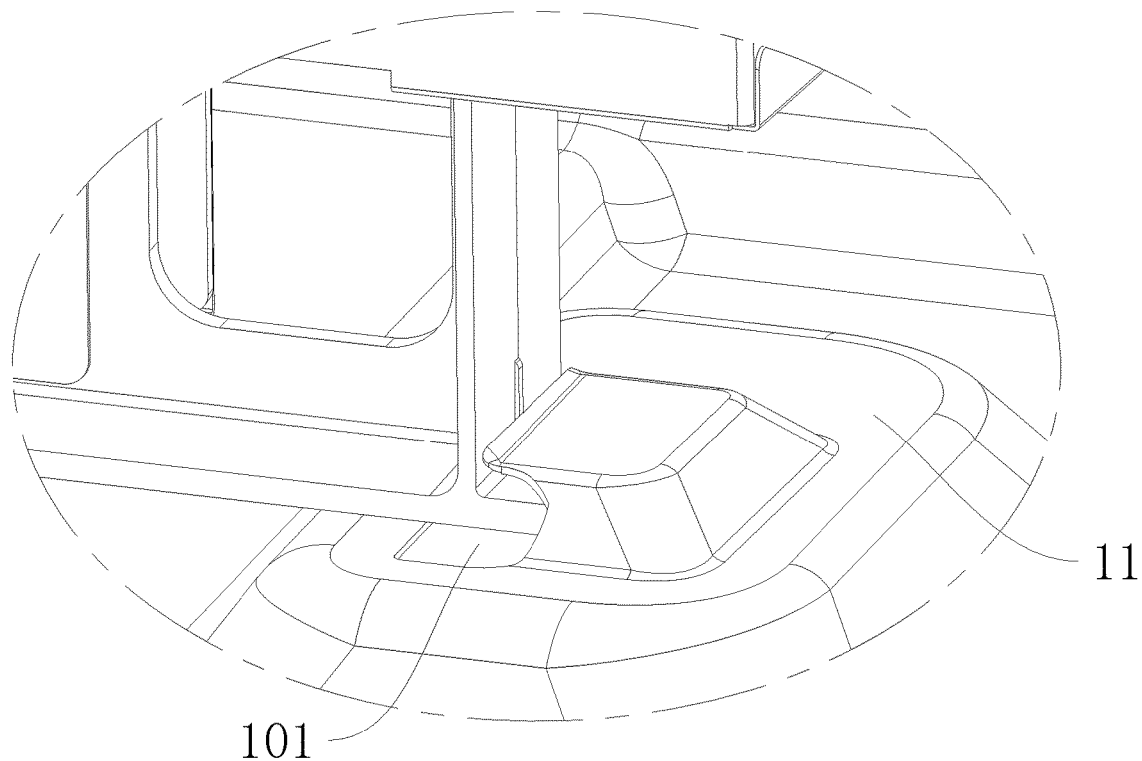
Figure 11:
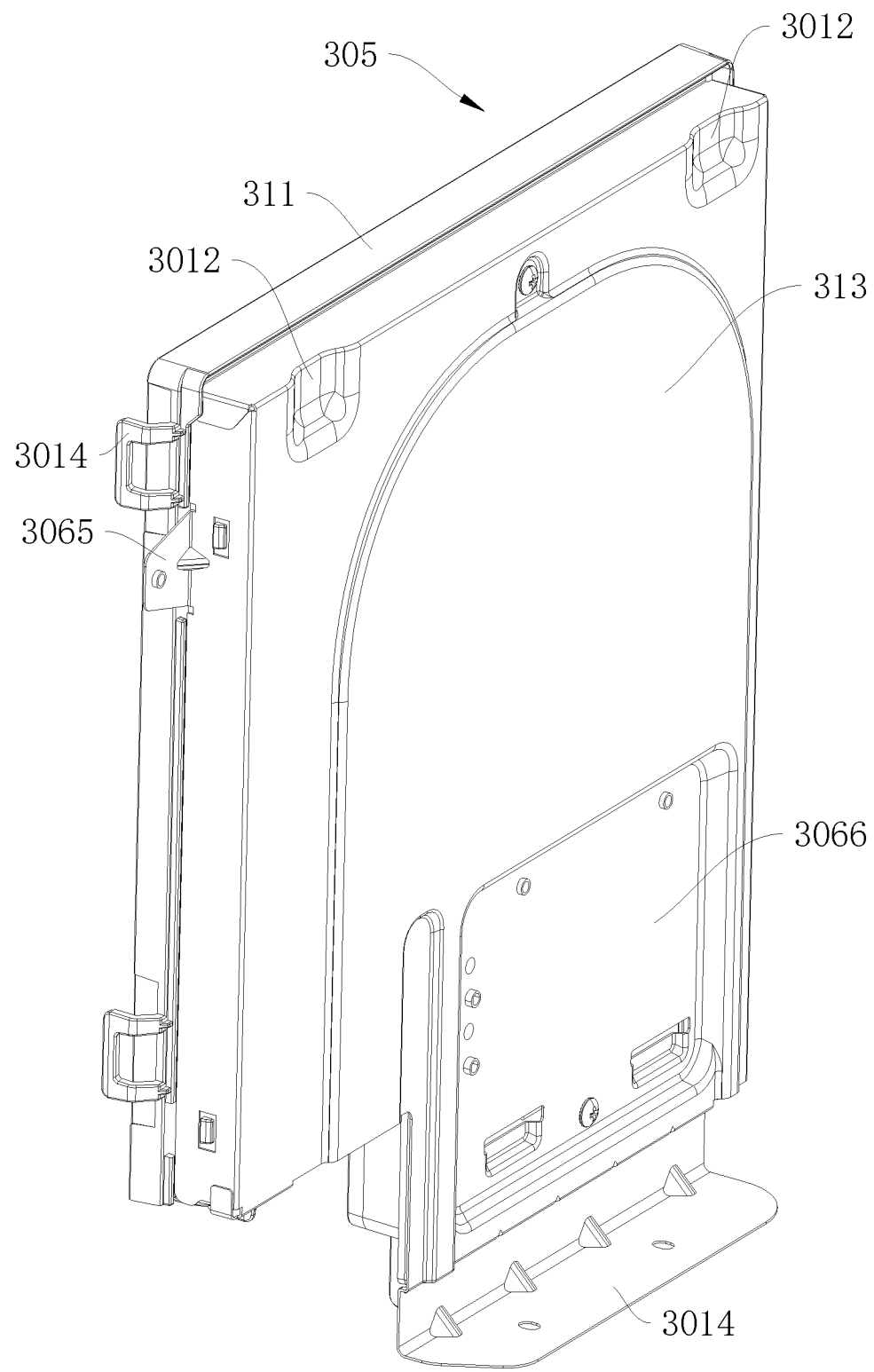
FIG. 11 is a schematic view of a box base of an electric control box according to an embodiment of the present disclosure.

FIG. 9 and FIG. 10 are schematic views of an assembly structure of the base 1 and the electric control box 3 in a window air conditioner in different orientations according to an embodiment of the present disclosure, FIG. 9-1 is a schematic partial enlarged view of a circled region D in FIG. 9, and FIG. 10-1 is a schematic partially enlarged view of a circled region E in FIG. 10. Here, as shown in FIG. 9 and FIG. 10, the insertion opening 101 is provided at the first bump. Here, the insertion opening 101 is constructed into the flare form, and the notch 102 is arranged at the edge of each of the front and rear sides of the insertion opening 101. The electric control box 3 is provided with the vacated notch 309, and the connection member 3043 with a hollow structure composed of the first connection rod 3044, the second connection rod 3045 and the reinforcement rib 3046 is arranged within the second insertion opening 101, and the latch 301 is connected to an end of the first connection rod 3044.

Figure 12:
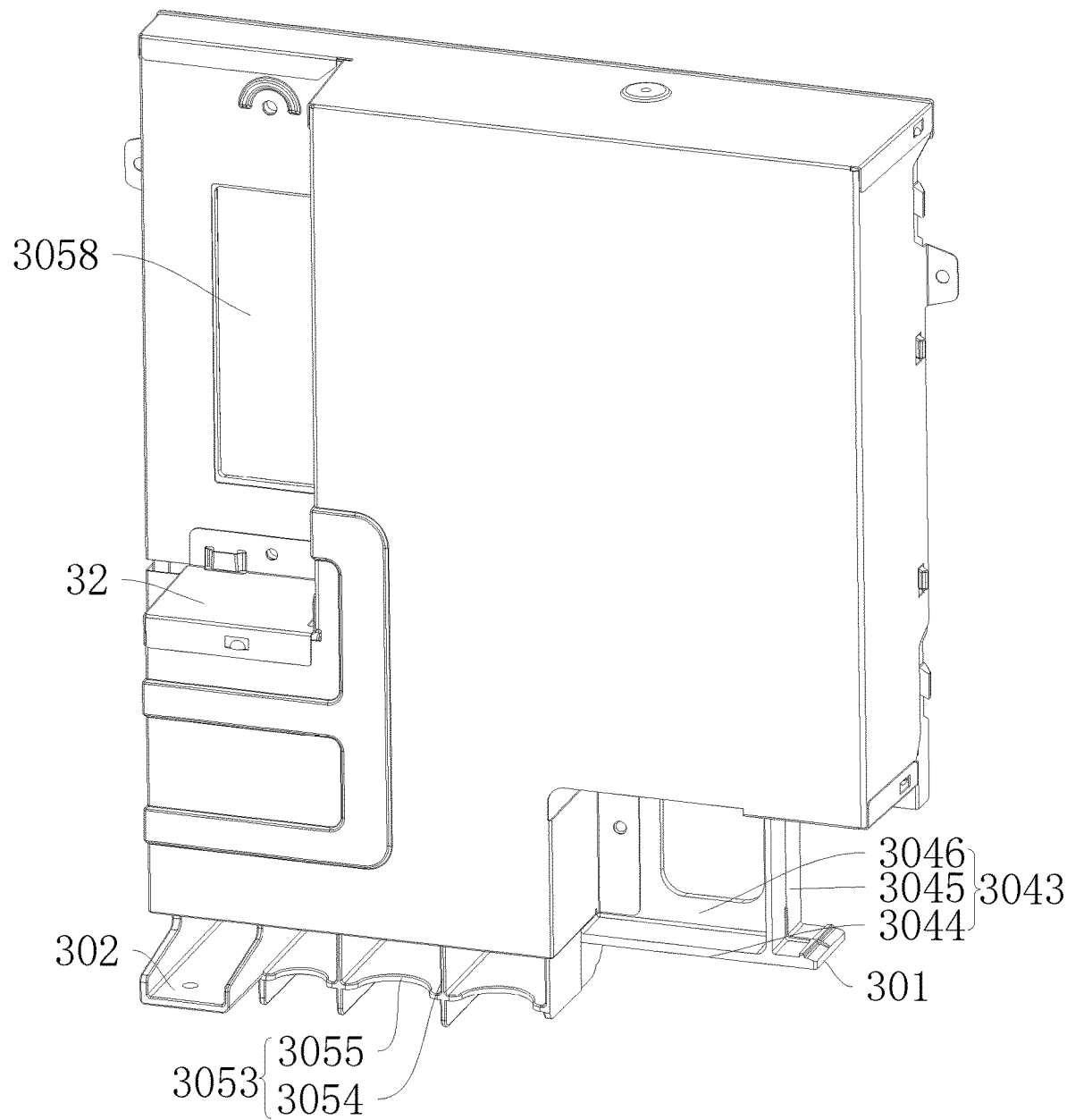
FIG. 12 is a schematic view of a box cover of an electric control box according to an embodiment of the present disclosure.
Figure 13:
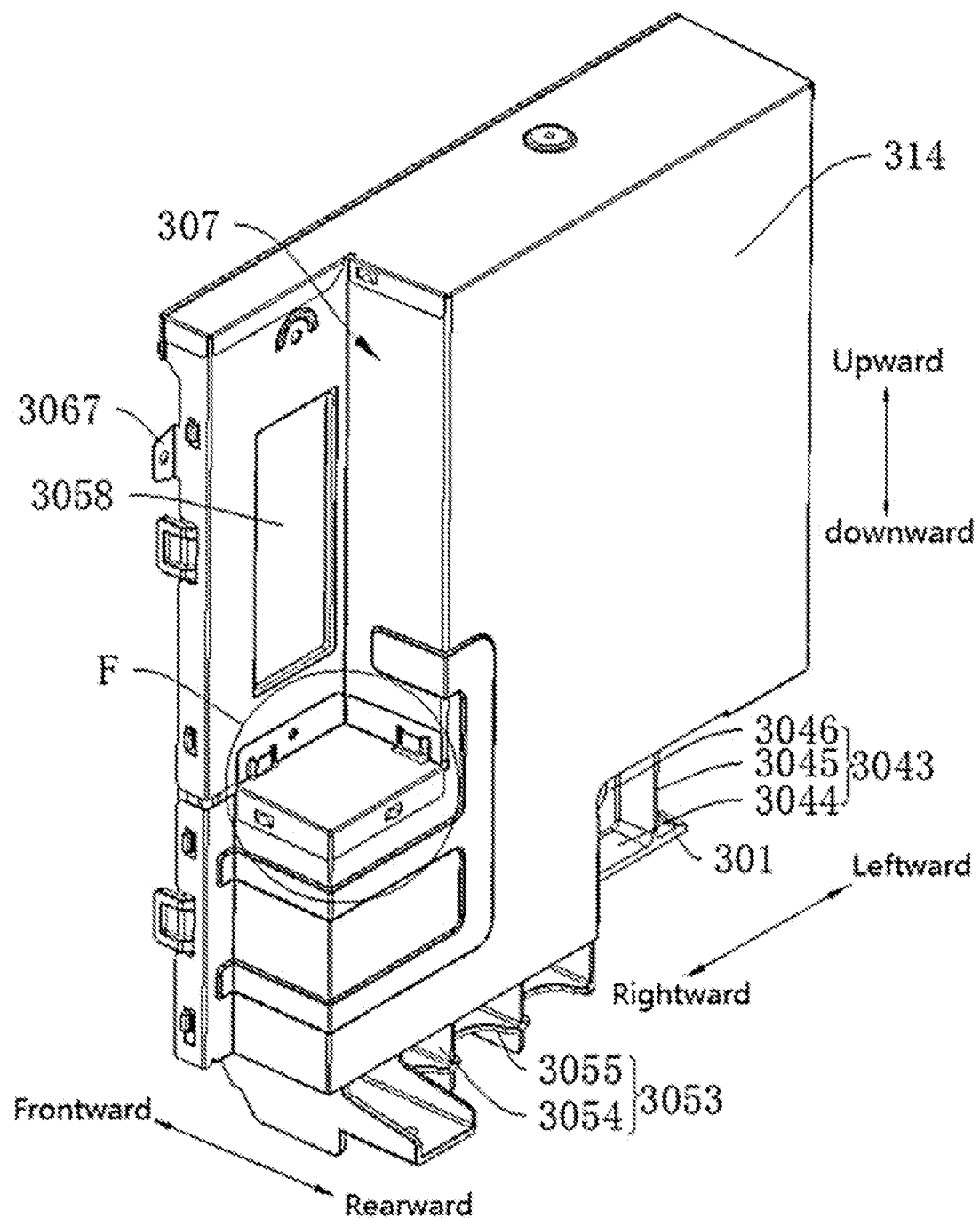
FIG. 13 is a schematic view of a box cover of an electric control box according to an embodiment of the present disclosure.
Figures 1, 13:
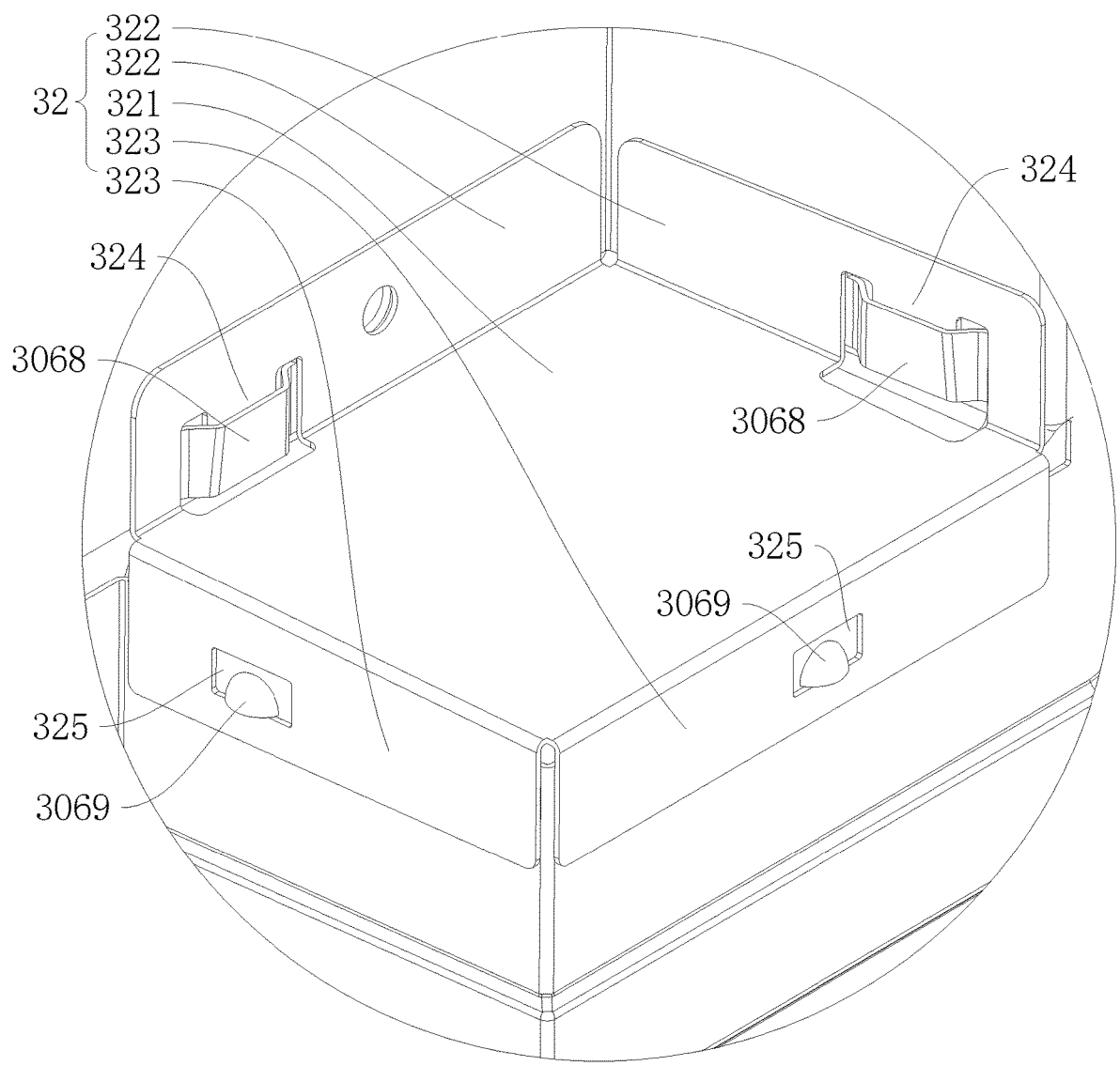
Figure 14:
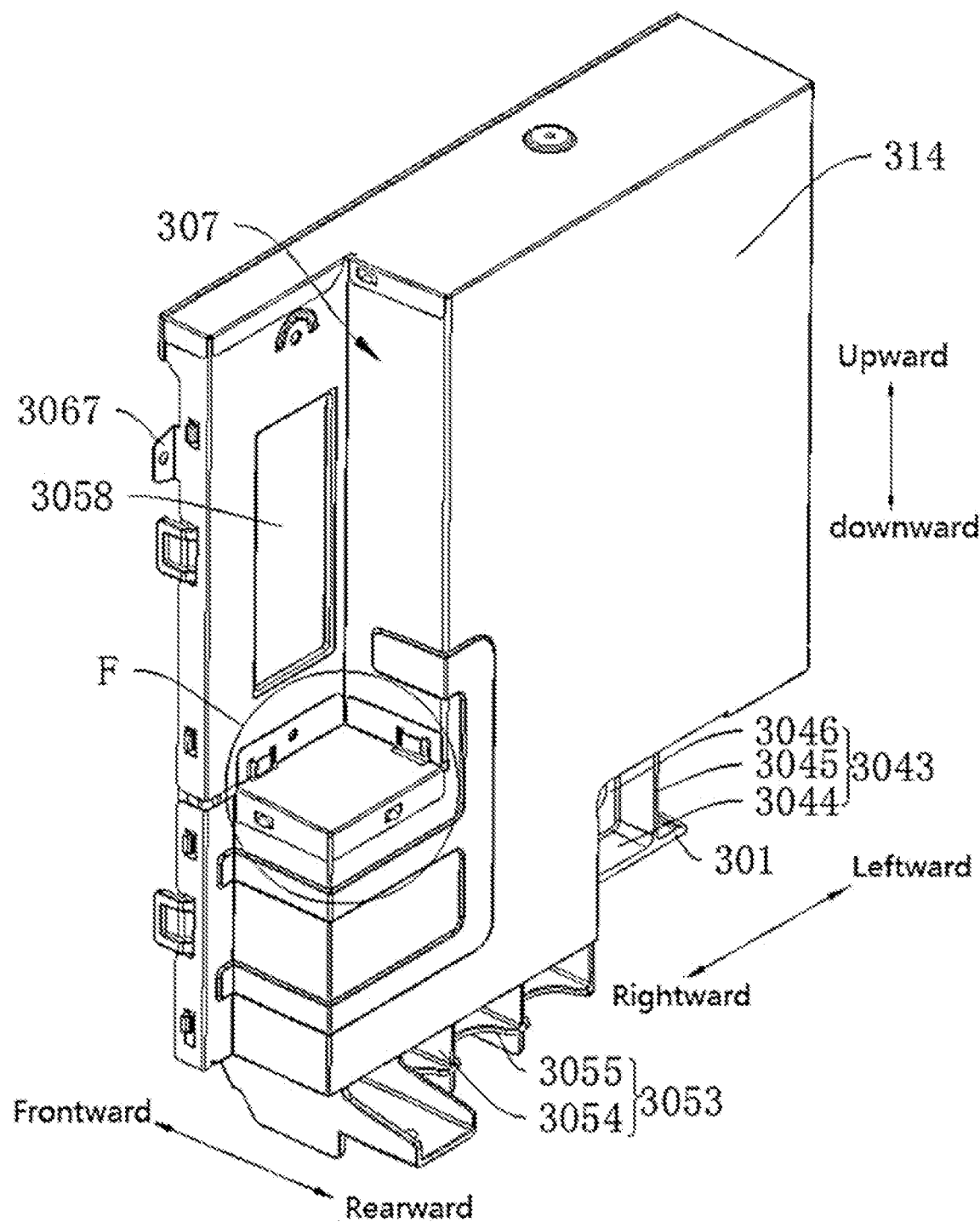
FIG. 14 is a schematic view of an electric control box according to an embodiment of the present disclosure.
Figure 15:
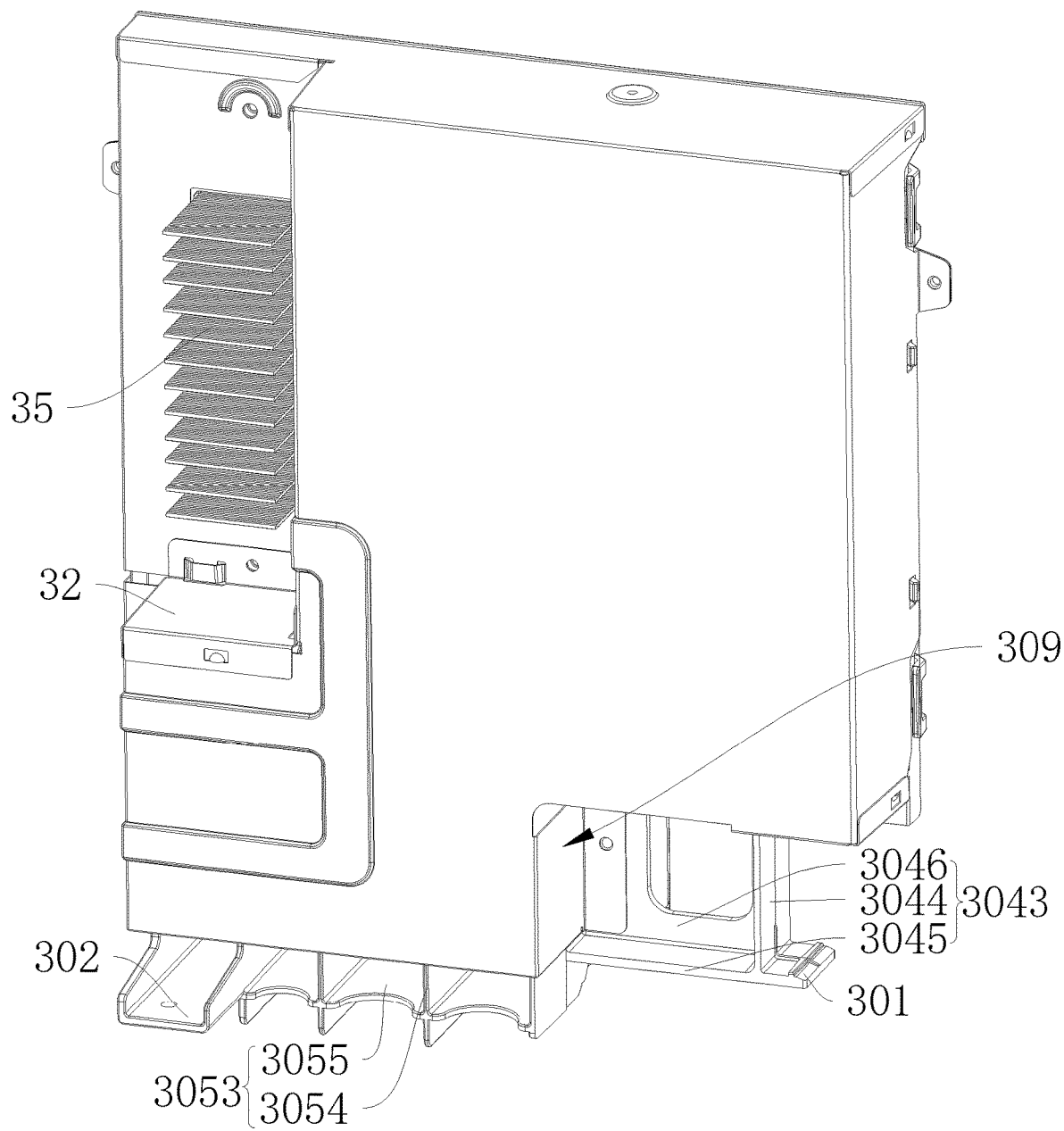
FIG. 15 is a schematic view of an electric control box according to an embodiment of the present disclosure.

FIG. 12 and FIG. 13 are schematic views of an assembly (i.e., the box cover 306) between the second inner shell 312 and the second outer shell 314 of the electric control box 3 in different orientations. The aforementioned connection member 3043 and the supporting structure are both disposed at the second inner shell 312, and the second outer shell 314 is configured to cover over the second inner shell 312, rather than covering over the connection member 3043 and the supporting structure. The box cover 306 has a vacated opening 3058 formed therein, and the radiator 35 engaged with the circuit board 33 on the box base 305 can pass through the vacated opening 3058, thereby improving heat dissipation effect of the circuit board 33.

The fireproof outer shell 304 is formed by an anti-rust sheet metal part or is coated with sheet metal on the surface thereof to achieve anti-rust and fireproof, and thus the air conditioner is safe and reliable.

The insertion opening 101 is formed on an upper convex surface and is in the flare form. The plastic inner shell of the electric control box 3 is connected to and fastened on the base 1 by two screws at the side of the electric control box 3 facing away from the compressor 229, and the metal outer shell of the electric control box 3 is connected to and fastened on the base 1 by one screw at the side of the electric control box 3 facing away from the compressor 229.

In the present disclosure, an assembled portion between the box base 305 and the box cover 306 has a sealing structure provided thereon. In addition, the electric control box 3 may be placed on an inner side of a cooling fan in the outer casing 22.

In some embodiments of the present disclosure, a sealing structure is disposed at the engagement position between the first inner shell 311 and the second inner shell 312, and waterproof performance of the electric control box 3 can be improved by the sealing structure.

Figure 16:
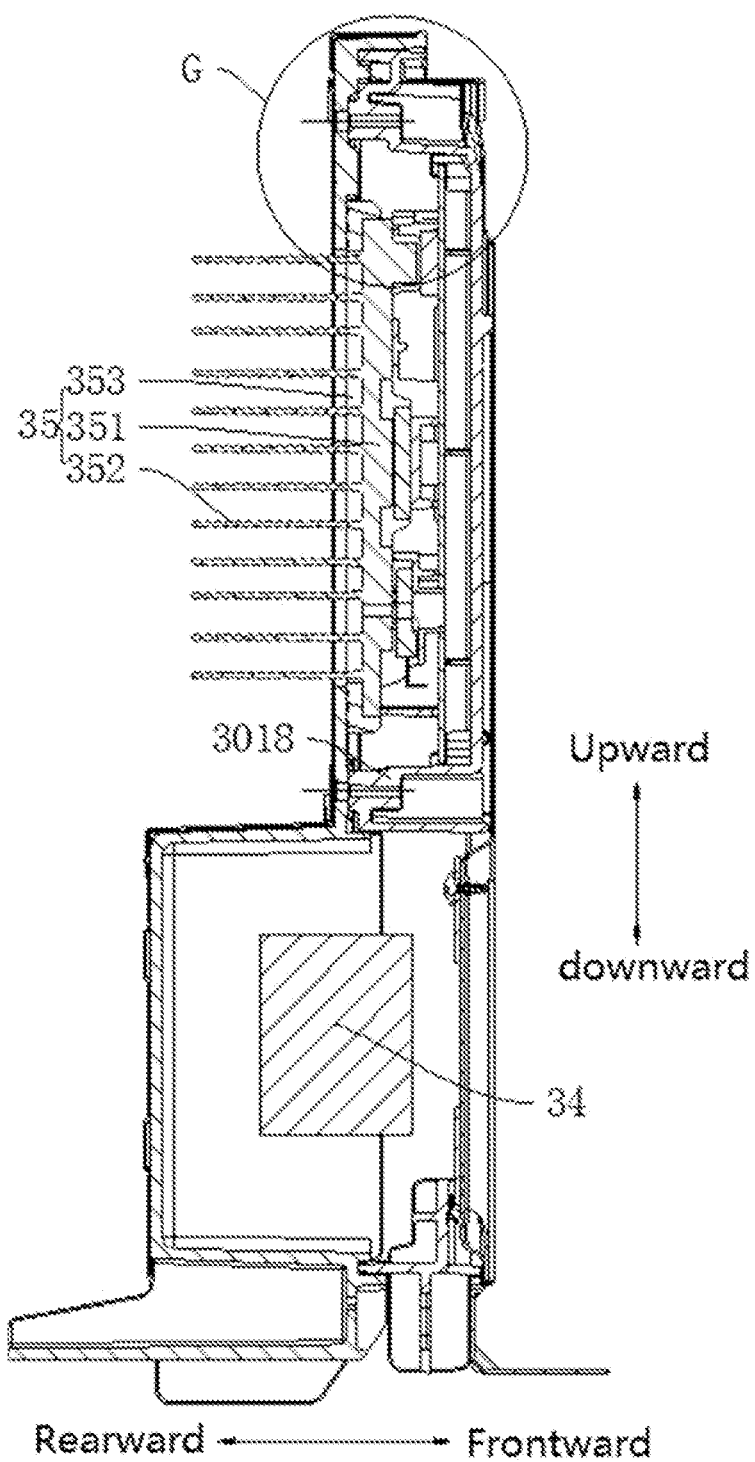
FIG. 16 is a sectional view of an electric control box according to an embodiment of the present disclosure.
Figures 1, 16:
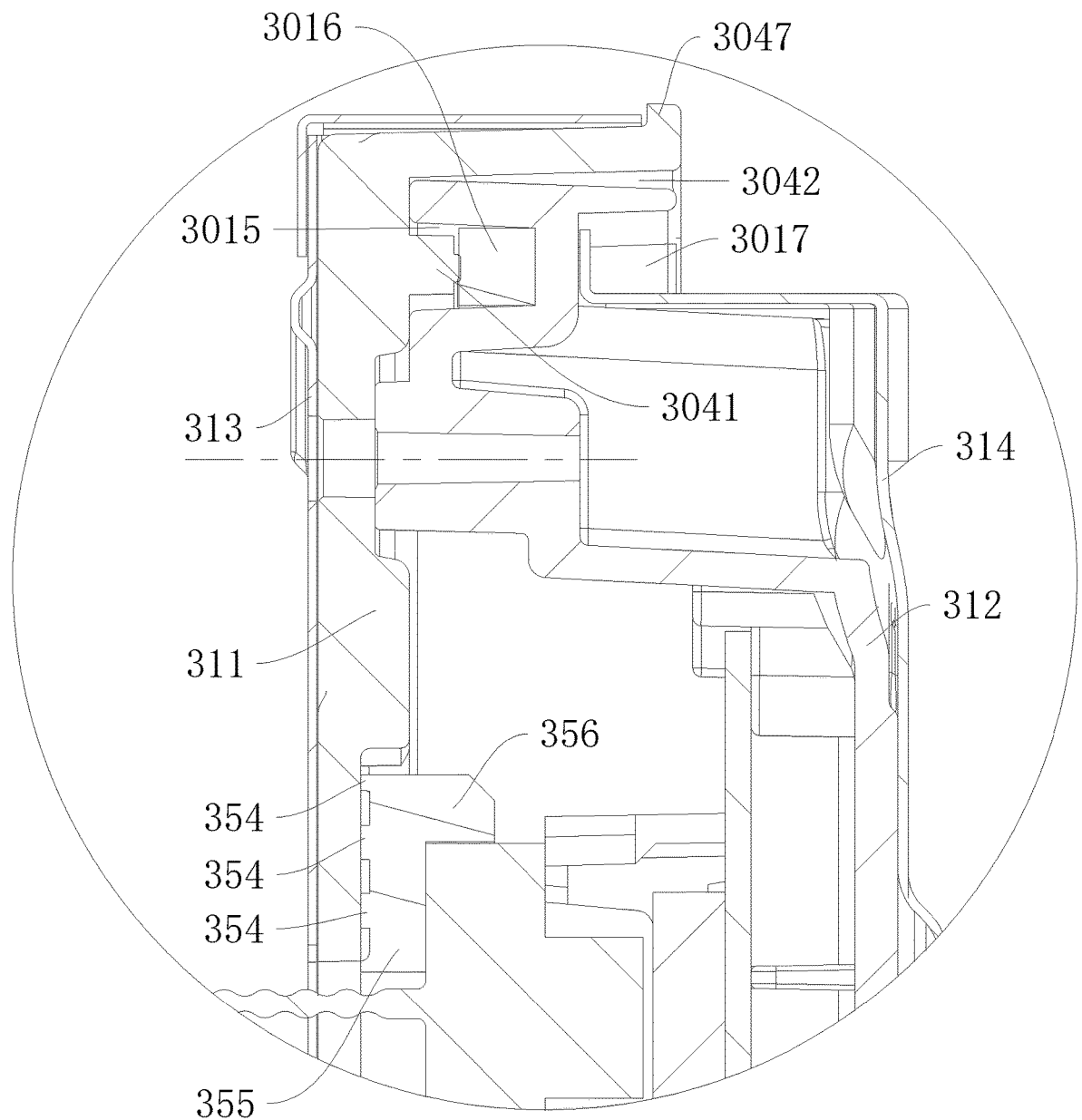
Figure 17:
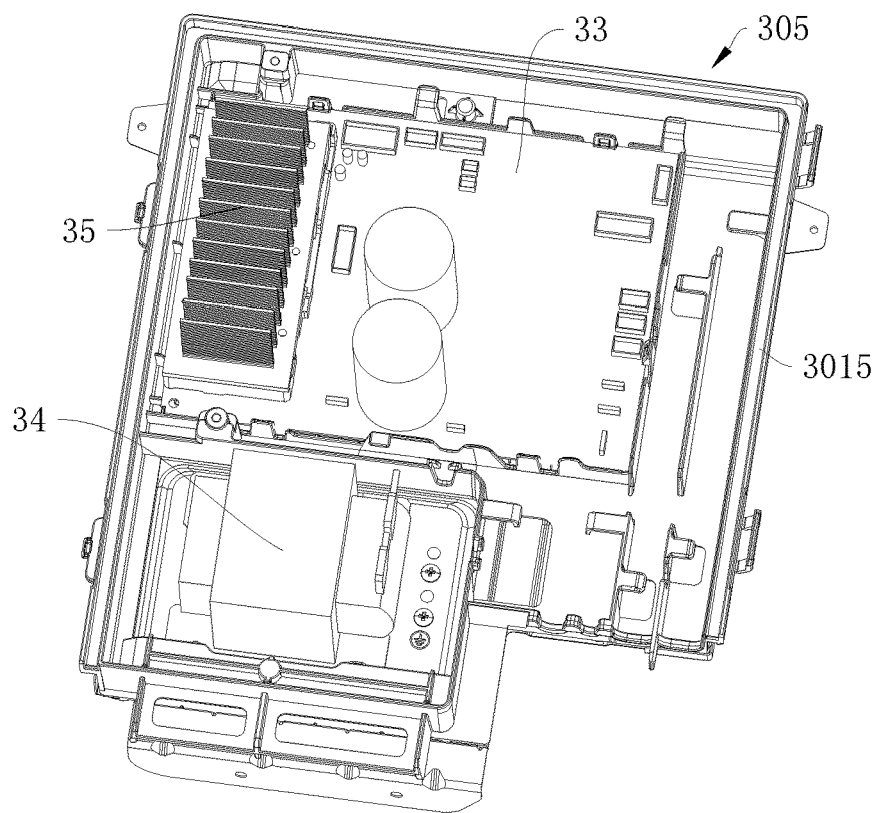
FIG. 17 is a schematic view of an electric control box according to an embodiment of the present disclosure without a sealing ring being disposed in a sealing groove.
Figure 18:
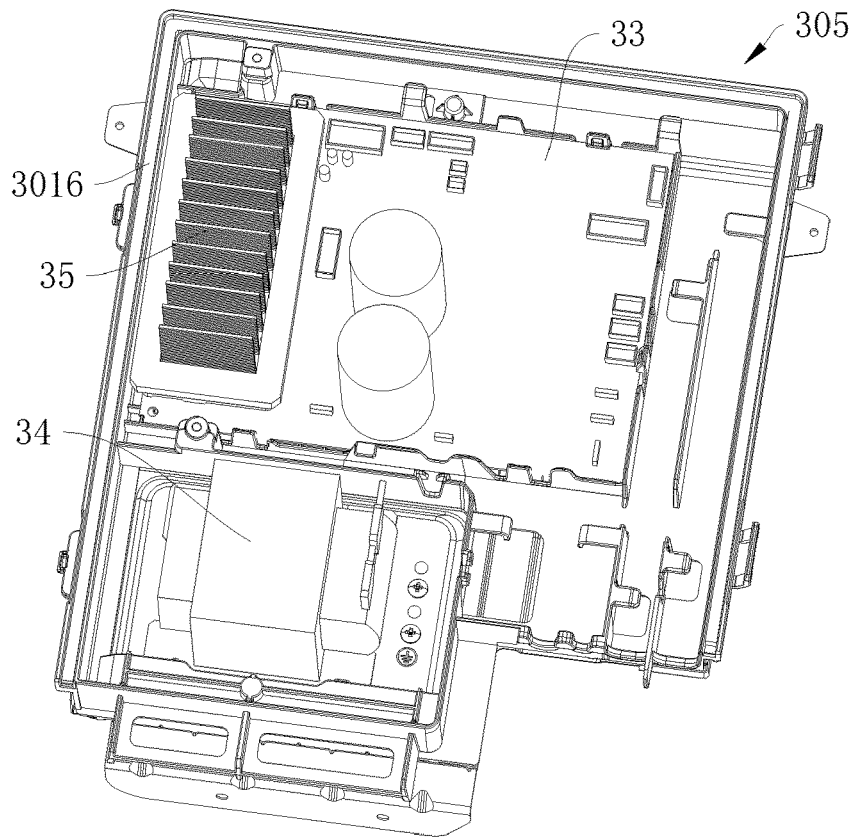
FIG. 18 is a schematic view of an electric control box according to an embodiment of the present disclosure with a sealing ring being disposed in a sealing groove.
Figure 19:
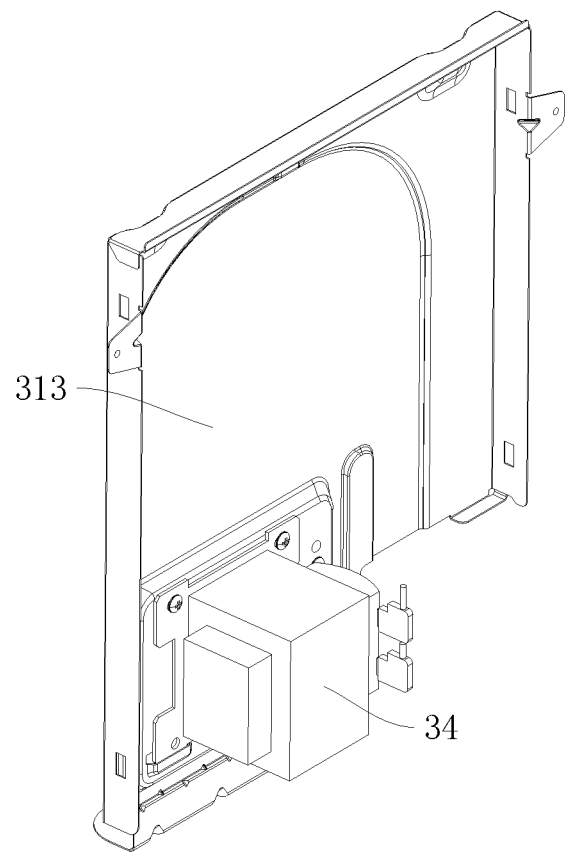
FIG. 19 is a schematic view of an assembly between a first shell and an inductor in an electric control box according to an embodiment of the present disclosure.

As shown in FIG. 16 and FIG. 18, the first inner shell 311 has a sealing groove 3015 formed at a peripheral wall thereof, and the sealing groove 3015 is arranged to face towards the second inner shell 312. The second inner shell 312 has a sealing rib 3041 provide thereon, and the sealing rib 3041 is arranged to face towards the first inner shell 311. The sealing rib 3041 is embedded in the sealing groove 3015. Thus, a sealing structure is formed to realize a sealing of the engagement structure between the first inner shell 311 and the second inner shell 312.

Optionally, a sealing ring 3016 is disposed in the sealing groove 3015, and the sealing rib 3041 is pressed against the sealing ring 3016. By arranging the sealing ring 3016, the sealing between the first inner shell 311 and the second inner shell 312 can be further effectively achieved.

Specifically, the first inner shell 311 includes a first end plate and a first peripheral wall extending from a periphery of the first end plate, and the second inner shell 312 includes a second end plate and a second peripheral wall extending from a periphery of the second end plate. The first outer shell 313 is arranged outside the first inner shell 311 and is configured to cover over the first end plate and the first peripheral wall, and the second outer shell 314 is arranged outside the second inner shell 312 and is configured to cover over the second end plate and the second peripheral wall. The aforementioned sealing rib 3041 is disposed at an end surface of the first peripheral wall, and the aforementioned sealing groove 3015 is disposed at an end surface of the second peripheral wall. The sealing ring 3016 is disposed in the sealing groove 3015, and the sealing rib 3041 is embedded within the sealing groove 3015 and is pressed against the sealing ring 3016 to achieve the sealing.

FIG. 16 and FIG. 18 are schematic views showing an assembly (i.e., the box base 305) of the first inner shell 311 and the first outer shell 313 of the electric control box 3 in different orientations. Here, it can be seen that the sealing groove 3015 is disposed at the periphery of the first inner shell 311, and the sealing ring 3016 is arranged in the sealing groove 3015. Further, a corresponding structure on the second inner shell 312 may be embedded within the sealing groove 3015, and be pressed against the sealing ring 3016, so as to realize the sealing of the electric control box 3, especially to realize sealing of fit clearances among an upper part, a left side part and a right side part of the electric control box 3.

In addition, in order to improve the sealing performance of the sealing structure, in the present disclosure, a fastener connection is provided at a position adjacent to the sealing ring 3016. Thus, through the connection by the fastener, it is possible to facilitate the sealing rib 3041 to be pressed against the sealing ring 3016 more tightly, or to facilitate the effective engagement between the sealing rib 3041 and the sealing groove 3015, thereby improving the sealing between the first inner shell 311 and the second inner shell 312 of the box body. Specifically, as shown in FIG. 16, the first inner shell 311 is connected to the second inner shell 312 connected at a position adjacent to the sealing ring 3016 by the fastener.

Optionally, as shown in FIG. 16 and FIG. 18, the second inner shell 312 has a first holding groove 3042 formed at an inner side of the peripheral wall thereof, the first holding groove 3042 is opened towards the first inner shell 311. Further, the peripheral wall of the first inner shell 311 is embedded within the first holding groove 3042, and the sealing rib 3041 is arranged at an inner bottom surface of the first holding groove 3042. Through an engagement of the peripheral wall of the first inner shell 311 with the first holding groove 3042, the sealing rib 3041 is engaged with the sealing groove 3015, so that a serpentine engagement surface can be formed at the engagement position of the first inner shell 311 and the second inner shell 312, thereby effectively preventing water and the like from entering an interior of the electric control box 3.

Optionally, the second inner shell 312 has a protrusion rib 3047 provided at an edge of the peripheral wall thereof, and the protrusion rib 3047 protrudes in a direction facing away from the first inner shell 311. Since the peripheral wall of the first inner shell 311 is embedded into the first holding groove 3042 and the protrusion rib 3047 is disposed at an outer peripheral surface of the second inner shell 312, when entering an outer peripheral surface of the second inner shell 312, a medium such as water can be prevented from entering the engagement position between the first inner shell 311 and the second inner shell 312 through a blocking of the protrusion rib 3047, thereby further effectively improving the waterproof and other performance between the first inner shell 311 and the second inner shell 312.

The first inner shell 311 is assembled to the second inner shell 312. In order to prevent external water from entering the electric control box, a double-groove and double-rib cross-fit design is adopted with a sealing rubber strip therebetween for a secondary sealing design. Here, the first holding groove 3042 is formed on the second inner shell 312 to be engaged with an outer edge rib of the first inner shell 311, and an outer edge is designed to be drafted outwards, which facilitates drainage of water. The sealing groove 3015 is formed on the first inner shell 311, and is engaged with the protrusion rib. The sealing rubber strip is disposed in the sealing groove 3015, and the protrusion rib 3047 cooperates with the rubber sealing strip to achieve a secondary sealing effect, thereby preventing the external water source from entering the electric control box 3.

Optionally, the protrusion rib 3047 protrudes beyond an inner or outer peripheral surface of the second outer shell 314. In this way, when a medium such as water already exists on the second outer shell 314, the protrusion rib 3047 can also perform an effectively blocking to prevent the medium such as the water from flowing to the connection position between the first inner shell 311 and the second inner shell 312.

Optionally, the first inner shell 311 has a second holding groove 3017 formed at the peripheral wall thereof. The second holding groove 3017 is opened in a direction facing away from the second inner shell 312, and an edge of the second outer shell 314 extends into the second holding groove 3017. In this way, the assembly efficiency and fireproof and waterproof can be improved.

For another example, as shown in FIGS. 16 and 18, the sealing groove 3015 and the second holding groove 3017 of an I-shaped structure are disposed at two sides of a top wall of the first inner shell 311 in the longitudinal direction, respectively.

Optionally, as shown in FIGS. 16 and 18, the electric control box has a recessed structure provided at an outer surface of one end thereof in the vertical direction, and a protrusion structure provided at the other end thereof in the vertical direction. The protrusion structure is convex relative to the recessed structure, and a patch block is disposed at a step formed between the recessed structure and the protrusion structure. In other words, the electric control box 3 has a recessed structure 307 provided at an outer surface thereof, the electric control box 3 is arranged in the vertical direction, the recessed structure 307 is arranged at an end of the electric control box 3 in the vertical direction, the protrusion structure which is convex relative to the recessed structure 307 is arranged at the other end of the electric control box 3 in the vertical direction, and the patch block 32 is disposed at a step formed between the recessed structure 307 and the protrusion structure.

Specifically, the recessed structure 307 is arranged at the outer surface of one end of the electric control box 3 in the vertical direction, and correspondingly the protrusion structure will be arranged at the other end of the electric control box 3 in the vertical direction. That is, the box body 31 has the recessed structure 307 formed on one end of the outer surface thereof in the vertical direction and the protrusion structure formed on the other end of the outer surface thereof in the vertical direction.

Here, as shown in FIGS. 16 and 18, the protrusion structures and the recessed structures 307 are relatively defined. That is, the recessed structure 307 is a recess with respect to the protrusion structure, and the protrusion structure is a protrusion with respect to the recessed structures 307.

In this case, a level difference may be formed at junction position (that is, a step) between the recessed structure 307 and the protrusion structure. The level difference may be eliminated by stretching a sheet metal through sheet metal forming or other means. For example, the level difference may be eliminated by the patch block 32.

It should be noted that the box body 31 of the present disclosure includes the insulation inner shell 303 and the fireproof outer shell 304. The fireproof outer shell 304 is generally formed by sheet metal. Taking the sheet metal formed into a cuboid structure as an example, a part of one side of the cuboid structure is recessed to form the recessed structure 307. This recessed structure 307 will have a level difference relative to the un-recessed part, so that an opening will be formed at a junction position between the recessed structure 307 and the un-recessed part, and the opening may be closed through sheet metal process. However, such the sheet metal process has relatively high cost. Therefore, in the present disclosure, the patch block 32 is arranged to close the opening. In addition, the patch block 32 is configured to close the opening on the fireproof outer shell 304, and the insulation inner shell 303 may be injection-molded without forming an opening. Therefore, by arranging the patch block, relative integrity of the fireproof outer shell 304 can be ensured, thereby improving the fireproof performance of the electric control box 3.

In addition, the electric control box 3 of the present disclosure may be arranged vertically. In this case, the recessed structure 307 is arranged at an upper part of the box body 31, and the protrusion structure is arranged at a lower part of the box body 31. When the electric control box 3 is placed outdoors, sunlight may irradiate on the electric control box 3, especially on a position of the patch block 32 at the electric control box 3patch block. When no patch block 32 is provided, the electric control box 3 (the insulation inner shell 303) would be damaged by the sunlight irradiation. Therefore, the electric control box 3 can be effectively protected by the patch block 32, thereby improving operation stability of the electric control box 3.

Specifically, the box body 31 includes the insulation inner shell 303 and the fireproof outer shell 304. Since the fireproof outer shell 304 has the opening generated by the above level difference, a part of the insulation inner shell 303 is exposed. The insulation inner shell 303 is generally made of a plastic material, thus this exposed part of the insulation inner shell 303 is easily damaged by the sunlight. Therefore, in the present disclosure, by arranging the patch block, it is possible to prevent the exposed part of the insulation inner shell 303 from being directly irradiated by the sunlight, thereby effectively protecting the box body 31. In addition, with reference to FIGS. 16 and 18, one end of the protrusion structure facing towards the recessed structure 307 is covered by the patch block. Therefore, an integrity of the electric control box 3 can be maintained by the patch block 32, thereby effectively protect an inner space of the box body 31 and maintaining the stable operation of the electric control box 3. In addition, the patch block 32 can also provide the fireproof function.

Optionally, a reinforcement structure (e.g., formed by stamping) is disposed at and near the recessed structure 307. The reinforcement structure may bridge the recessed structure 307, the protrusion structure, and regions near the recessed structure 307 and the protrusion structure.

Optionally, as shown in FIG. 13 and FIG. 18, the patch block 32 includes a cover plate 321 configured to cover over the step between the protrusion structure and the recessed structure 307, and the cover plate 321 has a first flange 322 provided at a part of a peripheral edge thereof. The first flange 322 extends towards the recessed structure 307 in the vertical direction and is connected to a wall of the recessed structure 307. The cover plate 321 also has a second flange 323 provided at another part of the peripheral edge thereof. The second flange 323 extends towards the protrusion structure in the vertical direction and connected to a wall of the protrusion structure. Therefore, the patch block 32 can be connected to the box body 31 stably by the first flange 322 and the second flange 323.

Specifically, a part of the edge of the cover plate 321 is provided with the first flange 322 extending upwards and connected to the wall of the recessed structure 307. Further, another part of the edge of the cover plate 321 is provided with the second flange 323 extending downwards and connected to the wall of the protrusion structure.

Optionally, as shown in FIG. 13 to FIG. 18, a part of the wall of the recessed structure 307 protrudes towards the outside of the electric control box 3 and has an insertion hole 3068 in the vertical direction. The first flange 322 has an insertion buckle 324 formed thereon and extending towards the cover plate 321 in the vertical direction. The insertion buckle 324 is inserted into the insertion hole 3068 in the vertical direction. In addition, optionally, as shown in FIG. 13 to FIG. 18, the protrusion structure has an engagement protrusion 3069 provided at an outer peripheral surface thereof, and the second flange 323 has an engagement hole 325 formed therein. The engagement protrusion 3069 is snapped into the engagement hole 325.

During use, the patch block 32 is mounted from top to bottom. In this case, the insertion opening 101 on the first flange 322 is inserted into the insertion hole 3068, and the engagement hole 325 on the second flange 323 is engaged with the engagement hole 325, thereby achieving the positioning of the patch block 32.

The installation of the patch block 32 can be realized by the above-mentioned snap-fit structures. However, the snap-fit structures are easily disengaged from each other due to the external force. Therefore, the present disclosure also provides the fastener for connecting the patch block 32 and the box body 31, so that the patch block 32 is fastened to the box body 31 by the fastener after the patch block 32 is pre-positioned by the snap-fit and insertion.

Here, as shown in FIGS. 13 to 18, the first flange 322 may be screwed to the wall of the recessed structure 307. Alternatively, the second flange 323 may also be screwed to the wall of the protrusion structure.

In addition, as shown in FIGS. 13 to 18, the first flange 322, the second outer shell 314, the second inner shell 312, and the first inner shell 311 are connected in series by the same fastener, thereby simplifying the assembly structure and improving the integrity and stability of the overall structure of the electric control box 3.

Optionally, the cover plate 321 may have a square shape. The first flange 322 may be disposed at each of two adjacent sides of the cover plate 321, and the second flange 323 may be disposed at each of the other two adjacent sides of the cover plate 321.

As described above, as illustrated in FIGS. 13 to 18, the box body 31 is generally constructed in a cuboid shape, and a part of one side of the box body 31 is recessed to form the recessed structure 307 in a square shape. In this way, a generally square opening is formed between the recessed structure 307 and the un-recessed part of the box body 31, and the opening is closed by the square cover plate 321. Further, the recessed structure 307 formed on the side of the box body 31 has two adjacent surfaces which are connected to two first flanges 322. In addition, the un-recessed part on the side of the box body 31 also has two adjacent surfaces that are adjacent to each other at a substantial right angle and connected to two second flanges 323.

The aforementioned recessed structure 307 is disposed at the box cover 306 (the assembly of the second inner shell 312 and the second outer shell 314). The patch block 32 is connected to the box cover 306 by an insertion buckle and snap-fit structure. The "E"-shaped reinforcement rib strip structure 3046 disposed at the recess of the electric control box, and the second outer shell 304 is assembled by the snap-fit design.

In addition, the electric control box of the present disclosure may be arranged in the vertical direction. Here, the vertical direction is a direction perpendicular to the base. In the present disclosure, each of the transverse direction and the longitudinal direction is parallel to the base, and the transverse direction, the vertical direction and the longitudinal direction are perpendicular to each other.

In addition, in conjunction with other embodiments of the present disclosure, the box body 31 of the electric control box 3 has a radiator 35 provided therein. The radiator 35 may extend out of the box body 31, and a part of the radiator 35 extending out of the box body 31 may be located at the recessed structure 307, thereby improving the space utilization of the electric control box 3.

In addition, in some embodiments of the present disclosure, the box body 31 of the electric control box 3 has an inductor 34 provided therein, and at least a part of the inductor 34 is disposed inside the protrusion structure. Thus, an internal space of the box body 31 is effectively utilized, and the space utilization is improved.

As shown in FIGS. 1 to 34, according to some embodiments of the present disclosure, the electric control box 3 includes a box body 31 and a circuit board 33 arranged in the box body 31. The circuit board 33 has electronic components 331. By integrating the circuit board 33 into the box body 31, the circuit board 33 is effectively protected, and manufacturing and modular design of the circuit board 33 is facilitated.

The electric control box 3 in this embodiment may adopt the structure of the electric control box 3 in other embodiments, and the structure of the electric control box 3 in this embodiment can also be applied to other embodiments. For example, the box body 31 of the present disclosure may adopt the structure of the box body 31 in the electric control box 3 as described above. In addition, when the electric control box 3 is applied in the window air conditioner 1000, the above installation method for installing the electric control box 3 into the window air conditioner 1000 may also be adopted.

In conjunction with the embodiments as described above, the circuit board 33 is mounted within the insulation inner shell 303. Additionally, optionally, the inductor 34 may be mounted at the fireproof outer shell 304.

Figure 20:
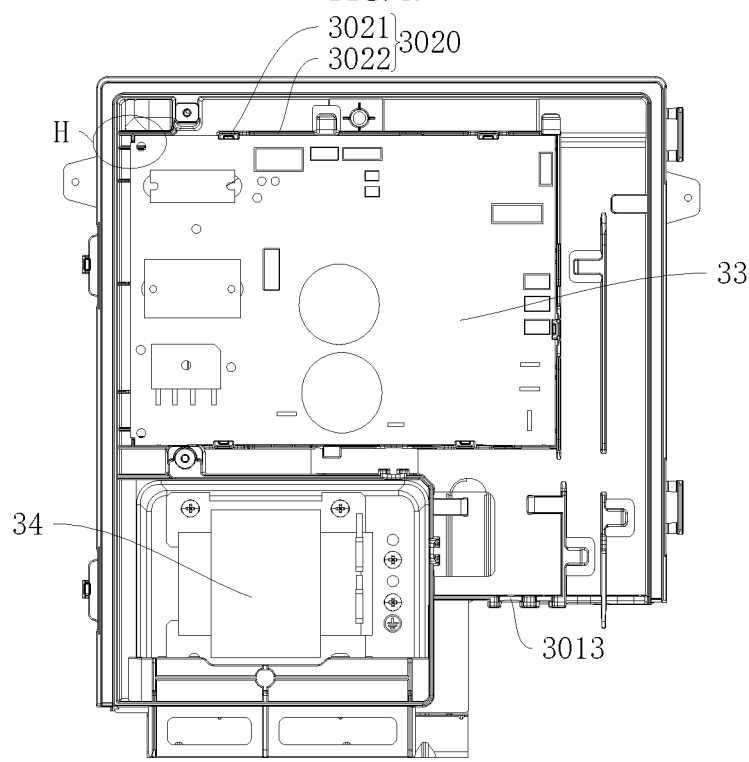
FIG. 20 is a schematic view of a positional relationship between an inductor and a circuit board in an electric control box according to an embodiment of the present disclosure.
Figures 1, 20:
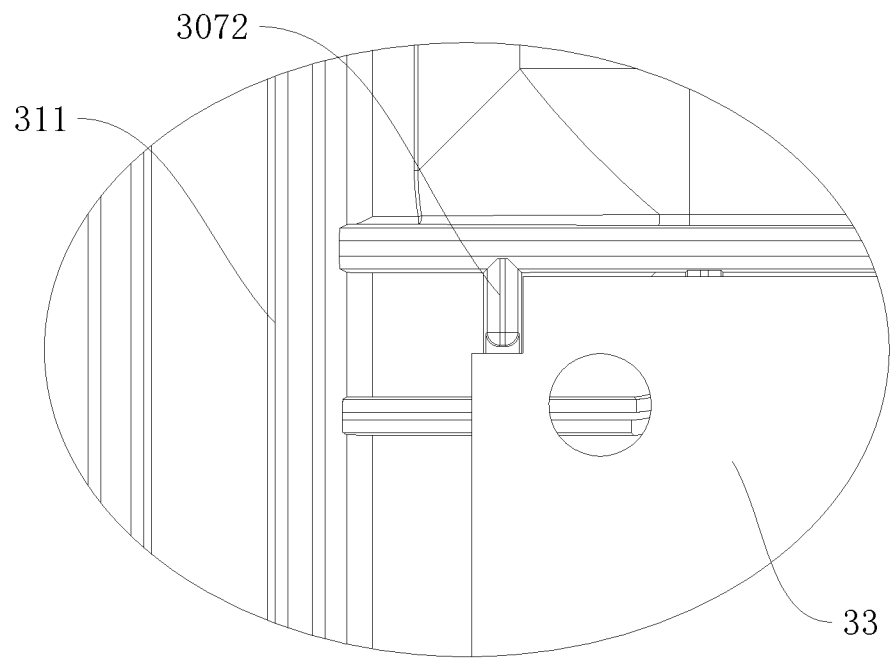

Further, in conjunction with the above embodiments, the circuit board 33 is mounted at the first inner shell 311. The first inner shell 311 has a positioning structure 3019 on an inner side thereof, and the positioning structure 3019 is arranged around the circuit board 33. The positioning structure 3019 includes positioning ribs 3020 and positioning hooks 3021. The circuit board 33 can be effectively positioned by the positioning structure 3019. Referring to FIG. 20, the positioning ribs 3020 are arranged around the circuit board 33, and a placement region for the circuit board 33 is formed by arranging the positioning ribs 3020 around the circuit board 33 to accommodate the circuit board 33. In addition, the positioning of the circuit board 33 is realized by the positioning hooks 3021. Further, the positioning ribs 3020 are also arranged between the circuit board 33 and the inner surface of the electric control box 3, so that the circuit board 33 is spaced apart from the inner surface of the electric control box 3 by the positioning ribs 3020, which facilitates heat dissipation and waterproofing of the circuit board 33.

Optionally, the positioning ribs 3020 and the positioning hooks 3021 may be arranged at intervals and staggered around the circuit board 33, so that the circuit board 33 is spaced apart from the inner wall of the electric control box 3 while ensuring the stable installation of the circuit board 33. Thus, it is possible to allow the passage of airflow and provide better heat dissipation effect.

Optionally, the positioning ribs 3020 are arranged at the first inner shell 311 to form a placement space within which the circuit board 33 is disposed. A plurality of positioning hooks arranged around the circuit board 33 at intervals is provided.

Optionally, a guide rib 3022 is disposed at a peripheral wall of the placement space. The guide rib 3022 is perpendicular to the circuit board 33 and is connected to an inner side surface and an inner bottom surface of the placement space, respectively. An end of the guide rib 3022 facing away from the inner bottom surface of the placement space is formed into a wedge-shaped structure gradually increasing towards the inner bottom surface of the placement space relative to a height of the inner side surface of the placement space. Thus, the circuit board 33 can be guided by the wedge-shaped structure during the installation thereof.

For example, the guide rib 3022 is arranged at one side of the placement space, and the positioning hook 3021 is arranged at the opposite side of the guide rib 3022. The circuit board 33 is inserted into the placement space at one side thereof and is positioned by the positioning hooks 3021. Then, the circuit board 33 is pressed downwardly and is smoothly mounted within the placement space by the action of the guide rib 3022.

Optionally, the circuit board 33 has a positioning notch 102 formed at an edge thereof. The box body 31 has a positioning protrusion 3072 provided thereon, and the positioning protrusion 3072 is engaged with the positioning notch 102 to position the circuit board 33. Through the engagement of the positioning notch 102 and the positioning protrusion 3072, a foolproof installation of the circuit board 33 can be realized, and the circuit board 33 can be mounted in a predetermined orientation to avoid wrong installation and improve the assembly efficiency.

Optionally, the circuit board 33 is spaced apart from the inner surface of the box body 31. A gap between the circuit board 33 and the box body 31 can allow the airflow to pass therethrough to carry away the heat of the circuit board 33, thereby improving the heat dissipation of the circuit board 33, and also avoiding the influence of possible generated condensed water.

Optionally, the electric control box 3 has a wiring channel 3027 formed therein. The wiring channel 3027 is arranged around the circuit board 33. The wiring channel 3027 has a wire-separation rib 3031 provided therein for separating the wire bundle. Further, the electric control box 3 has wire-fixation ribs 3033 provided thereon for positioning the wire bundle. The wire-fixation ribs 3033 are arranged at intervals in an extending direction of the wiring channel 3027.

At least two of the wire-separation slots include a weak electricity wire-separation slot close to the circuit board and a strong electricity wire-separation slot facing away from the circuit board, and an isolation between strong electricity and weak electricity is achieved by the wire-separation rib.

Figure 21:
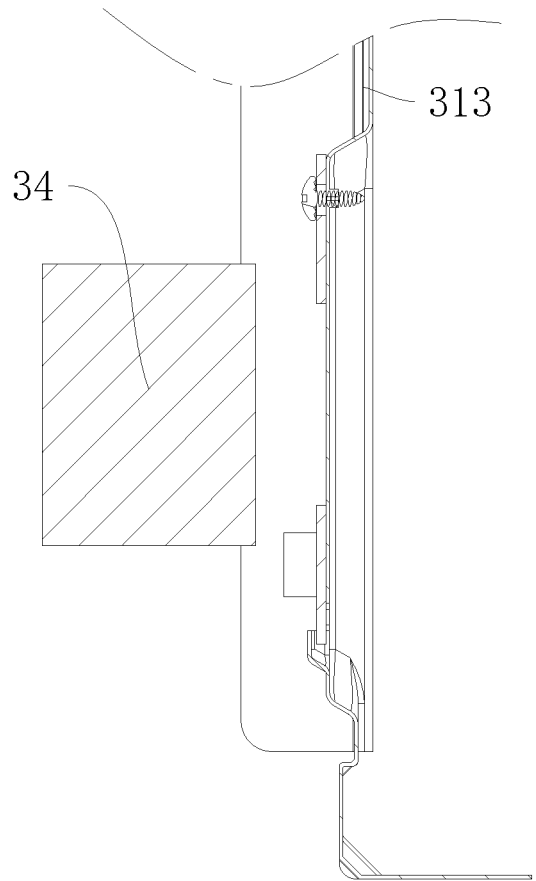
FIG. 21 is a schematic view of an assembly between a first outer shell and an inductor in an electric control box according to an embodiment of the present disclosure.
Figure 22:
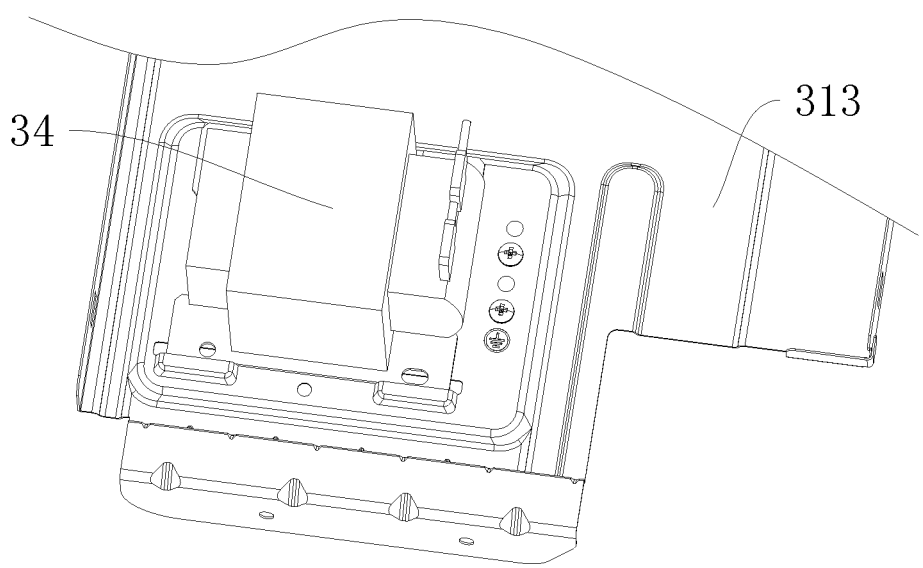
FIG. 22 is a schematic view of an assembly between a first outer shell and an inductor in an electric control box according to an embodiment of the present disclosure.
Figure 23:
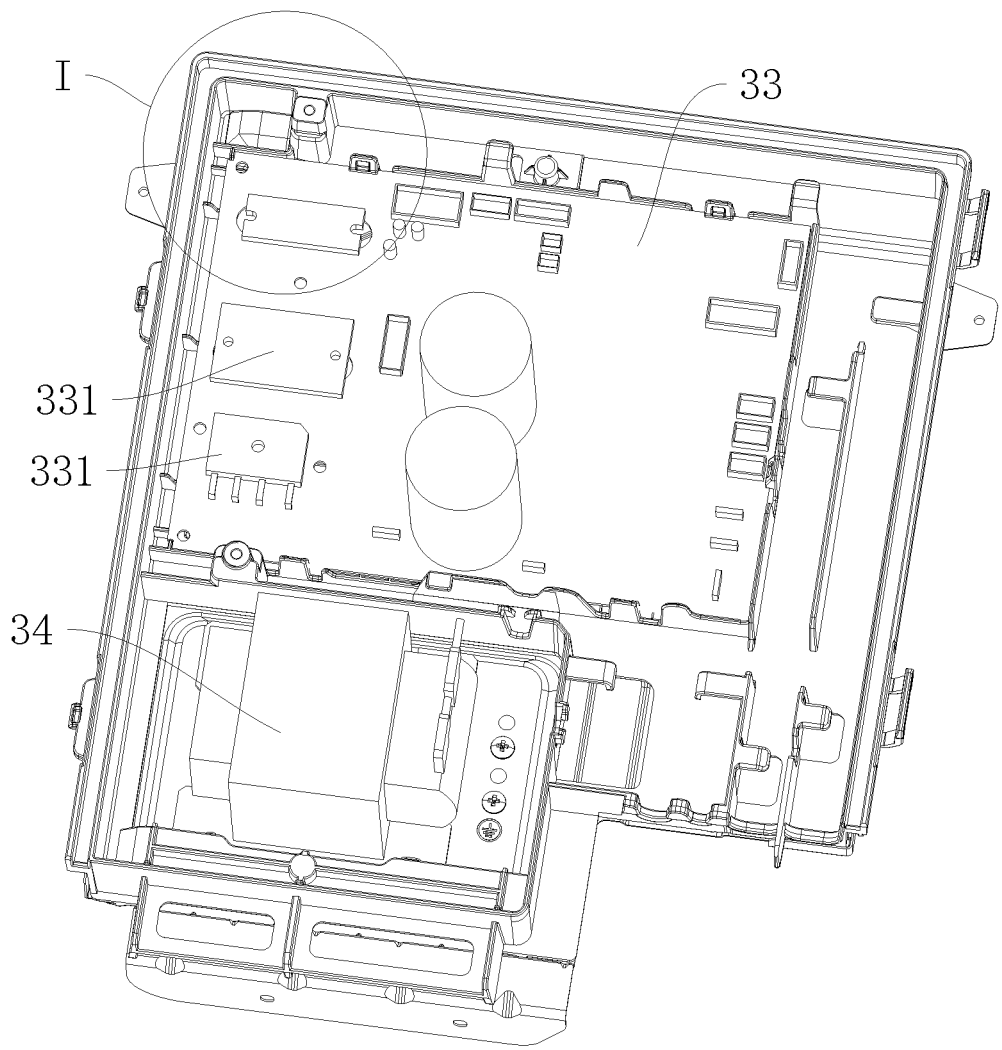
FIG. 23 is a schematic view of a mounting structure of a circuit board in an electric control box according to an embodiment of the present disclosure.
Figures 1, 23:
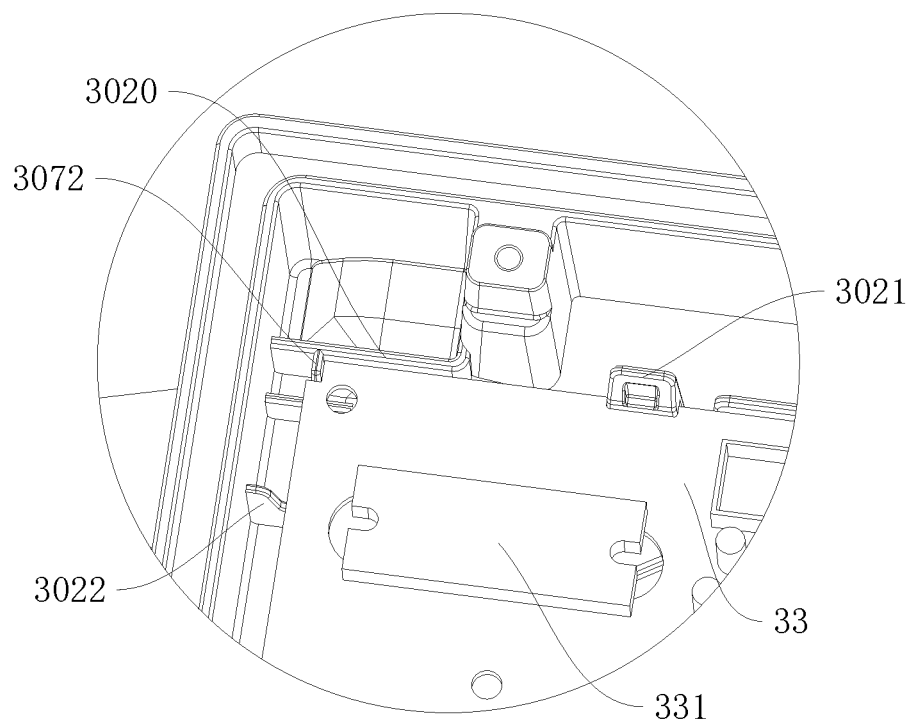

As shown in FIG. 21 and FIG. 22, the electric control box 3 also includes an inductor 34. The inductor 34 is arranged in the box body 31, and the circuit board 33 is arranged to be spaced apart from the inductor 34 to further improve an integration of the electric control box 3.

In the electric control box 3 according to the embodiment of the present disclosure, integrating the circuit board 33 and the inductor 34 in the electric control box 3 can facilitate the manufacturing and modular design of the electric control box 3 and facilitate the design, manufacturing and installation of an electric control structure.

In addition, when the electric control box 3 is applied in the window air conditioner 1000, the electric control box 3 as described above is applied, which can ensure the stable operation of the window air conditioner 1000, improve the stability of the window air conditioner 1000, and improve integration rate of the electric control box 3. Thus, the modular design, manufacturing, installation and maintenance of the window air conditioner 1000 are facilitated.

Figure 24:
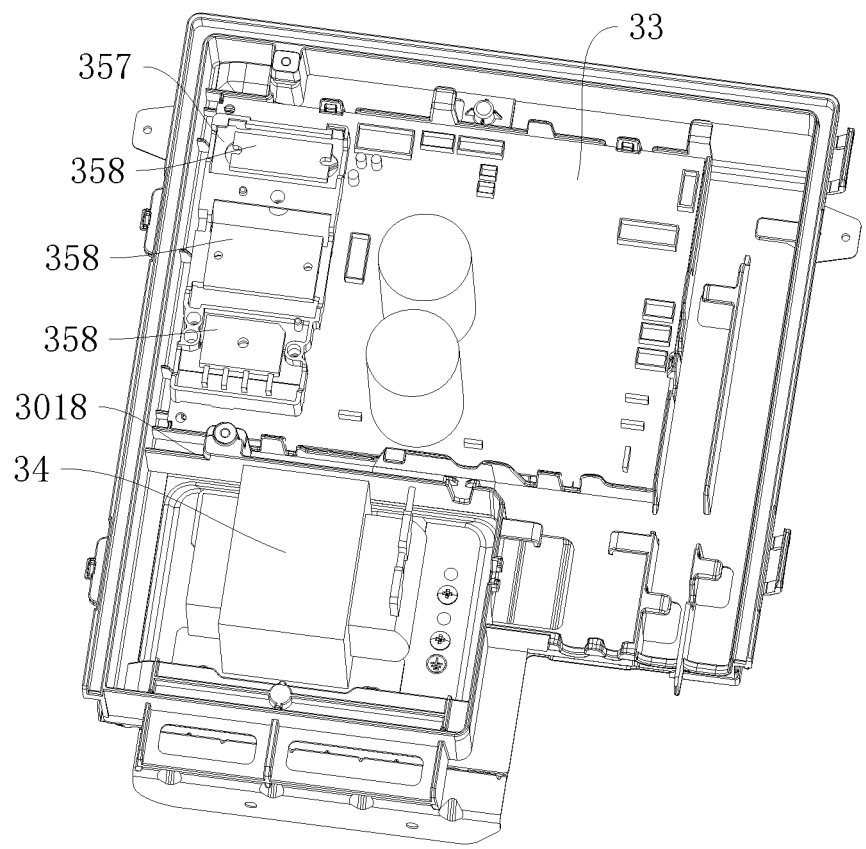
FIG. 24 is a schematic view of a circuit board in an electric control box according to an embodiment of the present disclosure with a heat-conduction sheet and a heat dissipation support being arranged at the circuit board.
Figure 25:
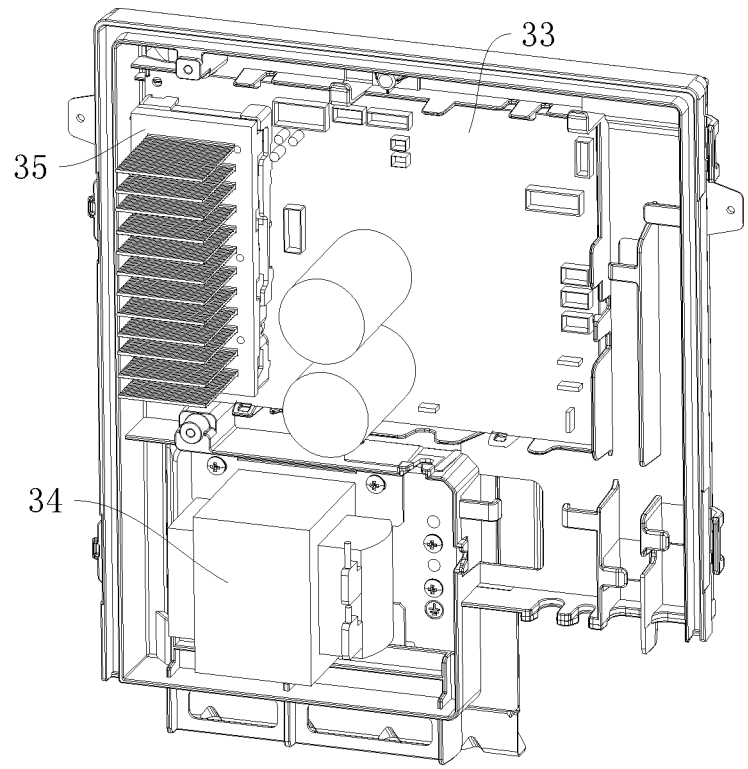
FIG. 25 is schematic view of a circuit board in an electric control box according to an embodiment of the present disclosure with a radiator being arranged at the circuit board.
Figure 26:
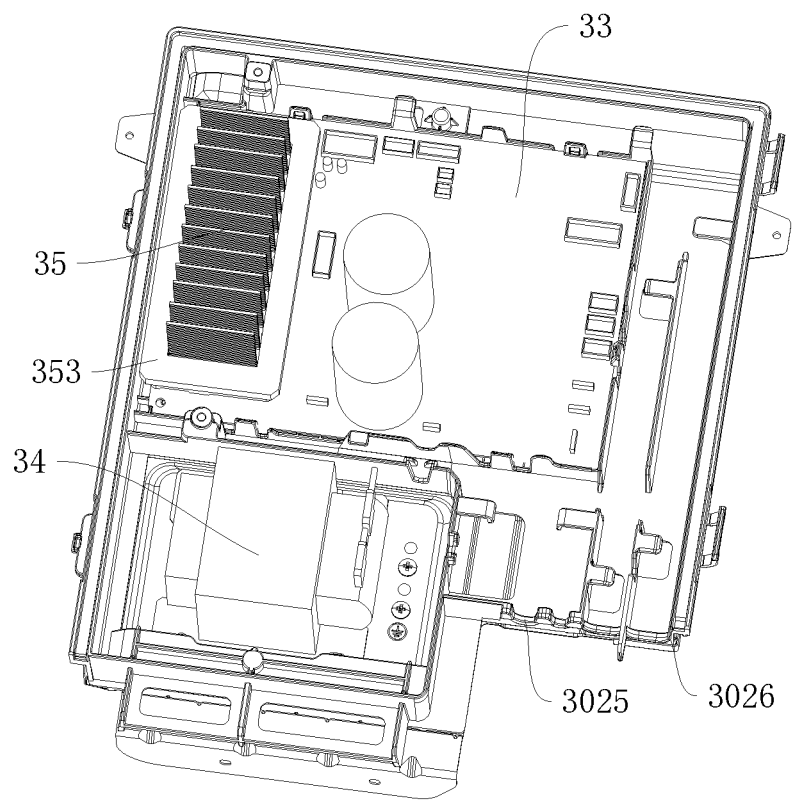
FIG. 26 is a schematic view of a circuit board in an electric control box according to an embodiment of the present disclosure with a seal being arranged at the circuit board.

Optionally, as shown in FIG. 24, the box body 31 has a partition wall 3018 provided therein. The circuit board 33 and the inductor 34 are separated from each other by the partition wall 3018, and the partition wall 3018 has a wire-passing opening 3037 formed therein for communication between a chamber in which the circuit board 33 is located and a chamber in which the inductor 34 is located.

The inductor 34 may be connected to the circuit board 33. Through partitioning by the partition wall 3018, the circuit board 33 and the inductor 34 can perform their respective functions without mutual interference. Further, the partition wall 3018 can also provide a certain heat insulation effect to prevent the heat exchange influence between the circuit board 33 and the inductor 34. The wire-passing opening 3037 on the partition wall 3018 can be configured to allow the wire bundles to pass therethrough to connect the circuit board 33 and the inductor 34.

Here, the partition wall 3018 on the box body 31 may have an annular structure, and the inductor 34 is arranged in the annular partition wall 3018.

Optionally, the inductor 34 is inserted into the box body 31 at one end thereof, and is connected to the box body 31 at the other end thereof by the fastener. In this way, it is possible to facilitate a stable connection between the inductor 34 and the box body 31 and improve the stability of the inductor 34.

Optionally, the inductor 34 is disposed in the box body 31, and the box body 31 has at least one of a grounding connector, a grounding mark and the like provided at an outer side thereof opposite to the inductor 34.

Optionally, a plurality of screws at positions on a surface of the electric control box 3 corresponding to the inductor 34 include two grounding screws and two screws connected to the inductor 34. The plurality of screws is located in an inner recess portion (that is, a recess formed by the recessed platform structure 3066 on an outer surface of the box body 31) to avoid heads of the screws from being exposed.

Optionally, in conjunction with the embodiments as described above, the inductor 34 may be arranged to be directly mounted at the first outer shell 313.

Figure 31:
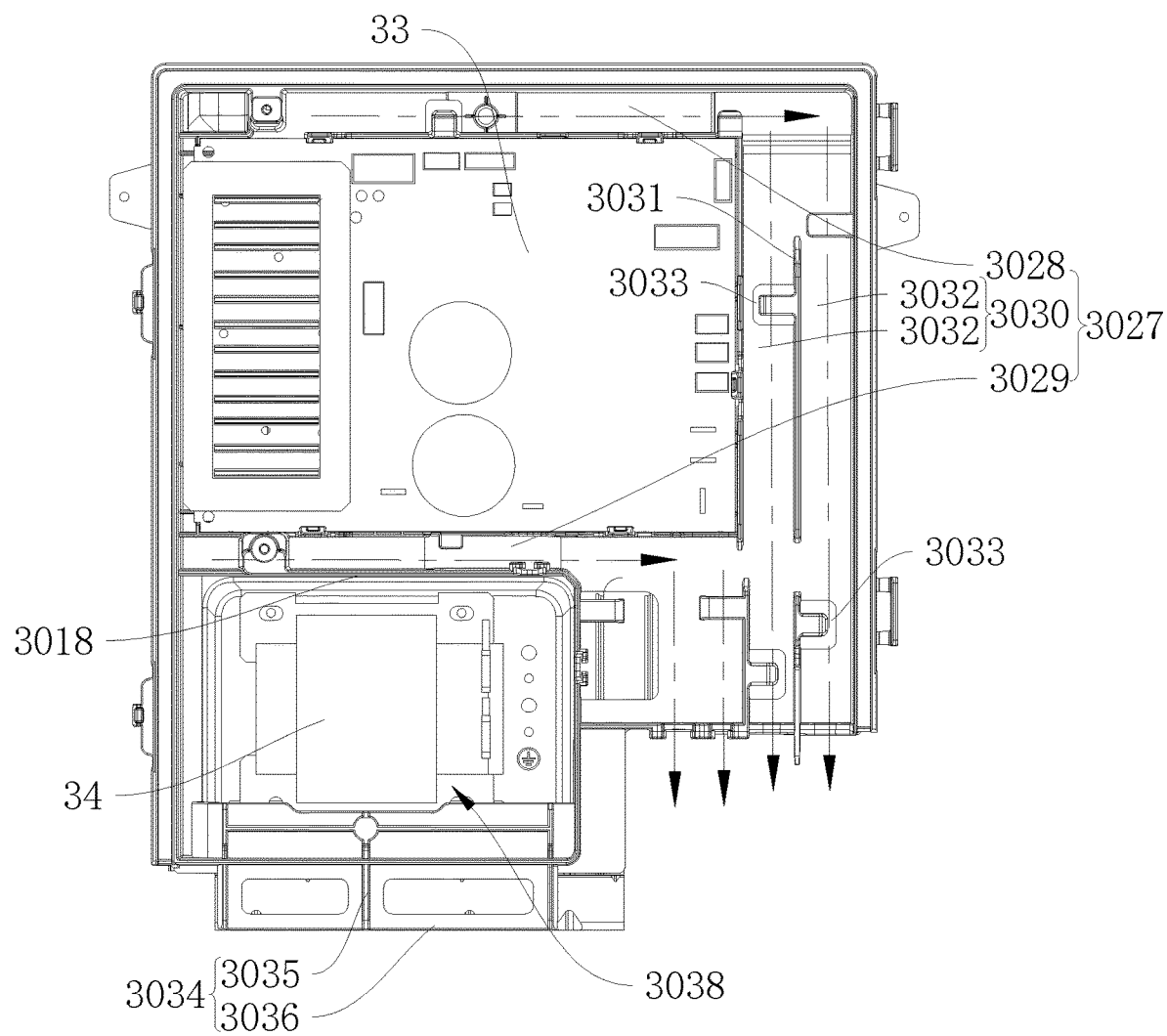
FIG. 31 is a schematic view of a wire-routing structure in an electric control box according to an embodiment of the present disclosure.
Figure 32:
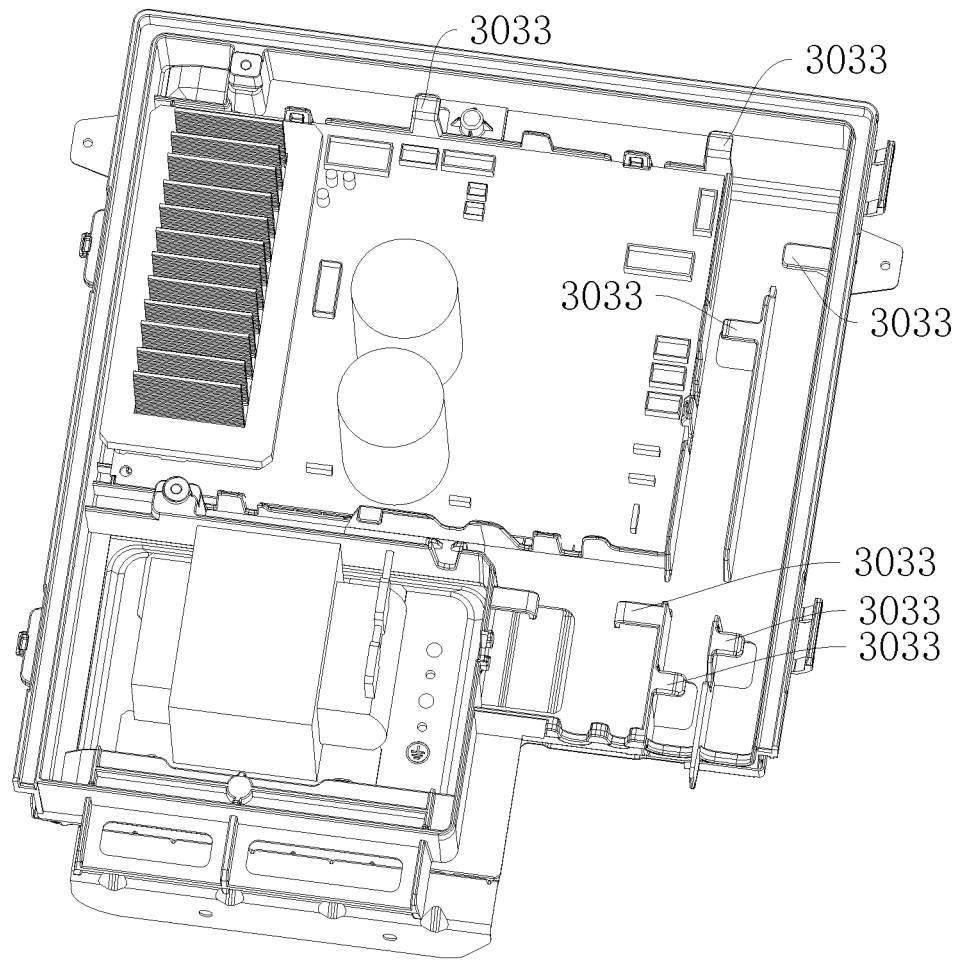
FIG. 32 is a schematic view of a wire-routing structure in an electric control box according to an embodiment of the present disclosure.
Figure 33:
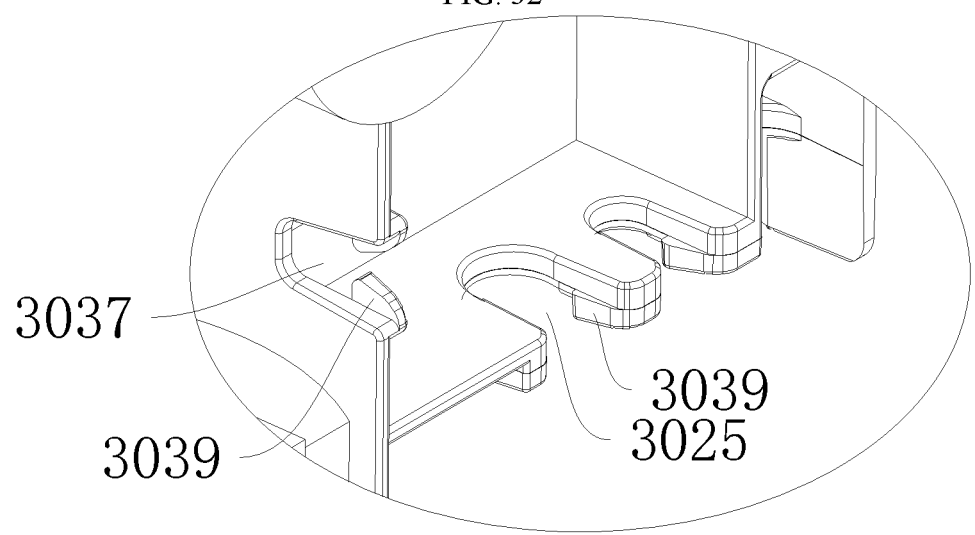
FIG. 33 is a partial schematic view of a wire-routing structure in an electric control box according to an embodiment of the present disclosure.
Figure 34:
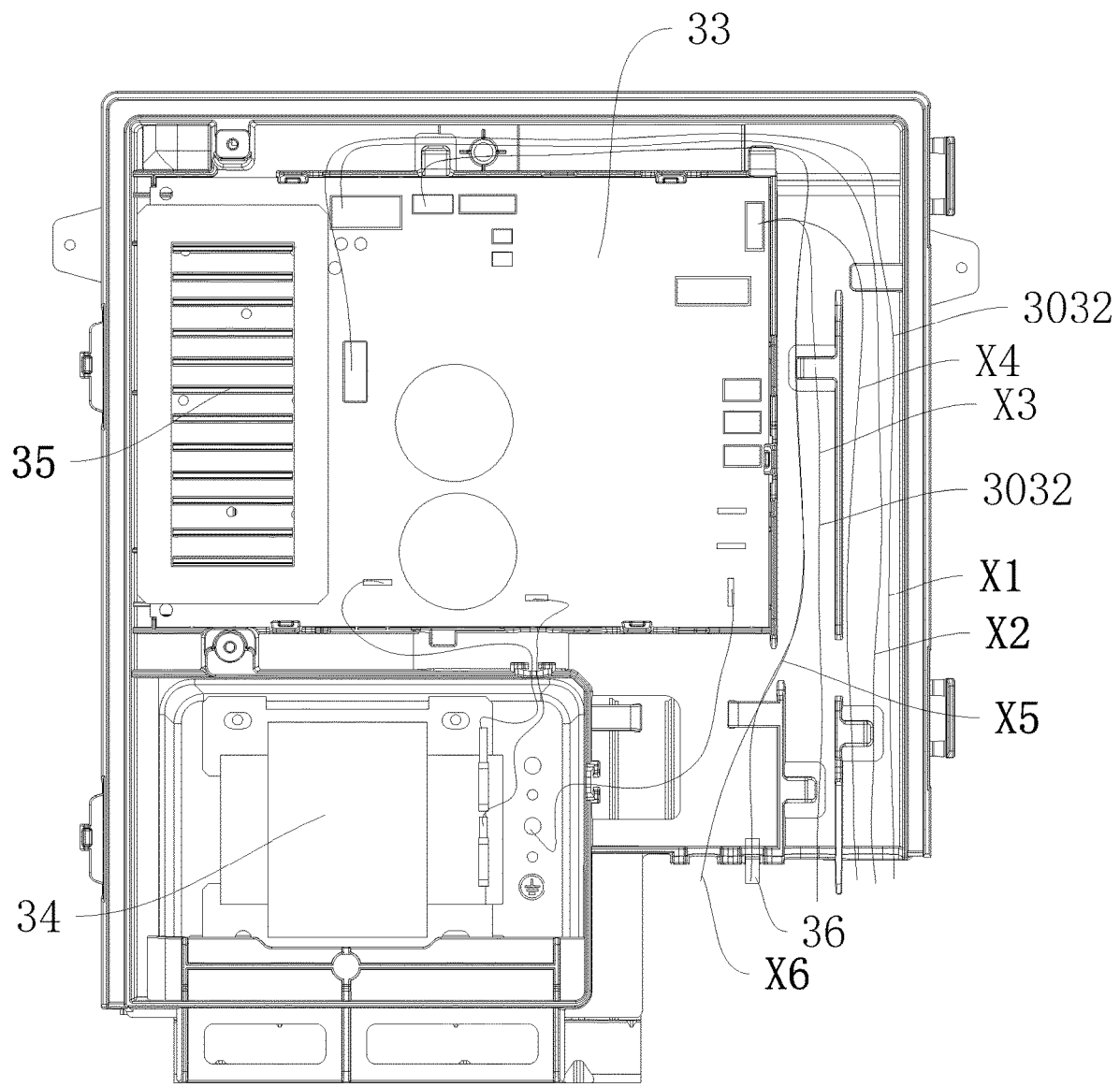
FIG. 34 is a schematic view of a wire-routing structure in an electric control box according to an embodiment of the present disclosure.

Optionally, as shown in FIG. 31, the first inner shell 311 has an avoidance opening 3038 formed therein. The inductor 34 is disposed in the avoidance opening 3038 and is directly mounted at the first outer shell 313. Here, the avoidance opening 3038 may be formed by enclosure of the partition wall 3018 as described above.

Optionally, with reference to FIGS. 1 to 18, a part of the first outer shell 313 is recessed inwardly to form a recessed platform structure 3066 at an inner side of the first outer shell 313, and the inductor 34 is mounted at the recessed platform structure 3066. In this way, more installation space will be provided for the inductor 34, and the inductor 34 can be connected to the recessed platform structure 3066 by the fastener. Since the recessed platform structure 3066 forms a recess on an outer surface of the box body 31, the fastener would protrude into the recess formed by the recessed platform structure 3066 when the inductor 34 and the recessed platform structure are connected by the fastener, which effectively maintains appearance flatness of the electric control box 3 and prevents the fastener from protruding beyond the outer surface of the electric control box 3. Further, it is possible to prevent the head of the screw for fixing the inductor 34 and a head of the grounding screw from protruding beyond the outer surface of the electric control box 3, thereby avoiding injury during assembly or component transportation.

In addition, the recessed platform structure 3066 may also serve as a reinforced structure.

In addition, a grounding structure is formed in the recess formed by the recessed platform structure 3066, which can achieve grounding. Thus, the operation safety of the electric control box 3 is further improved. The inductor 34 is mounted at the recessed platform structure 3066 at the bottom of the box body 31. With this arrangement, on the one hand, a structural strength of a bottom plate 351 of the sheet metal can be strengthened, and on the other hand, the head of the screw for fixing the inductor 34 and the head of the grounding screw can be prevented from protruding beyond the electric control bottom plate 351, and injury during assembly can be avoided.

Optionally, at least one of the first outer shell 313 and the second outer shell 314 is has a grounding structure provided thereon.

Optionally, referring to FIGS. 12 to 15, the box body 31 has a vacated opening 3058 formed therein, and the radiator 35 extends out of the box body 31 through the vacated opening 3058.

In conjunction with the embodiments as described above, the box body 31 has a recessed structure 307 provided at the outer surface thereof, and the vacated opening 3058 may be disposed at the recessed structure.

In addition, at least a part of the inductor 34 of the present disclosure may be disposed in the protrusion structure corresponding to the recessed structure 307.

As shown in FIGS. 16 to 26, the inductor 34 and the circuit board 33 are arranged in an above-below relationship. The inductor 34 may be arranged below the circuit board 33 to lower a center of gravity of the electric control box 3, thereby improving the stability. In addition, as shown in FIGS. 16 to 26, the inductor 34 and the box body 31 are positioned by means of the insertion buckle 324 and the fastener, so that the inductor 34 is stably fixed on the box body 31. The inductor 34 is provided with the grounding screw and the grounding mark, and the grounding screw passes out of an inside of the box body 31. Specifically, since the inductor 34 is relative heavy, in order to ensure the stability of the center of gravity of the electric control box 3, the inductor 34 is mounted and fixed at a lower part of the first outer shell 313 on the first outer shell 313. On the one hand, it is conducive to heat dissipation, and on the other hand, the structure is firm and reliable.

Optionally, the circuit board 33 is fixedly mounted in the insulation inner shell 303, and the inductor 34 is mounted at the fireproof outer shell 304. In this way, the effective insulation of the circuit board 33 can be ensured, thereby improving the operation safety of the circuit board 33. In addition, the inductor 34 is mounted at the fireproof outer shell 304, which can improve the stability of the inductor 34.

In general, since the inductor 34 has relatively heavy weight, by directly installing the inductor 34 on the fireproof outer shell 304, the stability of the inductor 34 can be effectively improved.

As shown in FIGS. 16 to 26, the electric control box 3 also includes a radiator 35. The radiator 35 is connected to at least some of the electronic components 331 on the circuit board 33 and is adapted to transfer heat to form a heat dissipation structure. By the radiator, the circuit board 33 can dissipate heat, especially the electronic components 331 that generate a large amount of heat on the circuit board 33 can rapidly dissipates heat, thereby preventing failure from occur due to an overheating of the circuit board 33.

In conjunction with the embodiments as described above, optionally, the box body 31 has a vacated opening 3058 formed at a wall thereof. The vacated opening 3058 is configured such that the radiator 35 is extendable out of the box body 31. Thus, the heat dissipation of the radiator 35 is facilitated, and the heat dissipation effect is improved. Further, the operating environment of the circuit board 33 is effectively maintained, and the working stability of the circuit board 33 is improved.

Optionally, as shown in FIGS. 16 to 26, the radiator 35 includes a bottom plate 351 and a heat dissipation fin 352. The bottom plate 351 is connected to at least some of the electronic components 331 on the circuit board 33 and is adapted to transfer heat. The bottom plate 351 is located within the box body 31. The heat dissipation fin 352 is connected to the bottom plate 351 and extends out of the box body 31 from the vacated opening 3058. The heat generated during the operation of the circuit board 33 will be partially transferred to the bottom plate 351, and then the heat on the bottom plate 351 will be transferred to the heat dissipation fin 352. The heat dissipation fin 352 performs the heat exchange with a medium outside the electric control box 3 to complete the heat dissipation of the corresponding electronic components 331 on the circuit board 33.

In the present disclosure, the base 1 of the radiator 35 and the heat dissipation fin 352 may be integrally formed, so that the heat transfer and heat dissipation efficiency can be effectively improved.

In addition, as shown in FIGS. 16 to 26, the radiator 35 may further include a seal 353 surrounding the heat dissipation fin 352. The seal 352 is arranged between the bottom plate 351 and a periphery of the vacated opening 3058 to form a sealing structure. Through a sealing of the seal 353, it is possible to prevent water and the like outside the electric control box 3 from entering the electric control box 3 and causing potential safety hazards.

Optionally, as shown in FIGS. 16 to 26, the seal 353 has a plurality of annular ribs 354 provided at a surface thereof abutting with a peripheral edge of the vacated opening 3058. Each of the annular ribs 354 is in a form of ring extending along a circumferential direction of the seal 353. The plurality of annular ribs 354 are formed into a plurality of rings arranged at intervals from inside to outside. In this way, the plurality of annular ribs 354 will form a multi-layer sealing structure with the periphery edge of the vacated opening 3058, which further improves the sealing effect.

Optionally, each of the annular ribs 354 is constructed to have a semicircular, trapezoidal or rectangular cross-section.

In addition, a slot between two adjacent annular ribs 354 is constructed into a semicircular, trapezoidal or rectangular shape. The second inner shell 312 and the seal 353 are designed to be pressed against each other, and the plurality of ribs are designed to be pressed and sealed to prevent external water sources from entering the electric control box 3.

In addition, in the present disclosure, the radiator is arranged at the box base, the box cover covers the box base, and the radiator protrudes from the box cover. The box cover is connected to the box base by the fastener at positions adjacent to both ends of the radiator.

Optionally, as shown in FIGS. 16 to 26, the seal 353 includes a first portion 355 and a second portion 356. The first portion 355 covers over a peripheral edge of a surface of the bottom plate 351 connected to the heat dissipation fin 352, and the second portion 356 is sleeved on a peripheral surface of the bottom plate 351. Through a cooperation of the first portion 355 and the second portion 356, the seal 353 can be stably mounted at the bottom plate 351, which can effectively improve the stability of the engagement between the seal 353 and the bottom plate 351, thereby improving the sealing performance between the seal 353 and the box body 31.

Optionally, the heat dissipation fin 352 has a surface formed into a corrugated surface, so that a surface area of the heat dissipation fin 352 can be increased, thereby increasing the heat dissipation effect of the heat dissipation fin 352 to improve the heat dissipation effect of the electric control box 3.

In addition, with reference to FIGS. 16 to 26, at least some of the electronic components 331 on the circuit board 33 has heat-conduction sheet 358 thereon. The heat-conduction sheet 358 can transfer heat with the electronic components 331, and the radiator 35 cooperates with the heat-conduction sheet 358 and is adapted to conduct heat.

A gap in a range of 0.1 mm to 1 mm may be formed between the radiator 35 and the heat-conduction sheet 358, and may be filled with a heat-conducting medium to improve the heat dissipation effect.

Optionally, the circuit board 33 may also have a heat dissipation support 357 provided thereon. During the installation, the radiator 35 is mounted at the heat dissipation support 357, and the heat-conducting medium is filled between the radiator 35 and the heat-conduction sheet 358, such that a heat conduction between the heat-conduction sheet 358 and the radiator 35 can be performed by the heat-conducting medium.

In addition, the heat-conduction sheet 358 may be mounted at the heat dissipation support 357. The heat-conduction sheet 358 is designed to be mounted at the circuit board 33. Heat generated by a heating device on the circuit board 33 is transferred to the heat-conduction sheet 358 by a heat-conducting pin, and then is transferred to the radiator 35 by a heat-dissipating paste (the heat-conducting medium) between the heat-conduction sheet 358 and the radiator 35. The heat is finally transferred to the radiator 35. Finally, the excess heat is transferred to the outside of the electric control box 3 by the radiator 35.

In conjunction with the embodiments as described above, the electric control box 3 has a circuit board 33 provided therein, and electronic components 331 are arranged at the circuit board 33. Some of the electronic components 331 generate a large amount of heat and need to dissipate heat by the radiator 35. The radiator 35 cooperates with the electronic components 331 for the heat dissipation. In addition, a gap is formed between the radiator 35 and the corresponding electronic component 331, and the gap may be filled with a heat transfer medium such as a silica gel or the like. Further, the electric control box 3 has an inductor 34 provided at a lower part thereof, and the inductor 34 is separated from the circuit board 33. A partition wall 3018 may be arranged between the inductor 34 and the circuit board 33. The first outer shell 313 has an installation portion 302 provided at a lower end thereof, and installation portion 302 extends forwardly. The second inner shell 312 has an installation portion 302 provided at a bottom thereof, and the installation portion 302 protrudes beyond a rear side of the second inner shell 312 or a rear side of the second outer shell 314 (or the box body 31). These two installation portions 302 are both connected to the base 1 by the fastener. In addition, as can be seen from the drawings, the radiator 35 extends out of the electric control box 3.

In addition, as shown in FIGS. 16 to 26, the second outer shell 314 is recessed on an upper part thereof at the right side to form a structure for accommodating an extending part of the radiator 35. The second outer shell 314 has a reinforcement rib 3046 provided thereon, and the reinforcement rib 3046 spans the recess and other part of the second outer shell 314. In addition, after the recessed structure 307 is formed on the second outer shell 314, an opening is formed at a lower end of the recessed structure 307. The opening cannot be closed through sheet metal forming, and a patch block 32 is additionally provided to close the opening. By the patch block 32, an integrity of the electric control box 3 can be maintained, thereby effectively protecting an inner space of the box body 31 and maintaining the stable operation of the electric control box 3. The cover plate 321 has a first flange 322 provided at a part of edge thereof. The first flange 322 extends upwardly, and is connected to a peripheral wall of the recessed structure 307. In addition, the cover plate 321 further has a second flange 323 formed by extending from a part of the edge of the cover plate 321 downwardly. The second flange 323 is connected to a peripheral wall of the protrusion structure.

Optionally, the bottom plate 351 and the seal 353 of the radiator 35 are pressed by the second inner shell 312. The radiator 35 has fasteners provided at both sides thereof in the longitudinal direction, and the fasteners is configured to fasten the first inner shell 311 and the second inner shell 311 to press the seal 353.

In conjunction with the embodiments as described above, the circuit board 33 is mounted at the inner side of the box base 305, and the radiator 35 is mounted at the circuit board 33. When the box cover 306 is covered onto the box base 305, the radiator 35 protrudes beyond the box cover 306. In this case, the fastener may be disposed at each of both ends of the box cover 306 on an upper side to connect and position the box cover 306 and the box base 305. In this way, the connection between the box cover 306 and the box base 305 can be easily achieved. Further, it is possible to ensure that the seal 353 between the radiator 35 and the box cover 306 is clamped, thereby improving the sealing performance between the radiator 35 and the box cover 306.

Here, in conjunction with other embodiments of the present disclosure, the circuit board 33 and the radiator 35 are mounted at the box base 305. The box cover 306 has a vacated opening 3058 formed therein, and the radiator 35 protrudes from the vacated opening 3058. The seal 353 is arranged between the radiator 35 and an inner surface of the box cover 306. The first inner shell 311 and the second inner shell 312 are connected by the fasteners on both sides of the radiator 35 in the vertical direction. The second outer shell 314, the second inner shell 312, and the first inner shell 311 are connected in series and fixed together by one of the fasteners, and the patch block 32 (the first flange 322), the second outer shell 314, the second inner shell 312, and the first inner shell 311 are connected together by the other fastener.

Figure 27:
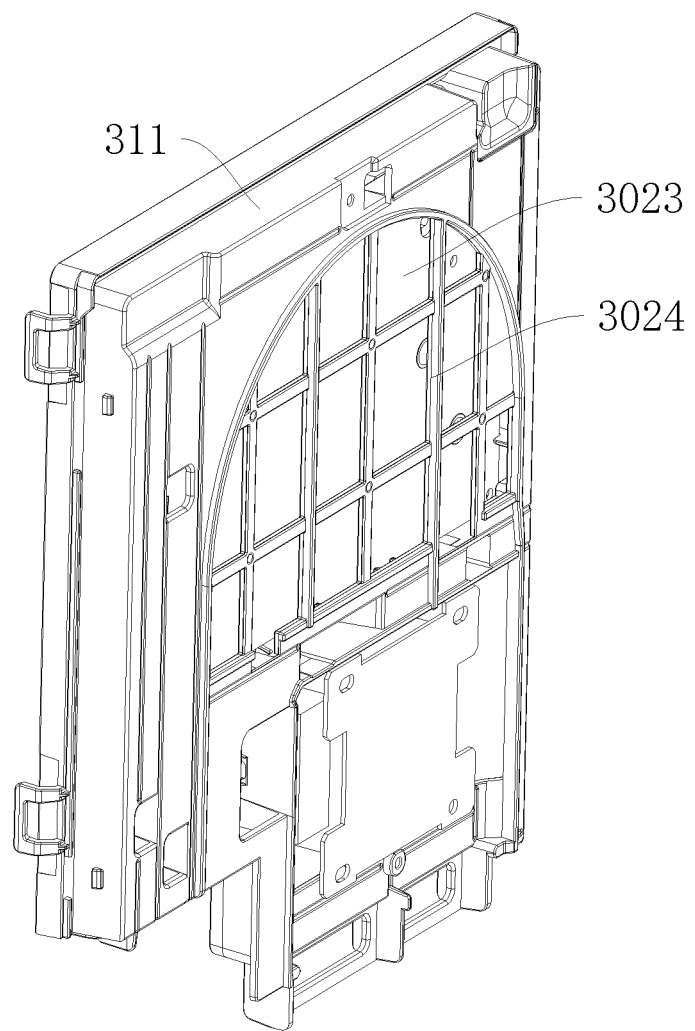
FIG. 27 is a schematic view of a first inner shell in an electric control box according to an embodiment of the present disclosure.
Figure 28:
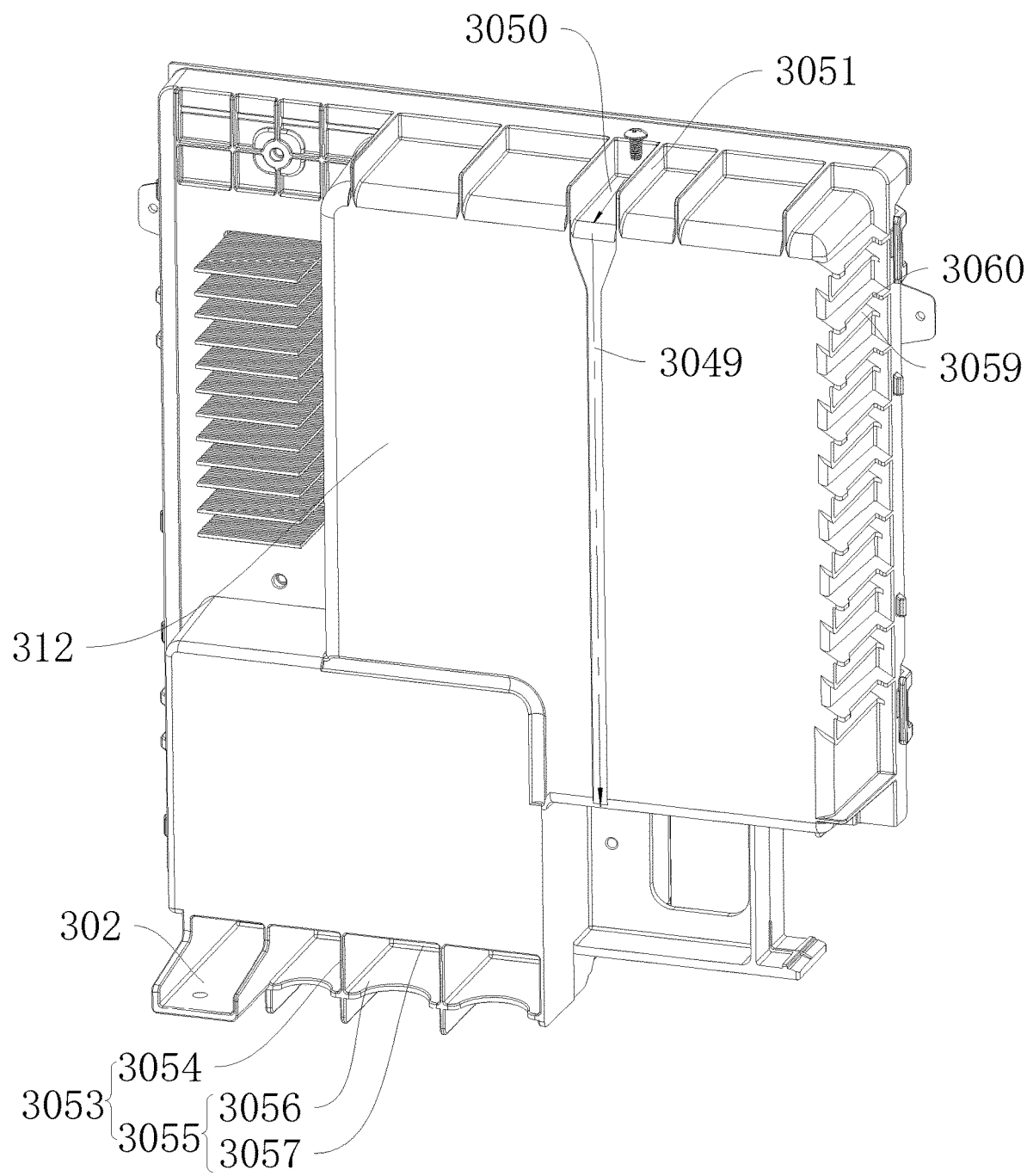
FIG. 28 is a schematic view of a second inner shell in an electric control box according to an embodiment of the present disclosure.
Figure 29:
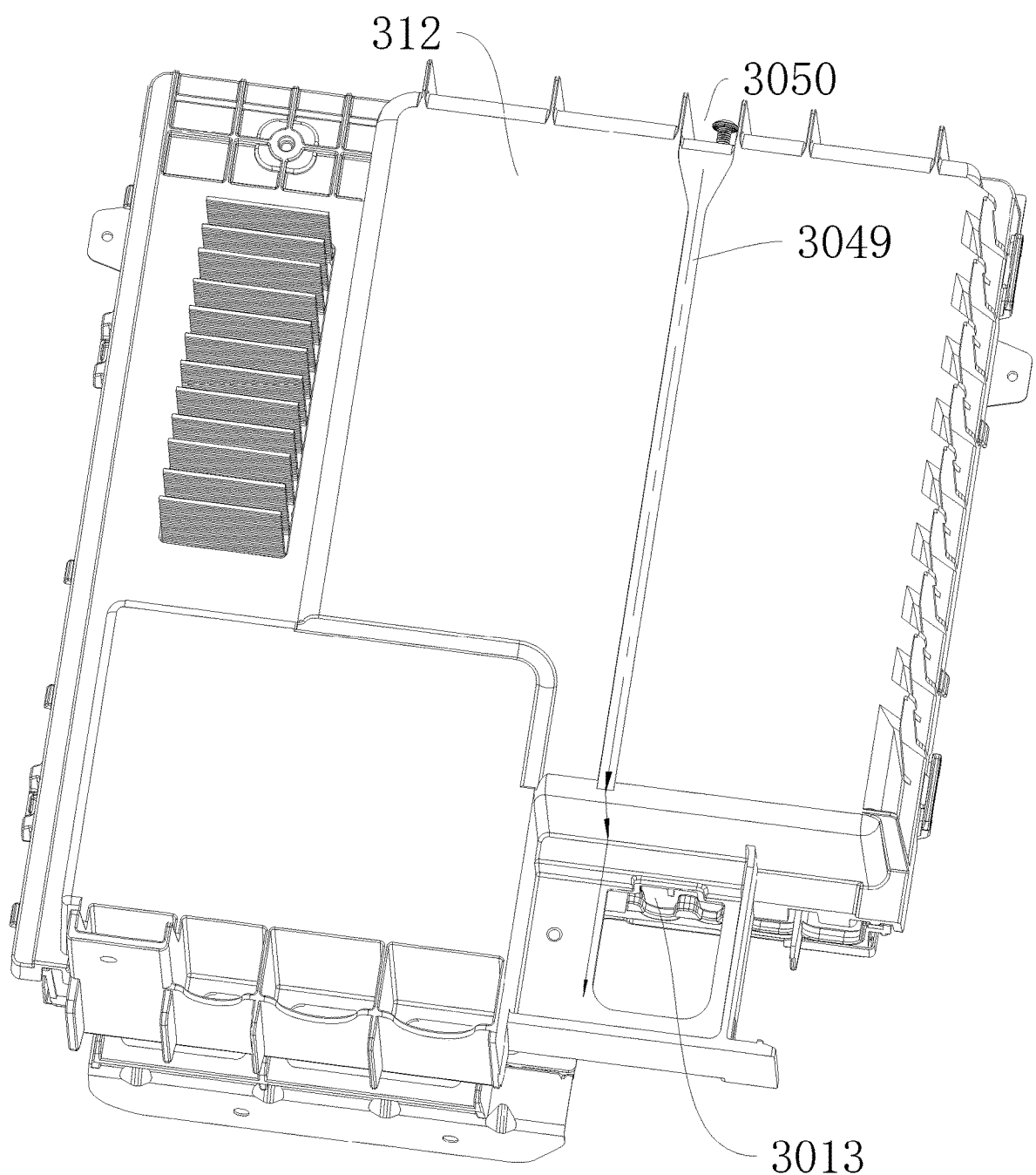
FIG. 29 is a schematic view of a second inner shell in an electric control box according to an embodiment of the present disclosure.
Figure 30:
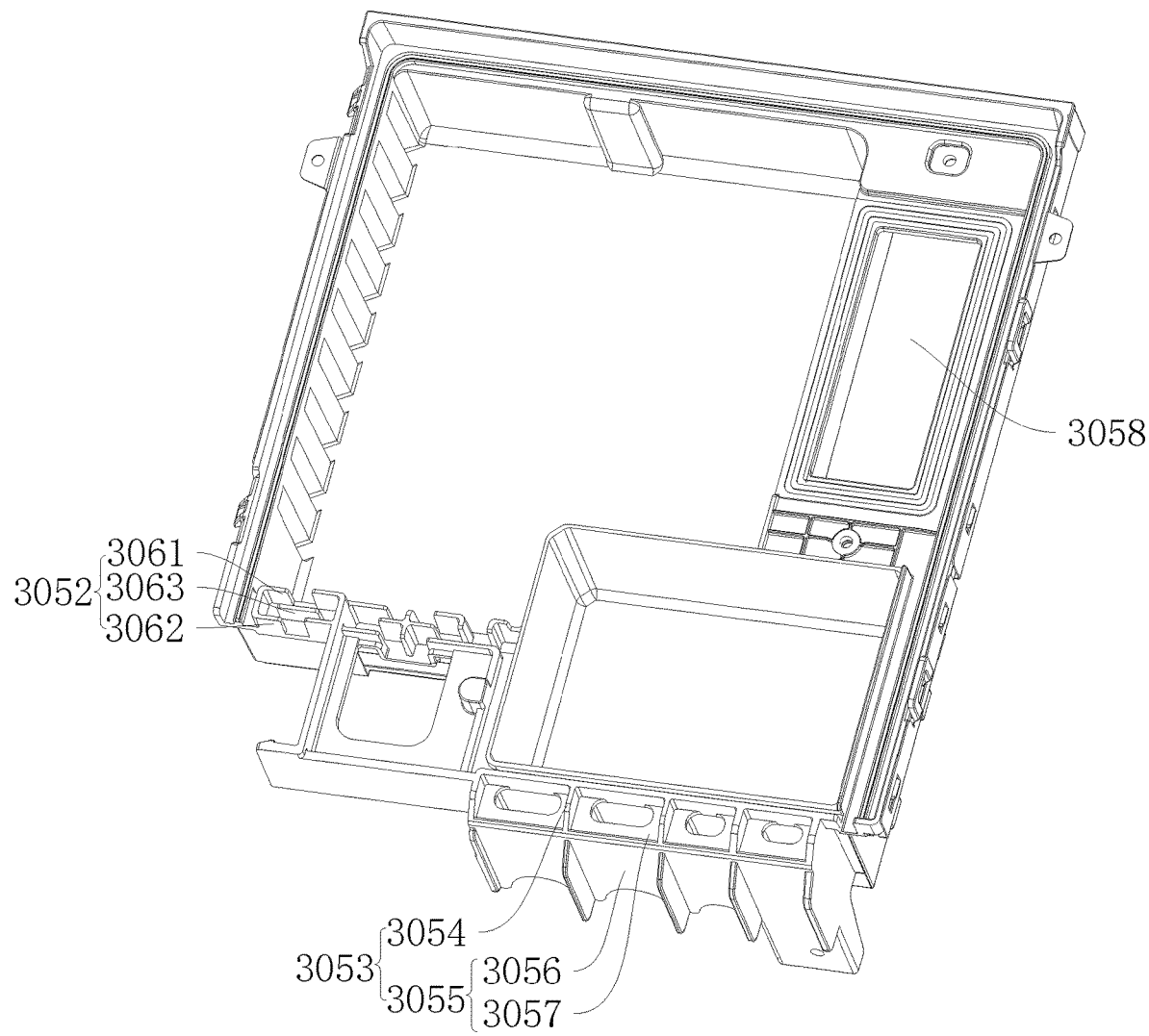
FIG. 30 is a schematic view of a second inner shell in an electric control box according to an embodiment of the present disclosure.

Optionally, as shown in FIG. 27, at least one of the first inner shell 311 and the second inner shell 312 has a heat dissipation window 3023 formed therein. The heat dissipation window 3023 is configured to facilitate the heat exchange between the heat inside the electric control box 3 and the heat outside of the electric control box 3. Specifically, during use, the heat inside the electric control box 3 will be discharged to the fireproof outer shell 304 through the heat dissipation window 3023. The fireproof outer shell 304 is generally supported by a metal material. In this way, after the heat is transferred to the fireproof outer shell 304, a heat exchange between the fireproof outer shell 304 and an external medium of the box body 31 can be easily performed, thereby improving the heat dissipation effect of the electric control box 3.

In addition, because the heat dissipation window 3023 is only disposed at the inner shell and the heat dissipation window 3023 is closed by the outer shell, it is possible to prevent external water, steam and the like from entering the interior of the electric control box 3 while improving the heat dissipation effect, thereby ensuring the stable operation of the electric control box 3.

Optionally, as shown in FIG. 27, the heat dissipation window 3023 is connected to support ribs 3024 in a form of grids arranged in a crisscross pattern. By arranging the support ribs 3024, the structural strength and stability of the inner shell can be effectively improved.

Optionally, the circuit board 33 is mounted at the first inner shell 311, and the heat dissipation window 3023 is disposed in a region of the first inner shell 311 opposite to the circuit board 33 to improve the heat dissipation effect of the circuit board 33.

Optionally, a gap in a range of 8 mm to 18 mm may be formed between the circuit board 33 and the first outer shell 313, such that a safe distance is maintained between the circuit board 33 and the first outer shell 313, which can effectively improve the safety of the electric control box 3.

The circuit board 33 will generate heat during operation of the air conditioner, especially certain heating components would generate heat to cause a temperature in the electric control box 3 to increases too high, thereby damaging other electrical components. An electric control board is hollowed out on a back surface thereof, so that heat in the hollow position is brought into direct contact with an outer sheet metal part (the first outer shell 313) to dissipate the heat inside the electric control box 3 to the outside of the electric control box 3. However, in order to ensure an effective safety distance between the sheet metal part and the electrical components, a distance D between the circuit board 33 and the second outer shell 314 is in a range from 8 mm to 18 mm, which on the one hand facilitates heat dissipation, and on the other hand provides safety considerations for safety regulations.

In conjunction with the embodiments as described above, in the electric control box 3, the inductor 34 and the circuit board 33 are both arranged in the electric control box 3, and an inner surface of the plastic inner cover of the electric control box 3 has a partition wall 3018, which partitions a region where the circuit board 33 is located and a region where the inductor 34 is located. In addition, a radiator 35 is mounted at the circuit board 33 and extends out of the box cover 306 of the electric control box 3. In the connection method of the radiator 35 and the circuit board 33, the seal 353 is arranged at the periphery of the radiator 35; in the structure and arrangement of the heat dissipation fin 352 of the radiator 35, the radiator 35 is located above the inductor 34; a metal outer box outside the electric control box 3 includes a patch block 32 located above the inductor 34 to avoid direct sunlight; the circuit board 33 is mounted at the plastic inner shell of the box base of the electric control box 3 through the snap-fit, such as on a structural shape of the plastic inner shell.

In the electric control box 3 according to some embodiments of the present disclosure, since the electric control box 3 employs the assembly of the insulation inner shell 303 and the fireproof outer shell 304, water entering may occur between the insulation outer shell and the fireproof inner shell. Therefore, it is necessary to guide the water in the insulation outer shell and the fireproof inner shell in a direction away from the inner space of the electric control box 3. For this reason, in some embodiments of the present disclosure, a flow guide structure is provided for drainage. The box body 31 of the electric control box 3 may employ the structure of the box body 31 described in other embodiments.

Specifically, as shown in FIGS. 1 to 34, the electric control box 3 includes a box body 31. The box body 31 is arranged in the vertical direction, and has a first end (refer to an upper end of the box body 31 in the drawings) and a second end (refer to a lower end of the box body 31 in the drawings) opposite to each other in the vertical direction. Here, the box body 31 includes an insulation inner shell 303 and a fireproof outer shell 304. The insulation inner shell 303 can ensure an effective insulation between the circuit board 33 and the electric control box 3 to ensure the safety of the electric control box 3. The fireproof outer shell 304 can effectively improve the fireproof performance of the electric control box 3, and even if the electric control box 3 burns due to failure, other parts of the air conditioner will not be damaged or even cause a fire.

The insulation inner shell 303 is arranged vertically, and the fireproof outer shell 304 covers over the insulation inner shell 303. A flow guide groove 3049 is arranged between the fireproof outer shell 304 and the insulation inner shell 303 and extends vertically. During use, water may enter between the insulation inner shell 303 and the fireproof outer shell 304. In this case, the water between the insulation inner shell 303 and the fireproof outer shell 304 may penetrate into the electric control box 3, which may cause the electric control box 3 failure. Therefore, the flow guide groove 3049 is provided in the present disclosure, the water between the insulation inner shell 303 and the insulation outer shell can be guided to a predetermined position for discharge through the flow guide groove 3049, thereby ensuring that the electric control box 3 can operate stably. The flow guide groove 3049 extends to the first end of the box body.

The electric control box 3 according to the embodiments of the present disclosure is provided with the flow guide groove 3049 to guide the water in a direction away from the inner space of the electric control box 3.

In order to realize the connection between the electric control box 3 and the housing of the outer casing 22, the outer casing 22 may be connected to a top of the fireproof outer shell 304 by the fastener. In this case, it is necessary to arrange a positioning hole 3070 on the fireproof outer shell 304. The arrangement of the positioning hole 307 may allow the water to enter between the fireproof outer shell 304 and the insulation inner shell 303 along the fastener.

Optionally, the positioning hole 3070 is arranged at the fireproof outer shell 304 at the first end of the box body, and the flow guide groove 3049 extends to the first end at one end thereof and is vertically opposite to the positioning hole 3070 at one end thereof. As mentioned above, the water may enter between the fireproof outer shell 304 and the insulation inner shell 303 through the positioning hole 3070. In this case, since the flow guide groove 3049 is opposite to the positioning hole 3070 at one end thereof, the water will flow through the guide action of the flow guide groove 3049, thereby discharging the water entering between the fireproof inner shell and the insulation outer shell in place.

In conjunction with the embodiments as described above, the box body 31 includes an insulation inner shell 303 and a fireproof outer shell 304.

The insulation inner shell 303 includes a first inner shell 311 and a second inner shell 312 assembled to each other in the longitudinal direction, and the second inner shell 312 has a flow guide groove 3049 formed at an outer surface thereof. The flow guide groove 3049 extends in the vertical direction. The fireproof outer shell 304 includes a first outer shell 313 and a second outer shell 314. The first outer shell 313 is configured to cover over the first inner shell 311, and the second outer shell 314 is configured to cover over the second inner shell 312. The flow guide groove extends to the first end of the box body.

Optionally, the second outer shell 314 has an outwardly protrusion structure 3071 provided thereon. The outwardly protrusion structure 3071 protrudes vertically in a direction away from the second inner shell 312, and a positioning hole 3070 is disposed at the outwardly protrusion structure 3071. In other words, at the first end of the box body 31, the fireproof outer shell 304 is provided with the outwardly protrusion structure 3071, and the positioning hole 3070 is disposed at the outwardly protrusion structure 3071. By the outwardly protrusion structure 3071, the water entering between the inner and outer shells through the positioning hole 3070 can be reduced, thereby improving the stability and safety of the electric control box 3.

At the first end of the box body, the positioning hole 3070 is disposed at the second outer shell 314, and the flow guide groove 3049 extends to be vertically opposite to the positioning hole 3070 at one end thereof.

Optionally, at the first end of the box body, the second inner shell 312 has a protrusion rib 3047 provided at an edge thereof, and the protrusion rib 3047 protrudes vertically in a direction away from the inner space of the box body 31. The protrusion rib 3047 is located at the first end of the box body 31 and protrudes beyond an edge of the second outer shell 314 in the vertical direction. The protrusion rib 3047 can block water and other media so that the water and other media is located outside the second outer shell 314, rather than flowing to the assembled position between the first inner shell 311 and the second inner shell 312, which provides effective waterproofness.

Optionally, a distance L1 between the protrusion rib 3047 and the positioning hole 3070 is not less than 6 mm. Thus, it is possible to ensure no medium such as the water would flow to the assembling position between the first inner shell 311 and the second inner shell 312.

Optionally, at the first end of the box body 31, an end surface of the second inner shell 312 is longitudinally inclined towards the second end of the box body 31 in a direction facing away from the first inner shell 311. The water dripping on the second outer shell 314 and the water entering the second inner shell 312 will flow along the inclined end surface by the gravity, thereby preventing the water from flowing to the assembled position between the first inner shell 311 and the second inner shell 312.

Optionally, at the first end of the box body 31, the flow guide groove 3049 extends to the end surface of the second inner shell 312 at an end thereof and is form with an avoidance groove 3050 at this end. The avoidance groove 3050 has a bottom surface spaced apart from the second outer shell 314, and faces the positioning hole 3070 in the vertical direction. By arranging the avoidance groove 3050, when the casing of the window air conditioner 1000 and the box body 31 are connected by the fastener, the fastener cannot be in contact with the second inner shell 312 to ensure that the second inner shell 312 is not damaged and improve the waterproof performance of the electric control box 3. In addition, the avoidance groove 3050 is formed as an inlet of the flow guide groove 3049, so that the water entering between the fireproof outer shell 304 and the insulation inner shell 303 can be discharged as soon as possible.

Optionally, at the first end of the box body 31, at least a part of the end surface of the second inner shell 312 is spaced apart from the second outer shell 314, and is provided with a plurality of ribs 3051. The ribs 3051 extend vertically and longitudinally, and the plurality of ribs 3051 are arranged at intervals in the transverse direction. Further, the avoidance groove 3050 is formed between two adjacent ribs 3051.

Specifically, the insulation inner shell 303 is provided with a plurality of ribs 3051 at the first end thereof. The plurality of ribs 3051 are arranged at intervals in the transverse direction (i.e., the leftward-rightward direction in the drawings), and extend in the longitudinal direction (i.e., the frontward-rearward direction in the drawings). In this way, a groove is formed between two adjacent ribs 3051, thus the water entering through the positioning hole 3070 can be received within the groove, so as to facilitate guiding the water entering between the inner and outer shells.

In addition, the flow guide groove 3049 is provided at an outer surface of the insulation inner shell 303. In general, the insulation inner shell 303 is made of plastic, and the fireproof outer shell 304 is made of a sheet metal parts. Thus, it is easier to form the flow guide grooves 3049 on the plastic part than to form the flow guide grooves 3049 on the sheet metal part. Therefore, in the present disclosure, by arranging the flow guide groove 3049 on the insulation inner shell 303, the manufacturing process can be effectively simplified.

Further, in conjunction with the sealing structure between the first inner shell 311 and the second inner shell 312 in the embodiments as described above, the waterproof performance of the electric control box 3 can be further improved.

Optionally, the top wall of the casing assembly 2 is screwed to the first end of the electric control box 3. Through the screw connection, the stability of the electric control box 3 can be effectively improved, especially in the process of transportation and drop test, the electric control box 3 can still maintain in a stable state.

Optionally, the casing assembly 2 has an inwardly recessed structure 205 provided at the top wall thereof, and the electric control box 3 has an outwardly protrusion structure 3071 provided at the first end thereof. The inwardly recessed structure 205 and the outwardly protrusion structure 3071 are connected to each other by the fastener. The inwardly recessed structure 205 of the casing assembly 2 is engaged with the outwardly protrusion structure 3071 of the electric control box 3, which can facilitate the connection of the casing assembly 2 and the electric control box 3 by the fastener. Moreover, the inwardly recessed structure 205 can be configured to accommodate a head of the screw to ensure that the outer surface of the casing assembly 2 is flat.

The inwardly recessed structure 205 can prevent the head of the screw of the outer casing from protruding from a surface of the outer casing, and the recessed region for the screw, where a little rainwater will be accumulated, is design. Therefore, by designing the flow guide groove 3049 to correspond to a screw connection, it is possible to prevent water droplets penetrating through screw holes of the outer casing from remaining on the electric control box 3, and to discharge the water droplets into the base 1 along the flow guide groove 3049 for reutilization (a condensed water in the base 1 is typically used to cool the condenser through water throwing by a water throwing ring of the axial flow fan 225 to improve product capacity and energy efficiency).

The electric control box 3 is vertically mounted at a side of the outdoor air duct. In order to avoid large shaking, one of the screws on the top of the electric control box 3 is connected and fixed to the outer casing. An opening of a louver part of the outer casing (i.e., an air inlet 203 on a side of the outer housing 221 facing away from the base 1) is located above the electric control box 3. The cover of the electric control box 3 of sheet metal is designed without opening to prevent the outside water from splashing into the electric control box 3.

Optionally, in the window air conditioner 1000 having the electric control box 3, the outer casing 22 includes an outer housing 221. The electric control box 3 is arranged within the outer housing 221, and is connected to the outer housing 221 by the fastener. Optionally, the fastener is engaged with the positioning hole 3070 as described above.

Optionally, the casing assembly 2 has a louver provided at a side surface thereof facing away from the base 1, and the louver faces the second outer shell. At the first end of the box body, the second inner shell has a protrusion rib on an edge thereof. Further, the protrusion rib protrudes vertically in a direction facing away from the inner space of the box body, and protrudes beyond the edge of the second outer shell in the vertical direction. The louver has a flange rib provided at a peripheral edge thereof. Further, a distance between the flange rib and the protrusion rib is not less than 6 mm to facilitate an entry of the air and heat dissipation of the electric control box 3.

The louver is opposite to the second outer shell 314 in a vertical direction, or the louver is staggered with the first outer shell 313 in the vertical direction. When water enters the outer casing 22 through the louver, the water would splash on the second outer shell 314, and the water from the louver of the outer casing only flows downwardly to a partial region of a top of the cover of electric control box 3 of sheet metal, and then flows into the base 1 along the outer surface of the electric control box 3 of sheet metal. In addition, the louver has a flange rib 207 provided at a periphery thereof. Further, the flange rib 207 extends towards the interior of the outer casing 22, and a distance L2 between the flange rib 207 and the above protrusion rib 3047 is not less than 6 mm. Therefore, it is advantageous to the removal of water from the top of the electric control box 3, avoiding the water from entering the electric control box 3 to affect quality of the product.

Optionally, the insulation inner shell 303 has heat dissipation holes 3059 formed at the side wall thereof. Further, the heat dissipation holes 3059 passes through the side wall of the insulation inner shell 303, and are inclined towards the second end in an inside-outside direction. In this way, heat inside the insulation inner shell 303 will be dissipated through the heat dissipation holes 3059. Since the insulation inner shell 303 is protected by the fireproof outer shell 304, external water, steam or the like would not enter the interior of the box body 31 through the heat dissipation holes 3059, and the heat can be dissipated through the fireproof outer shell 304, so that waterproofing, fireproofing and heat dissipation functions can be achieved.

Optionally, at least a part of a peripheral wall of each of the heat dissipation holes 3059 protrudes beyond an outer side surface of the insulation inner shell 303. Protruding of the peripheral wall of each of the heat dissipation holes 3059 can separate the insulation inner shell 303 from the insulation outer shell, so that an air passageway is formed between the inner and outer shells for air circulation, which further improves the heat dissipation effect of the electric control box 3.

Optionally, each of the peripheral walls of each of the heat dissipation holes 3059 protrudes beyond the side surface of the insulation inner shell 303. Further, a protruding length of a side wall of each heat dissipation hole 3059 adjacent to the first end is greater than that of a side wall of each heat dissipation hole 3059 adjacent to the second end, and a notch groove 3060 is formed at an edge of the side wall of each heat dissipation hole 3059 adjacent to the first end. In this way, the heat dissipation holes 3059 will not be blocked by the fireproof outer shell 304, so that the hot air inside the insulation inner outer shell 303 can be flow out through the heat dissipation holes 3059, thereby improving the heat dissipation effect. In addition, by arranging the notch groove 3060 at each heat dissipation holes 3059, it is possible to facilitate a throughout circulation of the air flow in the electric control box 3.

As described above, in the present disclosure, in order to assist in the heat dissipation inside the electric control box 3, the second inner shell 312 is designed to have an oblique downward opening on a side wall thereof, and the second outer shell 314 is designed without an opening. The heat in the electric control box 3 may pass through the opening to be transferred to the second outer shell 314, so that the internal heat is dissipated. In this way, an internal temperature of the electric control box 3 is reduced, which is beneficial to prolong the service life of the electrical components. Further, the side wall is designed to have an oblique downward opening structure, and thus it is possible to prevent the water from downwardly flowing into the electric control box 3 through the oblique opening, in which the water is from the gap of the cover on the top of the electric control box 3 of sheet metal.

Optionally, in conjunction with the embodiments as described above, the insulation inner shell 303 includes a first inner shell 311 and a second inner shell 312 that are assembled to each other, and both the first inner shell 311 and the second inner shell 312 are arranged vertically. By assembling the first inner shell 311 and the second inner shell 312, the insulation inner shell 303 can be easily molded, and the installation of the electronic components 331 and the circuit board 33 in the electric control box 3 can be facilitated, thereby improving the assembly efficiency of the electric control box 3 and providing easy maintenance of the electrical box 3. The fireproof outer shell 304 includes a first outer shell 313 and a second outer shell 314. The first outer shell 313 is configured to cover over the first inner shell 311, and the second outer box body 314 is configured to cover over the second inner shell 312. It is possible to effectively prevent fire, improve the safety performance of the air conditioner, and facilitate the maintenance of the electric control box 3. The first outer shell 313 is provided with a positioning hole 3070 at the first end thereof. An end surface of the first inner shell 311 at the first end is configured to be inclined toward the second end in a direction away from the second inner shell 312. The structure of the box body 31 is simplified, and the water entering the inside of the first outer shell 313 through the positioning hole 3070 is facilitated to be guided, so as to avoid damage to the electric control box 3.

Optionally, in conjunction with the embodiments as described above, at the second end of the box body 31, the second inner shell 312 has a connection member 3043 provided thereon for connecting the base 1. Further, the connection member 3043 has a threaded hole formed therein, and the threaded hole is a blind hole. Furthermore, the connection member 3043 has an opening formed therein.

Optionally, at the second end of the box body 31, the insulation inner shell 303 is provided with an air guiding notch 3052 passing through inner and outer spaces of the insulation inner shell 303. The air guiding notch 3052 is configured as a flow channel extending in a serpentine manner. By arranging the air guiding notch 3052, the airflow can flow through the air guiding notch 3052, so as to dissipate heat of the inner space of the electric control box 3, thereby improving the heat dissipation efficiency and effect. An operation environment of the electric control box 3 can effectively maintained, and the failure rate of the electric control box 3 can be reduced.

Optionally, at the second end of the box body 31, the insulation inner shell 303 is provided with a first baffle 3061, a second baffle 3062 and a third baffle 3063. Further, the first baffle 3061 and the second baffle 3062 have opposite ventilation openings in the vertical direction formed thereon, and the third baffle 3063 is arranged between the ventilation openings of the first baffle 3061 and the second baffle 3062. The first baffle 3061, the second baffle 3062 and the third baffle 3063 are combined to form the serpentine flow channel. Therefore, the structure is simple and the forming is easy. The wire outlet 3013 has a labyrinth rib design, which is conducive for the heat dissipation of the electric control box 3 while preventing the external water source from entering the electric control box 3.

In addition, by arranging the serpentine flow channel, it is possible to effectively prevent a liquid and the like from entering the interior of the electric control box 3 while the heat dissipation efficiency can be improved, thereby improving the waterproof performance of the electric control box 3.

Optionally, the second end of the box body 31 is provided with a wire outgoing notch 3025 passing through the inner and outer spaces of the insulation inner shell 303. The wire outgoing notch 3025 is provided with an outwardly protruding water guide rib 3026 on a periphery thereof. The wire bundle in the box body 31 can be easily drawn out through the wire outgoing notch 3025, and the water guide rib 3026 can facilitate a drainage of the water. The liquid will be drained away from the wire outlet 3013 by means of the water guide rib 3026 to prevent the liquid from entering the wire outgoing notch 3025 to flow into the interior of the box body 31 through a siphonage, thereby further improving the waterproof performance of the electric control box 3.

Optionally, in conjunction with the embodiments as described above, one of the first inner shell 311 and the second inner shell 312 has a wire outgoing notch 3025 provided thereon, and the other has an air guiding notch 3052 provided thereon, and the wire outgoing notch 3025 and the air guiding notch face each other in the longitudinal direction.

When the electric control box 3 is applied in the window air conditioner 1000 as described above, due to the application of the electric control box 3, a stable operation of the window air conditioner 1000 can be ensured, thereby improving the stability of the window air conditioner 1000. In addition, an integration rate of the electric control box 3 can be improved, which facilitates modular design, manufacturing, installation and maintenance of the window air conditioner 1000.

The electric control box 3 of the present disclosure, when used as an electric control component, needs to perform signal transmission with a controlled component, and also needs to receive external control signals and feedback the signals. Therefore, the signal transmission may be performed in a wireless or wired manner. When signal or energy transmissions is performed by wired signals, it is necessary to position the wire bundle.

Therefore, as shown in FIGS. 31 to 34, the electric control box 3 according to the embodiments of the present disclosure includes a box body 31, a circuit board 33, and a radiator 35. The box body 31 has a wiring channel 3027 formed therein, and the wiring channel 3027 has a wire outlet 3013. The wire bundle may be positioned in the wiring channel 3027 and guided to the wire outlet 3013 along the wiring channel 3027 for connecting to other controlled or control devices. The circuit board 33 is arranged in the box body 31, and has electronic components 331. The radiator 35 is in contact with at least some of the electronic components 331 on the circuit board 33 and is adapted to transfer heat to form a heat dissipation structure. The heat generated by the circuit board 33 can be dissipated by the radiator 35, especially for components on the circuit board 33 that consume more energy and generate more heat, so as to maintain the stable operation of the circuit board 33 and reduce the failure rate.

According to the electric control box 3 of the embodiment of the present disclosure, a wiring channel 3027 is provided to guide the wire bundle, which facilitates the arrangement and positioning of the wire bundle. Further, the heat dissipation effect of the circuit board 33 can be improved through the radiator 35, which facilitates the heat dissipate of the circuit board 33.

Optionally, the wiring channel 3027 has a wire-separation rib 3031 provided therein, and the wire-separation rib 3031 divides the wiring channel 3032 into a plurality of wire-separation slots 3032 in a direction perpendicular to an extending direction of the wiring channel 3027. That is, at least two wire-separation slots are spaced apart from each other by the wire-separation rib 3031 in the wiring channel in the direction perpendicular to the extending direction of the wiring channel.

Optionally, the wiring channel 3027 may include a third channel member 3030 disposed at a side of the circuit board and extending vertically. The wire bundle is guided to the wire outlet 313 through the third channel member 3030.

In addition, the wiring channel 3027 may also include a first channel member 3028 disposed at a side of the circuit board 33 in the vertical direction and extending in the transverse direction (refer to the leftward-rightward direction in the drawing). Further, the first channel member 3028 is in communication with the third channel member 3030. In this way, the first channel member 3028 is arranged adjacent to the circuit board 33, and the wire bundle can be guided to a proper position on the circuit board 33 through the first channel member 3028, and the wire bundle can also extend to the third channel member 3030 by means of the guiding of the first channel member 3028 and extend to the wire outlet 3013 by means of the guiding of the third channel member 3030.

In addition, the wiring channel 3027 may also include a second channel member 3029. The first channel member 3028 and the second channel member 3029 are arranged at opposite sides of the circuit board 33 in the vertical direction. The first channel member 3028 and the second channel member 3029 both extend in the transverse direction, and each of the first channel member 3028 and the second channel member 3029 is in communication with the third channel member 3030. In this way, through the wire-routing of three sides of the circuit board 33, the circuit board 33 can be easily wired, and the wire bundles of different types can be connected to the circuit board 33 by different slot portions. For example, the strong electricity and the weak electricity are isolated from each other, which can effectively reduce the signal interference of the strong electricity to the weak electricity.

Optionally, in the present disclosure, the wiring channel 3027 includes the first channel member 3028, the second channel member 3029, and the third channel member 3030. The first channel member 3028 and the second channel member 3029 are arranged at both sides of the circuit board 33 in the vertical direction (refer to the upward-downward direction in the drawings), respectively, and both extend in the transverse direction (refer to the leftward-rightward direction in the drawings). The third channel member 3030 extends in the vertical direction and is connected to an end of each of the first channel member 3028 and the second channel member 3029 facing away from the radiator 35. It should be noted that the transverse direction, the vertical direction and the longitudinal direction are perpendicular to each other. Therefore, the wire bundles can be drawn out from both sides of the circuit board 33 in the vertical direction and the side away from the radiator 35 in the transverse direction, and extend to the wire outlet 3013 through the wiring channel 3027.

Optionally, the first channel member 3028 is connected to one end of the third channel member 3030, the second channel member 3029 is connected to a middle part of the third channel member 3030, and the second channel member 3029 passes through the third channel member 3030 in the transverse direction to divide the third channel member 3030 in the vertical direction. The wire outlet 3013 is disposed at the other end of the third channel member 3030.

Optionally, the third channel member 3030 is provided with a wire-separation rib 3031 extending in the vertical direction and dividing the wiring channel 3027 into a plurality of wire-separation slot 3032 in the transverse direction. By arranging the wire-separation rib 3031, the wiring channel 3027 can be divided into a plurality of wire-separation slots 3032, so that different wire bundles can be guided in different wire-separation slots 3032. For example, weak electricity wire bundles may be guided in some wire-separation slots 3032, while strong electricity wire bundle may be guided in other wire-separation slots 3032, so as to realize the isolation of the strong electricity and the weak electricity.

In addition, the wire-separation rib 3031 is disposed in the third channel member 3030, and the wire-separation rib 3031 is not disposed in the first channel member 3028 or the second channel member 3029. In this case, different wire bundles may pass through the first channel member 3028 and the second channel member 3029, respectively, and then are collected in the third channel member 3030, and the wire bundles collected in the third channel member 3030 can also be separated by the wire-separation rib 3031, so as to achieve different wire bundle routing for the strong electricity and the weak electricity.

The wiring channel 3027 in the electric control box 3 is designed to isolate the strong electricity from the weak electricity, and is divided by the wire-separation rib 3031. Thus, it is beneficial for EMC of the whole machine and to avoid an impact on other household appliances of a user. In addition, the wiring channel 3027 has a limiting clip design to avoid dropping of the wire bundle, which is beneficial to factory's manufacturing and post-sale service. The wire outlet 3013 is designed to have a wire bundle anti-dropping limiting structure to avoid dropping of the assembled wire bundle, which is beneficial to the factory's manufacturing and after-sales maintenance. The wire outlet 3013 is designed to be located below the electric control, may be sealed with a flame retardant sponge to effectively prevent water vapor from entering the electric control box 3.

In the circuit board 33, the components generating a relatively large amount of heat are generally dissipated heat by the radiator 35, so as to facilitate the rapid heat dissipation of these components generating the large amount of heat to maintain the stable operation of the circuit board 33. In addition, the components generating large amount of heat have a relatively great influence on the wire bundle, and excessive heat will affect the service life of the wire bundle, and may also affect the signal transmitted by the wire bundle. Therefore, in the present disclosure, the wiring channel 3027 is arranged away from the radiator 35, so that the influence of the excessive heat on the wire bundle and on the signal transmitted by the wire bundle can be reduced.

Optionally, the wiring channel 3027 is arranged at the outer periphery of the circuit board 33 and extends in a direction away from the radiator 35. The wire outlet 3013 is disposed at a position on the box body 31 facing away from the radiator 35. The stability and signal transmission performance of the wire bundle extending through the wiring channel 3027 can be effectively maintained.

Optionally, the circuit board 33 is perpendicular to the longitudinal direction (the longitudinal direction refers to the frontward-rearward direction in the drawings), and the radiator 35 is disposed at one end of the circuit board 33 in the transverse direction. On the circuit board 33, the components generating the large amount of heat are collected, and are dissipated heat by the radiator 35, which effectively reduces mutual interference between the components generating different amount of heat, and reduces the influence of the heat generated by the component on other components.

In the present disclosure, the circuit board may have a radiator provide thereon, and the radiator is arranged at a position on the circuit board facing away from the third channel member. In addition, the first channel member and the second channel member are arranged at both sides of the circuit board in the vertical direction, extends in the transverse direction and are connected to the third channel member. As a result, the first channel member and the second channel member are also configured to extend in a direction away from the radiator to be connected to the third channel member.

Optionally, the wire-separation rib 3031 is provided with a wire-fixation rib 3033, and a positioning space for positioning the wire bundle is formed between the wire-fixation rib 3033 and a bottom surface of the wiring channel 3027. In addition, the wiring channel 3027 may have a wire-fixation rib 3033 provided at a side wall thereof, and a positioning space for positioning the wire bundle is formed between the wire-fixation rib 3033 and the bottom surface of the wiring channel 3027.

In this way, the wire bundle can be positioned by the wire-fixation rib 3033. Thus, the stability of the wire bundle can be improved, and it is possible to prevent the wire bundle from being dropped, thereby improving a fixing effect of the wire bundle.

In the present disclosure, the circuit board 33 has a wire-separation slot 3032 on a side thereof facing away from the radiator 35. Alternatively, in other words, in the electric control box 3, the wire-separation rib 3031 is disposed in the third groove 3030. Thus, a display box connecting wire X3 and an outdoor temperature sensor connecting wire X5 are located at a left side of the wire-separation rib 3031, and a power source connecting wire X1, an indoor motor connecting wire X2 and an outdoor motor connecting wire X4 are located at a right side of the wire-separation slot 3032. Here, at the wire outlet, the outdoor temperature sensor wire and the display box wire are separated by a partition plate. The outdoor temperature sensor 36 is mounted in the electric control box 3. The circuit board 33 is mounted at a plastic inner shell of the base of the electric control box 3 by the snap-fit. The plastic inner shell of the box base 305 has an avoidance opening 3038. The inductor 34 is brought into contact with the metal outer shell of the box base 305 through the avoidance opening 3038 and is connected to the metal outer shell by the screw.

Optionally, in conjunction with the embodiments as described above, the box body 31 includes a box base 305 and a box cover 306. The circuit board 33 is placed in the box base 305, and the wiring channel 3027 is disposed within the box base 305. The box cover 306 covers and closes the box base 305. During the installation, the circuit board 33 and the wire bundle can be arranged at the box base 305 first, and then the box cover 306 is closed, which can simplify the assembly of the electric control box 3 and facilitate the maintenance of the electric control box 3.

Optionally, both the box base 305 and the box cover 306 are arranged in the vertical direction, and the box base 305 is assembled to the box cover 306 in the longitudinal direction.

In conjunction with the embodiments as described above, at the second end of the box body 31, one of the box cover 306 and the box base 305 has a wire outgoing notch 3025 formed thereon. The wire outgoing notch 3025 has an anti-dropping clip 3039 provided at an opening thereof, and the anti-dropping clip 3039 has an opening. The wire bundle can be positioned by the anti-dropping clip 3039, which improves restraint capability of the wire bundle and facilitates the assembly of the electric control box 3.

Optionally, as mentioned above, at the second end of the box body 31, the other of the box base 305 and the box cover 306 has an air guiding notch 3052 formed thereon, and the wire outgoing notch 3025 and the air guiding notch 3052 face each other in the longitudinal direction to form the wire outlet 3013.

Optionally, the electric control box 3 also includes an outdoor temperature sensor 36 disposed at the box body 31. By providing the outdoor temperature sensor 36, an outdoor temperature can be easily detected, thereby realizing more precise control of the air conditioner. Further, by arranging the outdoor temperature sensor 36 on the box body 31, the installation of the outdoor temperature sensor 36 can be simplified, which further improves a modular design of the electric control box 3.

Optionally, the outdoor temperature sensor 36 is disposed at the wire outlet 3013. As a result, the outdoor temperature sensor 36 is positioned closer to the outdoors, thereby improving accuracy of the detection result.

Optionally, a plurality of wire outlets 3013 may be provided. An inner side of the wire outlet 3013 where the outdoor temperature sensor 36 is disposed is isolated by a partition plate from an inner side of the wire outlet 3013 where the wire bundle is drawn out. The outdoor temperature sensor 36 is isolated from other wire bundles by the partition plate, and thus signal interference can be avoided and the accuracy of the detection result can be improved.

In conjunction with the embodiments as described above, the electrical electric control box 3 may have a circuit board 33 and an inductor 34 provided therein. A wire-passing opening 3037 may be disposed at a partition wall 3018 for separating the circuit board 33 from the inductor 34. The wire-passing opening 3037 is formed into a recessed shape located on at an edge of a peripheral wall of the partition wall 3018, and the wire-passing opening 3037 has an anti-dropping clip 3039 provided at an opening thereof. The anti-dropping clip 3039 has an opening. Thus, the wire bundle can be easily positioned.

In conjunction with the embodiments as described above, the wiring channel 3027 in the present disclosure may be disposed at the first inner shell 311.

In addition, in the present disclosure, a compressor temperature sensor is also provided. A sleeve is arranged at an exhaust pipe of a compressor, and the exhaust temperature sensor is inserted into the sleeve. Further, an elastic clip is inserted into a side wall of the sleeve for fastening the compressor temperature sensor, thereby effectively controlling an exhaust temperature and avoiding the exhaust temperature too high to be in the compressor protection and thus ensuring the safety and reliability of the whole system.

In addition, in the present disclosure, a condenser sensor is also provided. A sleeve is arranged at a refrigerant pipe at an end of the condenser, and the heat exchanger temperature sensor is inserted into the sleeve. Further, an elastic clip is inserted into the side wall of the sleeve for fastening the temperature sensor. In the present disclosure, an evaporator sensor is also provided. A sleeve is arranged at a refrigerant pipe at an end of the evaporator. The evaporator temperature sensor is inserted into the sleeve, and an elastic clip is inserted into a side wall of the sleeve for fastening the evaporator temperature sensor.

Therefore, the electric control box of the present disclosure also has a compressor temperature sensor connecting wire X6 provided therein.

In addition, the electric control box 3 has a support structure provided at a bottom thereof to position the electric control box 3 away from the base 1. The support structure includes support partition plates and a reinforcement plate. The support partition plates extend vertically and are arranged at intervals in the leftward-rightward direction, and the reinforcement plate is connected between adjacent support partition plates. Further, the reinforcement plate may have a through hole formed therein, and the through hole is configured to facilitate a passage of the airflow. Furthermore, the reinforcement plate has an arc-shaped notch structure 102 formed thereon to reduce a thickness of a connection position between the reinforcement plate and the support partition plates, thereby reducing adverse effect during an injection molding cooling and defective injection molding. Here, the support structure may be connected to the corresponding mounting member 302.

Optionally, at the second end of the box body 31, the first inner shell 311 has a first support structure 3034 provided thereon, and the first support structure 3034 has a hole formed thereon. The first support structure 3034 can separate the electric control box 3 from the base 1 of the air conditioner, thereby preventing water and the like from entering the box body 31 to improve the stability of the electric control box 3.

Optionally, the first support structure 3034 includes a plurality of first support partition plates 3035 spaced apart from each other. The first support partition plates 3035 are connected to each other by a first reinforcement member 3036, and the first reinforcement member 3036 has a hole formed thereon. Through a connection between the first support partition plates 3035 and the first reinforcement member 3036, a structural strength of the support structure can be improved. Further, the hole in the first reinforcement member 3036 can effectively improve the performance of drainage and air circulation, thereby improving drainage and heat dissipation.

Optionally, at the second end of the box body 31, the second inner shell 312 has a second support structure 3053 provided thereon, and the second support structure 3053 has a hole formed thereon. Here, the hole on the first support structure 3034 is opposite to that on the second support structure 3053 in the longitudinal direction.

Further, the second supporting structure 3053 includes a plurality of second support partition plate 3054 and a second reinforcement member 3055. The second support partition plates are disposed at the end of the second inner shell and spaced apart from each other. Further, the second support partition plates 3054 extend in the vertical direction, and a plurality of second support partition plates 3054 are spaced apart from each other in the transverse direction. Every two adjacent second support partition plates 3054 are connected to each other by a second reinforcement member 3055, and the second reinforcement member 3055 has a hole formed thereon.

Optionally, the second reinforcement member 3055 includes a first reinforcement plate 3056 and a second reinforcement plate 3057. The first reinforcement plate 3056 is configured to connect two adjacent support partition plates and the second inner shell 312. The first reinforcement plate 3056 extends in the vertical direction, and has a hole formed thereon. The second reinforcement plate 3057 is connected to a side of the first reinforcement plate 3056 facing away from the second inner shell 312 and is connected to two adjacent support partition plates. The second reinforcement plate is perpendicular to the first reinforcement plate.

Optionally, the second reinforcement plate 3057 has an inwardly recessed arc-shaped edge in the longitudinal direction.

In the description of this specification, descriptions with reference to the terms "an embodiment", "some embodiments", "an example", "a specific example" or "some examples", etc., mean that specific features, structure, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art may combine different embodiments or examples described in this specification as well as features of different embodiments or examples without conflicting each other.

Although embodiments of the present disclosure have been illustrated and described, it should be understood that the embodiments as described above are exemplary, rather than being construed as limitation on the present disclosure, and various changes, modifications, replacements, and variations can be made to these embodiments by those skilled in the art that within the scope of the present disclosure.

What is claimed is:

1. An electric control box comprising:
    an insulation inner shell including a first inner shell and a second inner shell that are assembled to each other;
    a fireproof outer shell including a first outer shell and a second outer shell, the first outer shell covering the first inner shell, and the second outer shell covering the second inner shell; and
    a radiator;
    wherein:
        the insulation inner shell and the fireproof outer shell are parts forming a box body of the electric control box; and
        the box body has a vacated opening, the radiator extending out of the box body through the vacated opening.

2. The electric control box according to claim 1, wherein:
    the box body is arranged in a vertical direction and having a first end and a second end that are opposite to each other in the vertical direction;
    the first inner shell and the second inner shell are assembled to each other in a longitudinal direction perpendicular to the vertical direction;
    at the first end of the box body, the second outer shell has a positioning hole; and
    the second inner shell has a flow guide groove formed at an outer surface of the second inner shell and extending in the vertical direction to the first end of the box body.

3. The electric control box according to claim 2, wherein, at the first end of the box body, the second inner shell includes a protrusion rib provided at an edge of the second inner shell, the protrusion rib protruding vertically in a direction facing away from an inner space of the box body and protruding beyond an inner or outer peripheral surface of the second outer shell, and a distance between the protrusion rib and the positioning hole being greater than or equal to 6 mm.

4. The electric control box according to claim 2, wherein the second outer shell has an outwardly protrusion structure protruding vertically in a direction facing away from the second inner shell, and the positioning hole is disposed at the outwardly protrusion structure.

5. The electric control box according to claim 2, wherein at the first end of the box body, the flow guide groove extends to an end surface of the second inner shell to form an avoidance groove, a bottom surface of the avoidance groove being spaced apart from the second outer shell, and the avoidance groove facing the positioning hole in the vertical direction.

6. The electric control box according to claim 2, wherein the insulation inner shell has a heat dissipation hole formed at and passing through a side wall of the insulation inner shell, a peripheral wall of the heat dissipation hole protruding beyond a side surface of the insulation inner shell, a protruding length of a side wall of the heat dissipation hole adjacent to the first end being greater than a protruding length of a side wall of each of the heat dissipation holes adjacent to the second end, and a notch groove being formed at the side wall of the heat dissipation hole adjacent to the first end.

7. The electric control box according to claim 1, wherein:
    the first inner shell includes a first support structure, the first support structure having a hole and including:
        a plurality of first support partition plates arranged at an end of the first inner shell and spaced apart from each other; and
        a first reinforcement member connected between two adjacent ones of the plurality of first support partition plates, a hole being formed at the reinforcement member; or
    the second inner shell includes a second support structure, the second support structure having a hole and including:
        a plurality of second support partition plates arranged at an end of the second inner shell and spaced apart from each other; and
        a second reinforcement member connected between two adjacent ones of the plurality of second support partition plates, the second reinforcement member having holes formed in a longitudinal direction.

8. The electric control box according to claim 1, further comprising:
    an inductor disposed in an avoidance opening formed in the first inner shell, and mounted at a recessed platform structure formed at an inner side of the first outer shell by a part of the first outer shell recessing inwardly.

9. The electric control box according to claim 1, further comprising:
    a circuit board mounted at the first inner shell;
    wherein:
        the first inner shell includes a positioning structure provided at an inner side of the first inner shell and arranged around the circuit board, the positioning structure including:
            positioning ribs arranged at the first inner shell around the circuit board to form a placement space, the circuit board being located in the placement space; and
            a plurality of positioning hooks arranged around the circuit board at intervals; and
        a guide rib is disposed at a peripheral wall of the placement space and perpendicular to the circuit board, the guide rib being connected to an inner side surface and an inner bottom surface of the placement space, an end of the guide rib facing away from the inner bottom surface of the placement space being formed into a wedge-shaped structure gradually increasing towards the inner bottom surface of the placement space relative to a height of the inner side surface of the placement space.

10. The electric control box according to claim 1, wherein:
   the first inner shell has a sealing groove formed at a peripheral wall of the first inner shell, and a sealing ring is disposed in the sealing groove;
   the second inner shell includes a sealing rib, the sealing rib being embedded in the sealing groove and pressed against the sealing ring; and
   the first inner shell and the second inner shell are connected by a fastener at a position adjacent to the sealing ring.

11. The electric control box according to claim 1, wherein:
   the box body further includes a recessed structure provided at an outer surface of the box body; and
   the vacated opening is disposed at the recessed structure.

12. The electric control box according to claim 1, comprising:
   a recessed structure provided at an outer surface of one end of the electric control box in a vertical direction; and
   a protrusion structure provided at an outer surface of another end of the electric control box in the vertical direction, the protrusion structure being convex relative to the recessed structure;
   wherein:
      a patch block is disposed at a step formed between the recessed structure and the protrusion structure, and including a cover plate covering the step, the cover plate including:
         a first flange provided at a part of a peripheral edge of the cover plate, the first flange extending towards the recessed structure in the vertical direction and being connected to a wall of the recessed structure; and
         a second flange provided at another part of the peripheral edge, the second flange extending towards the protrusion structure in the vertical direction and being connected to a wall of the protrusion structure.

13. The electric control box according to claim 1, further comprising:
   an outdoor temperature sensor;
   wherein:
   the box body including a plurality of wire outlets;
   the outdoor temperature sensor is disposed at a first wire outlet of the plurality of wire outlets;
   a second wire outlet of the plurality of wire outlets is configured to allow a wire bundle to be drawn out; and
   an inner side of the first wire outlet is isolated from an inner side of the second wire outlet by a partition plate.

14. The electric control box according to claim 1, further comprising:
   a circuit board;
   wherein:
      the circuit board is arranged within the box body and includes electronic components;
      the radiator is connected to at least some of the electronic components and configured to transfer heat;
      the box body includes a wiring channel having a wire outlet;
      a wire-separation rib is disposed in the wiring channel, the wire-separation rib dividing the wiring channel into at least two wire-separation slots in a direction perpendicular to an extending direction of the wiring channel;
      the at least two wire-separation slots include a weak electricity wire-separation slot close to the circuit board and a strong electricity wire-separation slot away from the circuit board.

15. The electric control box according to claim 14, wherein:
   the wiring channel includes:
      a first channel member and a second channel member distributed at opposite sides of the circuit board in a vertical direction and extending in a transverse direction perpendicular to the vertical direction; and
      a third channel member arranged at a side of the circuit board and extending in the vertical direction, the third channel member being connected to the first channel member and the second channel member;
   the wire-separation rib is arranged in the third channel member; and
   the radiator is disposed at a position of the circuit board facing away from the third channel member.

16. A window air conditioner comprising:
   a base;
   a casing assembly mounted at the base; and
   an electric control box disposed in the casing assembly and mounted at the base, the electric control box including:
      an insulation inner shell including a first inner shell and a second inner shell that are assembled to each other;
      a fireproof outer shell including a first outer shell and a second outer shell, the first outer shell covering the first inner shell, and the second outer shell covering the second inner shell; and
      a radiator;
   wherein:
      the insulation inner shell and the fireproof outer shell are parts forming a box body of the electric control box; and
      the box body has a vacated opening, the radiator extending out of the box body through the vacated opening.

17. The window air conditioner according to claim 16, wherein:
   the casing assembly includes a louver provided at a side wall of the casing assembly facing away from the base, the louver facing the second outer shell;
   at a first end of the box body, the second inner shell includes a protrusion rib provided at an edge of the second inner shell, the protrusion rib protruding vertically in a direction facing away from an inner space of the box body and protruding beyond an edge of the second outer shell in the vertical direction;
   the louver includes a flange rib provided at a peripheral edge of the louver; and
   a distance between the flange rib and the protrusion rib is greater than or equal to 6 mm.

18. The window air conditioner according to claim 16, wherein:
   the electric control box is inserted in the base and positioned at the base by a fastener;
   the base has an insertion opening;
   the electric control box includes a latch provided at an end of a bottom of the electric control box in the transverse direction parallel to the base; and the latch is inserted in the insertion opening in the transverse direction.

19. The window air conditioner according to claim 18, wherein:

the electric control box has a vacated notch formed at a position opposite to the insertion opening, the vacated notch having a first surface opposite to the insertion opening in a direction perpendicular to the base and a second surface opposite to the insertion opening in the transverse direction; and a connection member is disposed at the vacated notch and connected to the first surface, the second surface, and the latch, the connection member including:

a first connection rod connected to the first surface and extending towards the insertion opening, the latch being connected to a free end of the first connection rod;

a second connection rod connected to the second surface, extending towards the insertion opening, and being connected to the first connection rod; and a reinforcement rib connected among the first surface, the second surface, the first connection rod, and the second connection rod, the reinforcement rib having an annular hollow structure.

20. The window air conditioner of claim 16, wherein:

the casing assembly includes a compressor;

the electric control box is disposed adjacent to the compressor;

an end of a bottom of the electric control box that is adjacent to the compressor is inserted in the base; and an end of the bottom of the electric control box that is away from the compressor is positioned at the base by a fastener.

* * * * *